(12) United States Patent
Konet et al.

(10) Patent No.: US 10,150,370 B2
(45) Date of Patent: Dec. 11, 2018

(54) VEHICLE OPERATION ASSISTANCE INFORMATION MANAGEMENT FOR AUTONOMOUS VEHICLE CONTROL TRANSFER

(71) Applicant: Nissan North America, Inc., Franklin, TN (US)

(72) Inventors: Heather Konet, Canton, MI (US); Roy Goudy, Farmington Hills, MI (US); Andrew Christensen, South Lyon, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/900,633

(22) Filed: Feb. 20, 2018

(65) Prior Publication Data

US 2018/0186236 A1    Jul. 5, 2018

Related U.S. Application Data

(63) Continuation of application No. 15/056,744, filed on Feb. 29, 2016, now Pat. No. 9,937,795, which is a continuation-in-part of application No. 14/749,373, filed on Jun. 24, 2015, now Pat. No. 9,630,498.

(51) Int. Cl.
*B60K 35/00* (2006.01)

(52) U.S. Cl.
CPC ........ *B60K 35/00* (2013.01); *B60K 2350/352* (2013.01)

(58) Field of Classification Search
CPC ... B60K 35/00; B60K 2350/352; B60Q 9/006
See application file for complete search history.

(56) References Cited

U.S. PATENT DOCUMENTS

| | | | |
|---|---|---|---|
| 6,828,924 B2 | 12/2004 | Gustavsson et al. | |
| 7,126,580 B2 | 10/2006 | Hanon et al. | |
| 7,126,581 B2 | 10/2006 | Burk et al. | |
| 7,334,726 B2 | 2/2008 | Dulgerian et al. | |
| 2004/0061600 A1 | 4/2004 | Wehner et al. | |

(Continued)

*Primary Examiner* — Obafemi O Sosanya
(74) *Attorney, Agent, or Firm* — Young Basile Hanlon & MacFarlane, P.C.

(57) ABSTRACT

A vehicle implementing vehicle operation assistance information management for autonomous vehicle control transfer may identify a vehicle operation assistance information item indicating a location of an expected vehicle operation control transfer, and, in response to a determination that an immanency for the vehicle operation assistance information item is within a maximum relevant immanence, present a representation of the vehicle operation assistance information item, which may include, in response to a determination that an urgency for the vehicle operation assistance information item indicates a warning urgency or an advisory urgency, controlling the primary graphical display portion and the secondary graphical display portion to present a graphical representation of the vehicle operation assistance information item, such that the primary graphical display portion presents a first portion of the graphical representation and the secondary graphical display portion presents a second portion of the graphical representation.

20 Claims, 26 Drawing Sheets

(56) References Cited

U.S. PATENT DOCUMENTS

| | | |
|---|---|---|
| 2005/0136949 A1 | 6/2005 | Barnes |
| 2006/0066567 A1 | 3/2006 | Scharenbroch et al. |
| 2006/0262103 A1 | 11/2006 | Hu et al. |
| 2006/0287787 A1 | 12/2006 | Engstrom et al. |
| 2008/0036586 A1 | 2/2008 | Ohki |
| 2009/0024707 A1 | 1/2009 | Aase et al. |
| 2009/0189373 A1* | 7/2009 | Schramm ............... B60K 35/00 280/731 |
| 2009/0278677 A1 | 11/2009 | Arie et al. |
| 2009/0318119 A1 | 12/2009 | Basir et al. |
| 2010/0097239 A1 | 4/2010 | Campbell et al. |
| 2012/0050028 A1 | 3/2012 | Mastronardi et al. |
| 2014/0309870 A1* | 10/2014 | Ricci ...................... H04W 4/21 701/36 |
| 2015/0123778 A1 | 5/2015 | Konet et al. |
| 2016/0355132 A1* | 12/2016 | Zieglmeier ............ B60Q 9/006 |
| 2016/0375767 A1 | 12/2016 | Konet et al. |

* cited by examiner

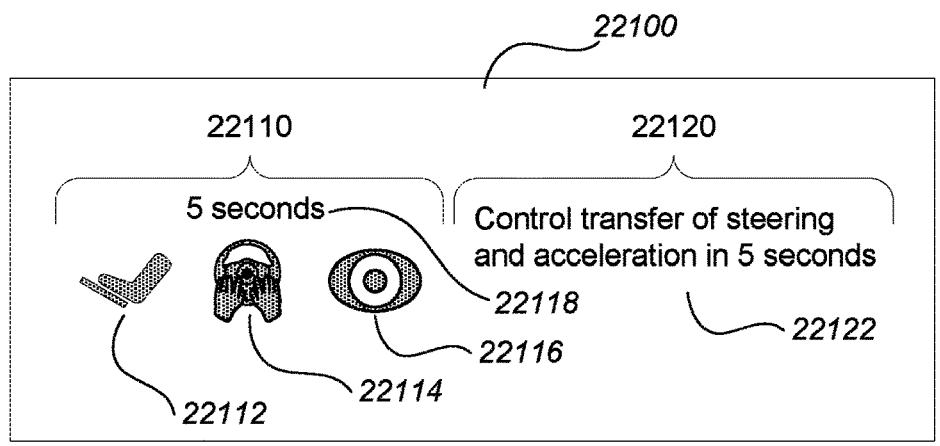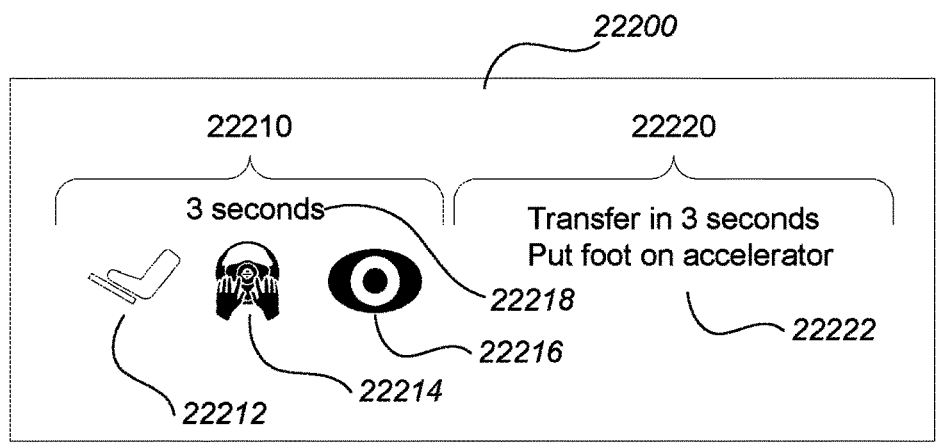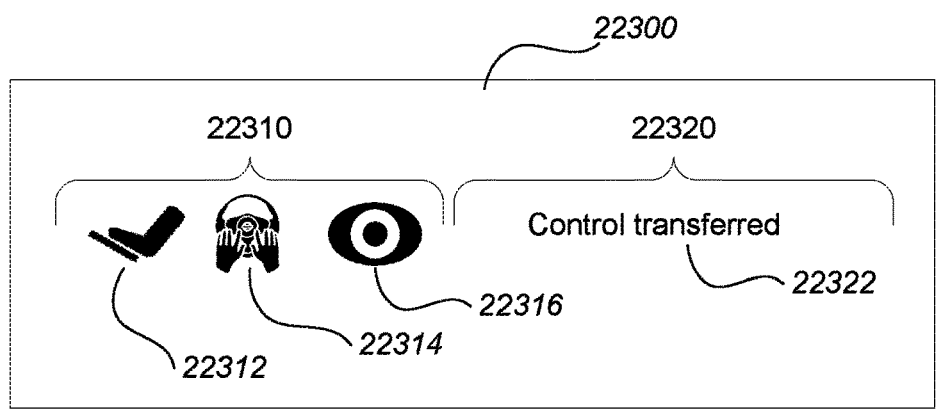
FIG. 22

VEHICLE OPERATION ASSISTANCE INFORMATION MANAGEMENT FOR AUTONOMOUS VEHICLE CONTROL TRANSFER

CROSS-REFERENCE TO RELATED APPLICATION(S)

This application is a continuation of U.S. patent application Ser. No. 15/056,744, filed on Feb. 29, 2016, which is a continuation-in-part of U.S. patent application Ser. No. 14/749,373, filed on Jun. 24, 2015, the entire content of which is incorporated herein by reference.

TECHNICAL FIELD

This disclosure relates to generating and presenting vehicle operation assistance information, vehicle navigation, and vehicle routing.

BACKGROUND

A vehicle may traverse a portion of a vehicle transportation network, which may include traversing a portion of the vehicle transportation network in response to driver control, autonomous vehicle control, or a combination thereof. Accordingly, a method and apparatus for vehicle operation assistance information management for autonomous vehicle control transfer may be advantageous.

SUMMARY

Disclosed herein are aspects, features, elements, implementations, and embodiments of vehicle operation assistance information management for autonomous vehicle control transfer.

An aspect of the disclosed embodiments is a vehicle configured to perform vehicle operation assistance information management for autonomous vehicle control transfer. The vehicle may include a primary graphical display portion, a secondary graphical display portion, and a processor configured to execute instructions stored on a non-transitory computer readable medium to perform vehicle operation assistance information management autonomous vehicle control transfer. Vehicle operation assistance information management autonomous vehicle control transfer may include identifying a vehicle operation assistance information item, the vehicle operation assistance information item indicating a location of an expected vehicle operation control transfer, and, in response to a determination that an immanency for the vehicle operation assistance information item is within a maximum relevant immanence, present a representation of the vehicle operation assistance information item. Presenting the representation of the vehicle operation assistance information item may include, in response to a determination that an urgency for the vehicle operation assistance information item indicates a warning urgency or an advisory urgency, controlling the primary graphical display portion and the secondary graphical display portion to present a graphical representation of the vehicle operation assistance information item, such that the primary graphical display portion presents a first portion of the graphical representation and the secondary graphical display portion presents a second portion of the graphical representation.

Another aspect of the disclosed embodiments is a vehicle configured to perform vehicle operation assistance information management for autonomous vehicle control transfer. The vehicle may include a primary graphical display portion, a secondary graphical display portion, a trajectory controller, and a processor configured to execute instructions stored on a non-transitory computer readable medium to perform vehicle operation assistance information management autonomous vehicle control transfer. Vehicle operation assistance information management autonomous vehicle control transfer may include identifying a vehicle operation assistance information item, the vehicle operation assistance information item indicating a location of an expected vehicle operation control transfer, and, in response to a determination that an urgency for the vehicle operation assistance information item indicates a warning urgency, a determination that an immanency for the expected vehicle operation control transfer is within a minimum relevant immanence, a determination that the expected vehicle operation control transfer is a vehicle operation control transfer from autonomous vehicle control to driver control, and a determination that a driver status for the vehicle operation control metric indicates a disengaged driver status, identifying a secondary vehicle control action corresponding to the expected vehicle operation control transfer, controlling the trajectory controller to operate the vehicle to traverse a part of the portion of the vehicle transportation network in accordance with the secondary vehicle control action, controlling the primary graphical display portion to present a representation of the vehicle operation assistance information item, and controlling the secondary graphical display portion to present the representation of the vehicle operation assistance information item.

Another aspect of the disclosed embodiments is a vehicle configured to perform vehicle operation assistance information management for autonomous vehicle control transfer. The vehicle may include a primary graphical display portion, a secondary graphical display portion, a trajectory controller, and a processor configured to execute instructions stored on a non-transitory computer readable medium to perform vehicle operation assistance information management autonomous vehicle control transfer. Vehicle operation assistance information management autonomous vehicle control transfer may include identifying a vehicle operation assistance information item, the vehicle operation assistance information item indicating a location of an expected vehicle operation control transfer, wherein the expected vehicle operation control transfer is a vehicle operation control transfer from autonomous vehicle control to driver control, and, in response to a determination that a driver status for the vehicle operation control metric indicates an engaged driver status, transferring vehicle operation control from autonomous vehicle control to driver control, controlling the primary graphical display portion to present a representation of the vehicle operation assistance information item, and controlling the secondary graphical display portion to present the representation of the vehicle operation assistance information item.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which:

FIG. 22 shows examples of graphical representations of vehicle operation assistance information for autonomous vehicle control transfer in accordance with this disclosure;

DETAILED DESCRIPTION

A vehicle, such as an autonomous vehicle, may traverse a portion of a vehicle transportation network and may identify vehicle operation assistance information, which may indicate a vehicle operation or vehicle transportation network condition that may affect the safe and efficient operation of the vehicle to traverse the vehicle transportation network.

In some embodiments, vehicle operation assistance information management for autonomous vehicle control operation may include presenting information representing the vehicle operation assistance information via one or more of a primary graphical display portion in the vehicle, a secondary graphical display portion in the vehicle, or an auditory presentation device in the vehicle. The primary graphical display portion, and the information displayed thereon, may be configured to provide an easily recognizable, minimally distracting representation of the vehicle operation assistance information. The secondary graphical display portion, and the information displayed thereon, may be configured to provide a more detailed description of the information indicated by the primary graphical display portion.

In some embodiments, vehicle operation assistance information may include information indicating a vehicle operation control transfer or an autonomous vehicle operation, and vehicle operation assistance information management for autonomous vehicle control operation may include presenting the information representing the vehicle operation assistance information as advance information, which may correspond with vehicle operation assistance information that is relevant to the future operation of the vehicle, and which may be presented via the secondary graphical display portion, as advisory information, which may correspond with vehicle operation assistance information that is relevant to the current, comfortable, operation of the vehicle, and which may be presented via the primary graphical display portion and, subsequently, via the secondary graphical display portion, or as warning information, which may correspond with vehicle operation assistance information that is relevant to the current urgent or emergent operation of the vehicle, and which may be presented via the primary graphical display portion and, subsequently, via the secondary graphical display portion. In some embodiments, vehicle operation assistance information management for autonomous vehicle control operation may include operating the vehicle in accordance with vehicle operation assistance information.

The simplified overview above is provided to help enable a basic or general understanding of various aspects of exemplary, non-limiting, embodiments that follow in the more detailed description and the accompanying drawings, and is not a complete or exhaustive description of any particular element of this disclosure.

Figure 1:
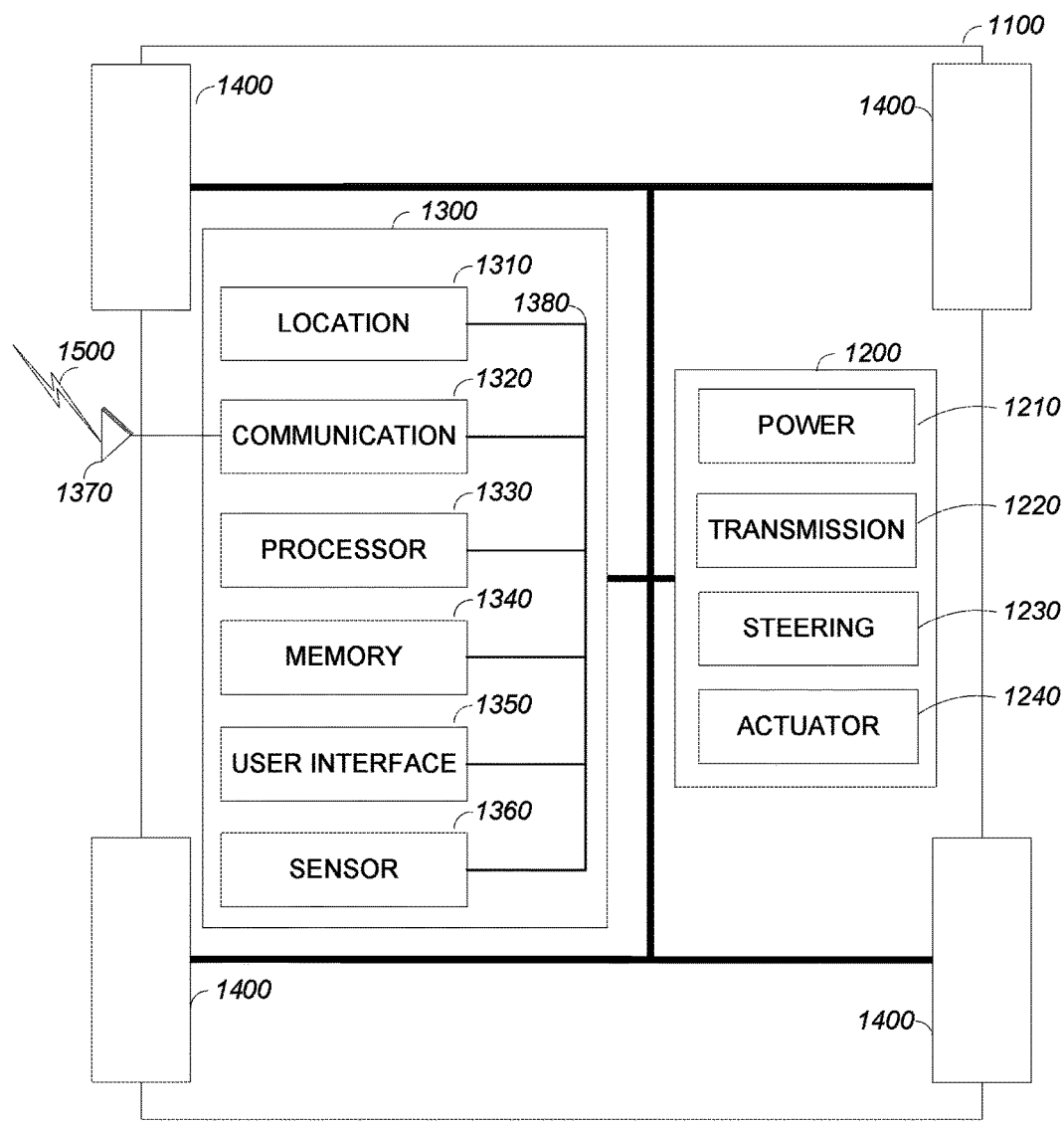
FIG. 1 is a diagram of an example of a vehicle in which the aspects, features, and elements disclosed herein may be implemented.

FIG. 1 is a diagram of an example of a vehicle in which the aspects, features, and elements disclosed herein may be implemented. In some embodiments, a vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1400 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the control unit 1300 the actuator 1240 or both. The steering unit 1230 may be controlled by the control unit 1300 the actuator 1240 or both and may control the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used. In some embodiments, the communication unit 1320 may include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit may include a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a heads-up display, a virtual display, an augmented reality display, a speaker, a microphone, a haptic display, a feature tracking device, such as an eye-tracking device, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person. In some embodiments, the user interface 1350 may include multiple displays, such as multiple physically separate units, multiple defined portions within a single physical unit, or a combination thereof.

The sensor 1360 may include one or more sensors, such as an array of sensors, which may be operable to provide information that may be used to control the vehicle. The sensors 1360 may provide information regarding current operating characteristics of the vehicle. The sensors 1360 can include, for example, a speed sensor, acceleration sensors, a steering angle sensor, traction-related sensors, braking-related sensors, steering wheel position sensors, eye tracking sensors, seating position sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the vehicle 1000 may include a trajectory controller. For example, the controller 1300 may include the trajectory controller. The trajectory controller may be operable to obtain information describing a current state of the vehicle 1000 and a rout planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the vehicle 1000 under control of the transmission 1220, or a steered and propelled wheel that may steer and propel the vehicle 1000.

Although not shown in FIG. 1, a vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

In some embodiments, the vehicle may be an autonomous vehicle. An autonomous vehicle may be controlled autonomously, without direct human intervention, to traverse a portion of a vehicle transportation network. Although not shown separately in FIG. 1, in some implementations, an autonomous vehicle may include an autonomous vehicle control unit, which may perform autonomous vehicle routing, navigation, and control. In some implementations, the autonomous vehicle control unit may be integrated with another unit of the vehicle. For example, the controller 1300 may include the autonomous vehicle control unit.

In some implementations, the autonomous vehicle control unit may control or operate the vehicle to traverse a portion of the vehicle transportation network in accordance with current vehicle operation parameters. In another example, the autonomous vehicle control unit may control or operate the vehicle to perform a defined operation or maneuver, such as parking the vehicle. In another example, autonomous vehicle control unit may generate a route of travel from an origin, such as a current location of the vehicle, to a destination based on vehicle information, environment information, vehicle transportation network information representing the vehicle transportation network, or a combination thereof, and may control or operate the vehicle to traverse the vehicle transportation network in accordance with the route. For example, the autonomous vehicle control unit may output the route of travel to a trajectory controller that may operate the vehicle to travel from the origin to the destination using the generated route.

Figure 2:
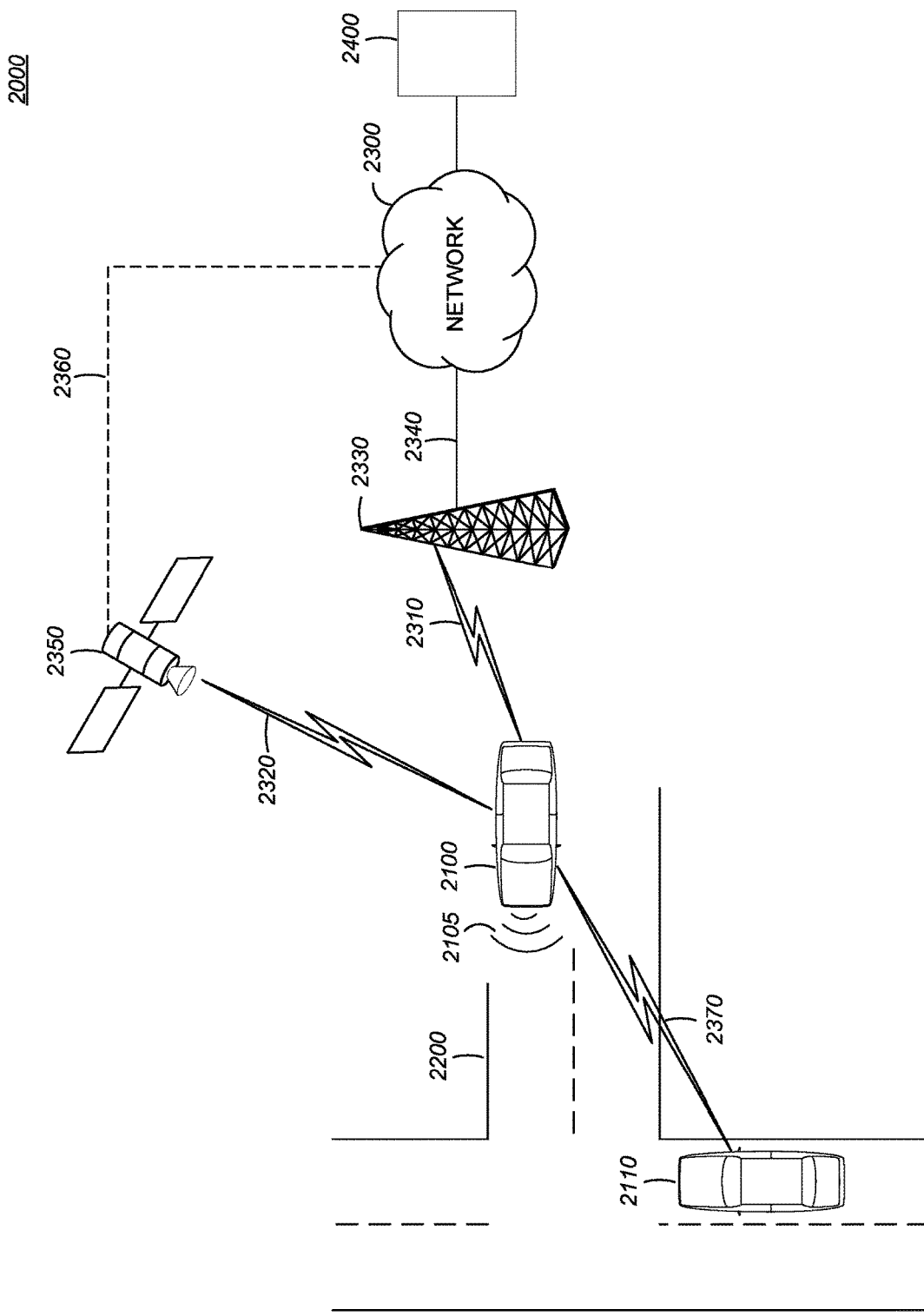
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which may travel via one or more portions of one or more vehicle transportation networks 2200, and may communicate via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. For example, as shown, a vehicle 2100/2110 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, a vehicle 2100/2110 may communicate with another vehicle 2100/2110. For example, a host, or subject, vehicle (HV) 2100 may receive one or more automated inter-vehicle messages, such as a basic safety message, from a remote, or target, vehicle (RV) 2110, via a direct communication link 2370, or via a network 2300. For example, the remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). In some embodiments, a vehicle 2100/2110 may transmit one or more automated inter-vehicle messages periodically, such as based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmitting vehicle is in a neutral state, a parked state, a forward state, or a reverse state.

In some embodiments, the vehicle 2100 may communicate with the communications network 2300 via an access point 2330. An access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 may communicate with the communications network 2300 via a satellite 2350, or other non-terrestrial communication device. A satellite 2350, which may include a computing device, may be configured to communicate with a vehicle 2100, with a communication network 2300, with one or more communication devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, a vehicle 2100 may identify a portion or condition of the vehicle transportation network 2200. For example, the vehicle may include one or more on-vehicle sensors 2105, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, a vehicle 2100 may traverse a portion or portions of one or more vehicle transportation networks 2200 using information communicated via the network 2300, such as information representing the vehicle transportation network 2200, information identified by one or more on-vehicle sensors 2105, or a combination thereof.

Although, for simplicity, FIG. 2 shows one vehicle 2100, one vehicle transportation network 2200, one electronic communication network 2300, and one communication device 2400, any number of vehicles, networks, or computing devices may be used. In some embodiments, the vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
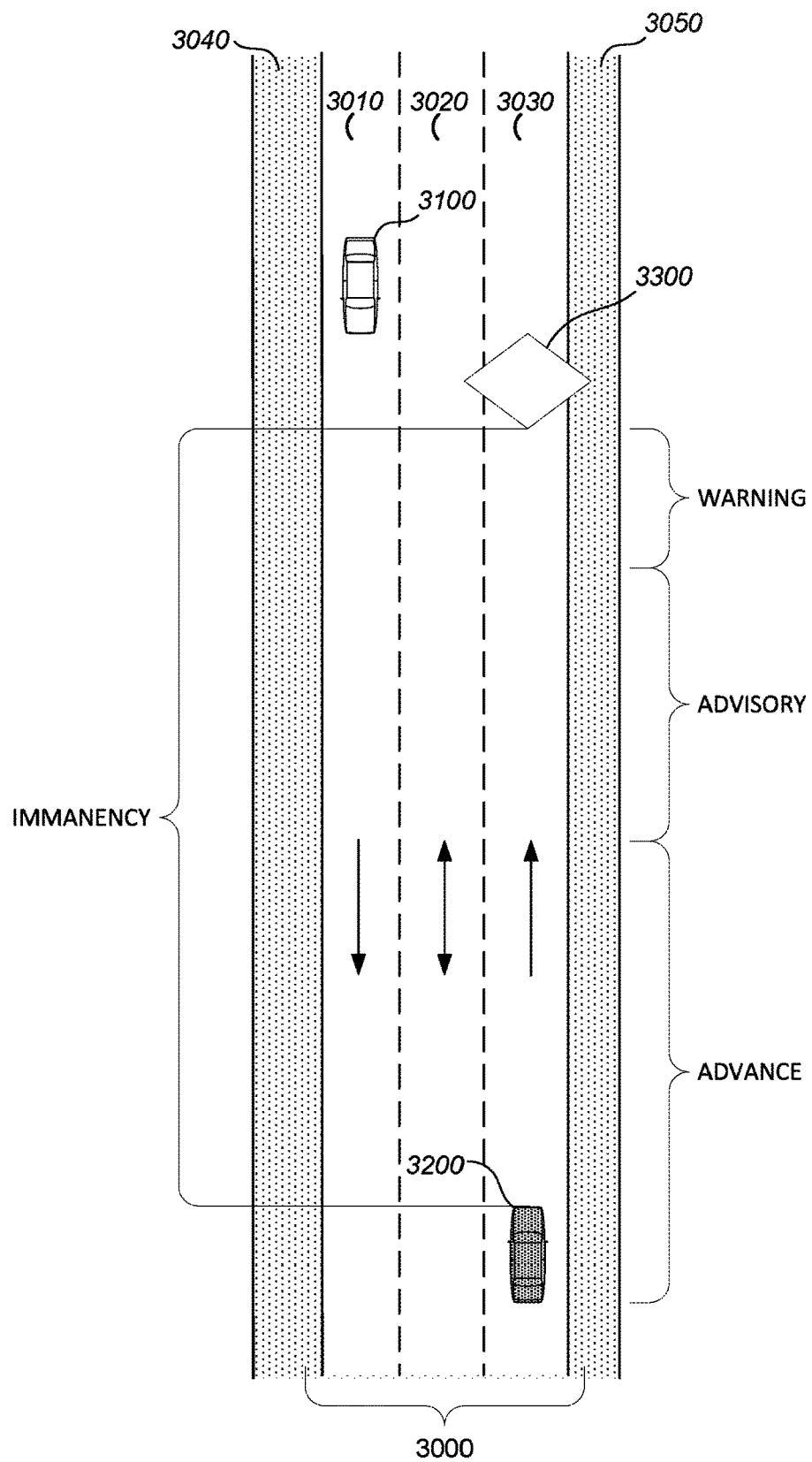
FIG. 3 is a diagram of vehicles operating in a portion of a vehicle transportation network in accordance with this disclosure.

In some embodiments, vehicle operation assistance information management may be implemented in a vehicle, such as the vehicle 1000 shown in FIG. 1 or the vehicles 2100/2110 shown in FIG. 2, and may include traversing a vehicle transportation network, or a portion thereof, as shown in FIG. 3. In some embodiments, vehicle operation assistance information management may include receiving, detecting, determining, or identifying vehicle operation assistance information, such as advanced driver assistance system information. The vehicle operation assistance information may indicate a portion of the vehicle transportation network and may include information relevant to operating the vehicle within recommended or prescribed operating parameters, the vehicle to traverse the vehicle transportation network relative to the indicated portion of the vehicle transportation network.

In some embodiments, the portion of the vehicle transportation network indicated by the vehicle operation assistance information may include a particular geospatial location, such as a location indicated by GPS coordinates, a geospatial location of a vehicle transportation network feature, such as an off ramp or a winding road, a geospatial location of an area including multiple features of the vehicle transportation network, or a geospatial location relative to the vehicle, such as a location immediately in front of the vehicle or a lane adjacent to the vehicle.

In some embodiments, the information relevant to operating the vehicle to traverse the vehicle transportation network relative to the indicated portion of the vehicle transportation network may indicate a condition or event affecting or potentially affecting the vehicle transportation network, the vehicle, or both, such as a high wind condition, an icy road surface condition, a reduced speed zone, a disabled vehicle in the roadway, a flat tire, or a substantial likelihood of an impending collision or traffic control violation.

In some embodiments, vehicle operation assistance information management may include evaluating the vehicle operation assistance information, current vehicle operational parameters, or both. For example, vehicle operation assistance information management may include determining an immanency, an urgency, a utility, or a combination thereof, based on the vehicle operation assistance information, the current vehicle operational parameters, or both. In some embodiments, the immanency may indicate a measure of the proximity of the geographic location indicated by the vehicle operation assistance information to the vehicle based on the current vehicle operational parameters. In some embodiments, the urgency may indicate a measure of the proximity of the geographic location indicated by the vehicle operation assistance information to the vehicle based on defined potential future vehicle operations. In some embodiments, the utility may indicate an expected value of utilizing the vehicle operation assistance information. In some embodiments, utilizing the vehicle operation assistance information may include presenting information to a driver of the vehicle based on the vehicle operation assistance information, and the utility, or expected value of utilizing the vehicle operation assistance information, may be based on an expected probability of the driver utilizing the information presented to control the vehicle to traverse the vehicle transportation network.

In some embodiments, vehicle operation assistance information management may include presenting information to a driver of the vehicle based on the vehicle operation assistance information may include determining how to present the information representing the vehicle operation assistance information using a primary graphical display portion, a secondary graphical display portion, an auditory presentation device, or any combination thereof, to maximize the probability of the driver utilizing the information presented to control the vehicle to safely traverse the vehicle transportation network. In some embodiments, vehicle operation assistance information management may include storing, maintaining, and managing vehicle operation assistance information.

FIG. 3 is a diagram of vehicles operating in a portion of a vehicle transportation network in accordance with this disclosure. As shown in FIG. 3, a portion of a vehicle transportation network may include navigable areas, such as a road 3000, which may include one or more lanes 3010/3020/3030. Each lane 3010/3020/3030 may have a direction of travel as shown. A portion of the vehicle transportation network may include partially navigable or non-navigable areas, such as shoulders 3040/3050. Vehicles, such as the remote vehicle 3100 or the host vehicle 3200, which may be a vehicle, such as the vehicle 1000 shown in FIG. 1 or the vehicles 2100/2110 shown in FIG. 2, may traverse the vehicle transportation network. For simplicity and clarity, a current, or host, vehicle 3200 is shown with stippling and a remote vehicle 3100 is shown in white. Although elevation is not expressly shown in FIG. 3, elevation information may be used for vehicle operation assistance information management.

In some embodiments, vehicle operation assistance information management may include identifying vehicle operation assistance information, which may indicate a vehicle operational condition or a vehicle transportation network condition that may affect the safe and efficient operation of the vehicle to traverse the vehicle transportation network. In some embodiments, the vehicle operation assistance information may indicate a geospatial location within the vehicle transportation network, as indicated by the white diamond at 3300.

A distance between the current location of the vehicle 3200 and the location 3300 indicated by the vehicle operation assistance information may be identified as the immanency. Although the immanency is shown spatially in FIG. 3, the immanency may indicate a temporal distance, or cost, for the vehicle 3200 to traverse the vehicle transportation network from the current location of the vehicle 3200 to the location 3300 indicated by the vehicle operation assistance information based on current vehicle operating parameters.

A warning distance, shown in FIG. 3 as a spatial distance from the location 3300 indicated by the vehicle operation assistance information, may indicate a spatial or temporal distance for the vehicle to traverse the vehicle transportation network in accordance with a vehicle control action responsive to the vehicle operation assistance information and a warning acceptability metric, such as a vehicle control action indicating an instruction to stop and a warning acceptability metric indicating a critical or emergent execution of the vehicle control action. For example, the vehicle control action may include an instruction to stop, the warning acceptability metric may indicate that the stopping should be performed as quickly as practicable, and the warning distance may indicate a minimal distance for the vehicle to come to a stop before reaching the location indicated by the vehicle operation assistance information at a maximum rate of deceleration.

An advisory distance, shown in FIG. 3 as a spatial distance from the edge of the warning distance proximal to the vehicle, may indicate a spatial or temporal distance for the vehicle to traverse the vehicle transportation network in accordance with a vehicle control action responsive to the vehicle operation assistance information and an advisory acceptability metric, such as a vehicle control action indicating an instruction to stop and an advisory acceptability metric indicating a comfortable or normal execution of the vehicle control action. For example, the vehicle control action may include an instruction to stop, the advisory acceptability metric may indicate that the stopping should be performed in a moderate or comfortable manner, and the advisory distance may indicate a minimal distance for the vehicle to come to a stop before reaching the location indicated by the vehicle operation assistance information at a comfortable rate of deceleration.

An advance distance, shown in FIG. 3 as a spatial distance from the edge of the advisory distance proximal to the vehicle, may indicate a spatial or temporal distance for the vehicle to traverse the vehicle transportation network prior to executing the vehicle control action responsive to the vehicle operation assistance information. For example, the vehicle control action may include an instruction to stop, and the advance distance may indicate a maximum distance wherein the vehicle operation assistance information is relevant.

Figure 4:
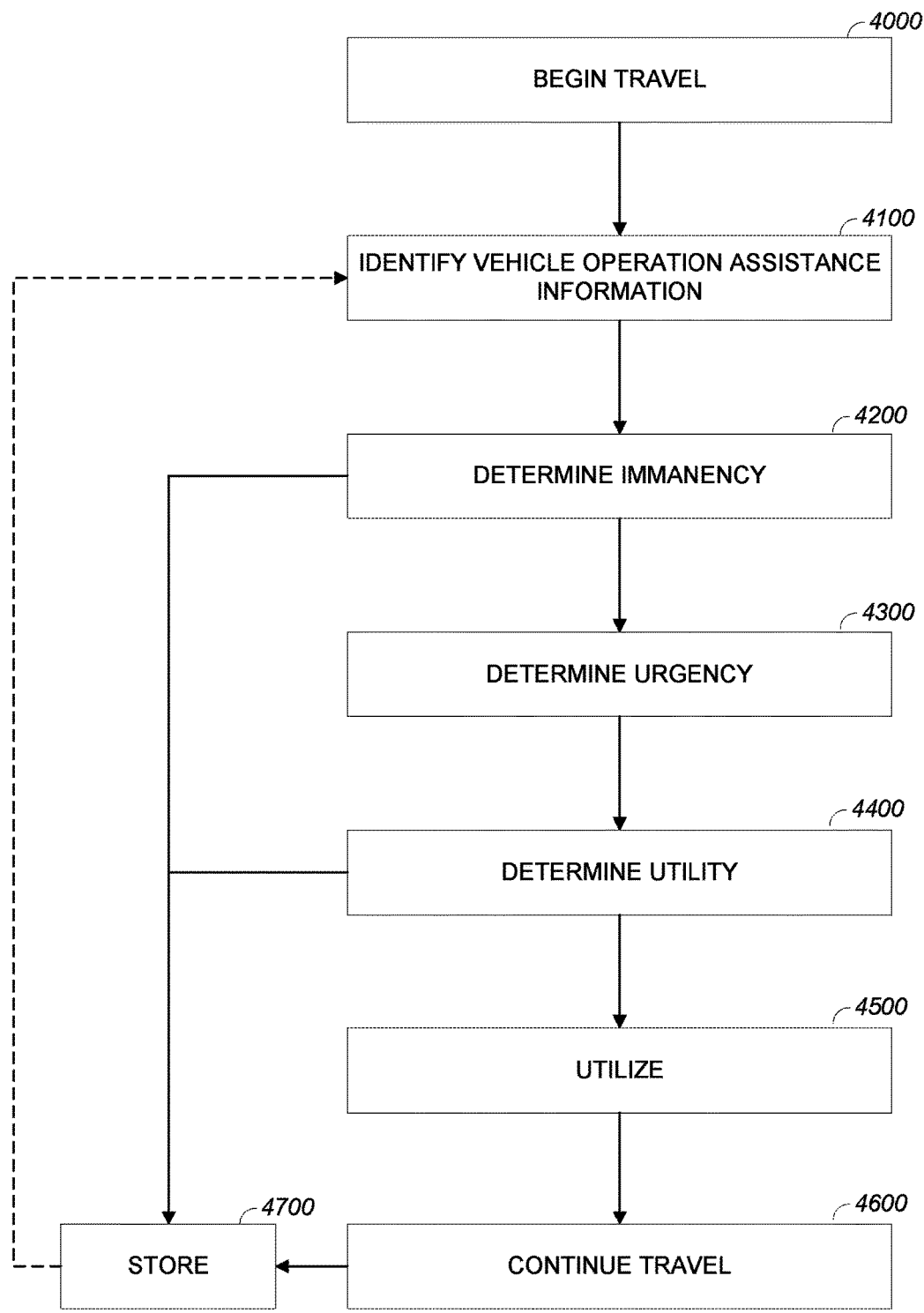
FIG. 4 is a diagram of vehicle operation assistance information management in accordance with this disclosure.

FIG. 4 is a diagram of vehicle operation assistance information management in accordance with this disclosure. In some embodiments, vehicle operation assistance information management may be implemented in a vehicle, such as the vehicle 1000 shown in FIG. 1, the vehicles 2100/2110 shown in FIG. 2, or the host vehicle 3200 shown in FIG. 3.

In some embodiments, vehicle operation assistance information management may include traversing a portion of a vehicle transportation network at 4000, identifying a vehicle operation assistance information item at 4100, identifying an immanency for the vehicle operation assistance information item at 4200, determining an urgency at 4300; determining a utility metric at 4400, utilizing the vehicle operation assistance information item at 4500, traversing another portion of a vehicle transportation network at 4600, storing information representing the vehicle operation assistance information item at 4700, or a combination thereof. For simplicity and clarity identifying the immanency at 4200, determining the urgency at 4300, determining the utility metric at 4400, and utilizing the vehicle operation assistance information item at 4500 may be collectively referred to herein as evaluating, or reevaluating, the vehicle operation assistance information.

In some embodiments, a current, or host, vehicle may traverse a portion of a vehicle transportation network at 4000. For example, a vehicle, such as the host vehicle 3200 shown in FIG. 3, may traverse a portion of a vehicle transportation network such as the portion shown in FIG. 3.

In some embodiments, vehicle operation assistance information may be identified at 4100. In some embodiments, identifying the vehicle operation assistance information at 4100 may include receiving external vehicle operation assistance information, which may include an external vehicle operation assistance information item, or a portion thereof, via an electronic communication link, such as one of the wireless electronic communication links 2310/2320/2370 shown in FIG. 2. For example, identifying the vehicle operation assistance information at 4100 may include receiving an external vehicle operation assistance information item, which may include an infrastructure message, from an external infrastructure device. In another example, identifying the vehicle operation assistance information at 4100 may include receiving an external vehicle operation assistance information item, which may include an inter-vehicle, or remote vehicle, message, from another vehicle in the vehicle transportation network, such as the remote vehicle 3100 shown in FIG. 3.

In some embodiments, identifying the vehicle operation assistance information at 4100 may include identifying a vehicle operation assistance information item based on vehicle transportation network information representing the portion of the vehicle transportation network being traversed. For example, vehicle operation assistance information management may include identifying vehicle transportation network information representing the portion of the vehicle transportation network being traversed, such as navigation system information or map information, and may identify a vehicle operation assistance information item indicated in the vehicle transportation network information in response to traversing a portion of the vehicle transportation network within a defined geospatial distance of a geospatial location corresponding to the vehicle operation assistance information item.

In some embodiments, the vehicle may include a sensor, such as the sensor 1360 shown in FIG. 1, or the on-vehicle sensors 2105 shown in FIG. 2, and identifying the vehicle operation assistance information at 4100 may include identifying vehicle operation assistance information based on sensor information. For example, the vehicle operation assistance information may be identified at 4100 based on sensor information indicating vehicle-to-vehicle closing information, gap maintenance information, parking proximity information, optical, such as camera based, hazard identification information, visibility information, driver attention information, audio sensor information, rain sensor information, roadway quality sensor information, or roadway geometry information.

In some embodiments, identifying vehicle operation assistance information at 4100 may include determining whether information is vehicle operation assistance information. In some embodiments, a vehicle operation assistance information item may expressly indicate that the vehicle operation assistance information item includes vehicle operation assistance information. For example, a vehicle operation assistance information item may include an identifier expressly identifying the vehicle operation assistance information item as vehicle operation assistance information, or may have a format defined for vehicle operation assistance information. In some embodiments, information may be identified as vehicle operation assistance information based on an information source, content, or a combination thereof. In some embodiments, whether information is vehicle operation assistance information may be determined, or candidate vehicle operation assistance information may be confirmed, by searching a data source, such as a database or look-up table, for similar information.

In some embodiments, vehicle operation assistance information may be categorically distinguishable from other types, or categories, of information, such as vehicle operational status information, which may include information such as a current geographic location of the vehicle, a current trajectory of the vehicle, a current speed of the vehicle, vehicle health information, or the like; navigation system information, which may include information such as map information, route information, vehicle transportation network congestion information, or the like; vehicle systems management information, which may include information such as vehicle configuration information; or non-operational information, such as entertainment system information.

In some embodiments, identifying vehicle operation assistance information at 4100 may include determining a vehicle operation assistance information type for the vehicle operation assistance information, which may include identifying a vehicle operation assistance information type identifier associated with the vehicle operation assistance information type.

In some embodiments, an immanency for the vehicle operation assistance information item may be determined at 4200. In some embodiments, the immanency may indicate temporal cost, which may indicate a temporal or spatial distance, for the vehicle to traverse the vehicle transportation network from a current geospatial location in the vehicle transportation network to a geospatial location indicated by the vehicle operation assistance information. In some embodiments, the vehicle operation assistance information may indicate a portion of the vehicle transportation network and the geospatial location indicated by the vehicle operation assistance information may correspond with a geospatial location of the portion of the vehicle transportation network indicated by the vehicle operation assistance information proximal to the vehicle. In some embodiments, determining an immanency for the vehicle operation assistance information item at 4200 may be similar to the immanency determination shown in FIG. 5.

In some embodiments, determining the immanency at 4200 may include determining whether the immanency exceeds, or is greater than, a maximum relevant immanence, which may be a defined maximum relevant immanence or a calculated maximum relevant immanence. For example, the maximum relevant immanence may indicate a temporal period, such as one minute, and determining the immanency at 4200 may include determining whether the immanency is greater than one minute. In some embodiments, the immanency may be greater than the maximum relevant immanence, information representing the vehicle operation assistance information identified at 4200 may be stored at 4700, and one or more elements of vehicle operation assistance information management, such as determining an urgency at 4300, determining a utility metric at 4400, or utilizing the vehicle operation assistance information item at 4500, may be omitted.

In some embodiments, an urgency for the vehicle operation assistance information item may be determined at 4300. In some embodiments, the urgency may represent a measure of the temporal or spatial distance available for utilizing the vehicle operation assistance information to traverse the vehicle transportation network. For example, vehicle operation assistance information may indicate a roadway condition, such as an icy road or a reduced speed zone, an event, such as a disabled vehicle, or a probable event, such as an impending collision, and the urgency may indicate a temporal distance available for utilizing the vehicle operation assistance information to traverse the vehicle transportation network, such as by presenting information to the driver of the vehicle, which may include information representative of the condition, event, or probable event, and may include instructions for operating the vehicle, such that the driver of the vehicle may operate the vehicle in response.

In some embodiments, the urgency may be categorized, or quantized, into a defined set of urgency types, categories, or bands. For example, a warning urgency may correspond with a high urgency band, an advance urgency may correspond with a low urgency band, and an advisory urgency may correspond with an urgency band between the advance urgency and the warning urgency. Although three urgency bands, advance, advisory, and warning, are described herein, any number of urgency bands may be used. For example, the advisory band may be replaced with a low advisory band, greater than, or more urgent than, the advance urgency, and a high advisory band, greater than the low advisory band and less urgent than the warning urgency. Although described categorically herein, the urgency may be, or may represent, a numeric, such as integer, value. In some embodiments, determining an urgency for the vehicle operation assistance information item at 4300 may be similar to the urgency determination shown in FIG. 6. For simplicity and clarity, the urgency associated with the vehicle operation assistance information identified at 4100 may be referred to herein as the current urgency.

In some embodiments, a utility metric for the vehicle operation assistance information item may be determined at 4400. In some embodiments, the utility metric may indicate a value of the vehicle operation assistance information identified at 4100 relative to current operating characteristics for the vehicle. In some embodiments, determining the utility metric for the vehicle operation assistance information item at 4300 may be similar to the utility metric determination shown in FIG. 7.

In some embodiments, the utility metric may be identified as indicating a low utility at 4400, information representing the vehicle operation assistance information identified at 4200 may be stored at 4700, and one or more elements of vehicle operation assistance information management, such as utilizing the vehicle operation assistance information item at 4500, may be omitted.

In some embodiments, the vehicle operation assistance information may be utilized at 4500. For example, utilizing the vehicle operation assistance information at 4500 may include presenting a representation of the vehicle operation assistance information. In some embodiments, presenting a representation of the vehicle operation assistance information may be similar to the presenting shown in FIG. 10.

In some embodiments, the vehicle may traverse another portion of a vehicle transportation network at 4600. For example, the vehicle may traverse the vehicle transportation network at 4600 based on the vehicle operation assistance information. In some embodiments, traversing another portion of the vehicle transportation network at 4600 may include storing information representing the vehicle operation assistance information at 4700.

In some embodiments, information representing the vehicle operation assistance information item may be stored at 4700. For example, the vehicle operation assistance information may be stored in a database, look-up table, or any other information store. In some embodiments, storing the vehicle operation assistance information may include storing temporal information, such as a time and date. In some embodiments, storing the vehicle operation assistance information may include storing geospatial information, such as the geospatial location indicated by the vehicle operation assistance information. In some embodiments, storing the vehicle operation assistance information may include storing user information, such as an identifier of the driver of the vehicle. In some embodiments, storing the vehicle operation assistance information may include storing vehicle transportation network status information, such as information indicating whether the vehicle operation assistance information represents a currently active vehicle transportation network condition.

In some embodiments, other information may be stored at 4700. For example, vehicle operation assistance information presentation customization information, such as information identified based on driver input, may be stored. Vehicle operation assistance information presentation customization information may be used to customize the presentation of vehicle operation assistance information, which may include identifying the primary display portion, the secondary display portion, or both, and may include identifying one or more parameters for representing the vehicle operation assistance information. In some embodiments, storing information at 4700 may include storing externally identified vehicle operation assistance information, which may include traffic information, such as current or predicted traffic information. In some embodiments, the information stored at 4700 may be transmitted to an external device for storage, analysis, or both. In another example, a vehicle operation profile, which may be driver specific, may be generated and stored at 4700. For example, the acceleration of the vehicle corresponding to turning may be stored. In some embodiments, the vehicle operation profile may include an aggregation of vehicle operation information. In some embodiments, acceptability metrics may be adjusted based on stored information, such as vehicle operation profile information.

Although not shown separately in FIG. 4, in some embodiments, vehicle operation assistance information management may include maintaining, or managing, stored vehicle operation assistance information. For example, vehicle operation assistance information management may include periodically, or in response to an event, deleting or archiving vehicle operation assistance information. In some embodiments, managing the vehicle operation assistance information may include updating information, such as the acceptability metrics, the vehicle operation assistance information representations. For example, a pictographic or audio representation may be modified or updated.

In some embodiments, identifying the vehicle operation assistance information at 4100 may include identifying a vehicle operation assistance information item based on previously identified vehicle operation assistance information as indicated by the broken line shown on the left of FIG. 4. For example, vehicle operation assistance information management may include identifying a first vehicle operation assistance information item at 4100, may store information representing the first vehicle operation assistance information item at 4700, may monitor the information stored at 4700, and may identify a second vehicle operation assistance information item based on the first vehicle operation assistance information item at 4100. In another example, vehicle operation assistance information management may include identifying a first vehicle operation assistance information item at 4100, may present a representation of the first vehicle operation assistance information item at 4500, may monitor the information presented at 4500, and may identify a second vehicle operation assistance information item based on the first vehicle operation assistance information item at 4100.

In some embodiments, identifying the second vehicle operation assistance information item based on the first vehicle operation assistance information item at 4100 may include copying the vehicle operation assistance information from the first vehicle operation assistance information item to the second vehicle operation assistance information, or using the first vehicle operation assistance information item as the second vehicle operation assistance information item.

In some embodiments, monitoring stored or currently presented vehicle operation assistance information may include periodically, or in response to an event, such as traversing a defined geospatial distance in the vehicle transportation network at 4600, determining whether to identify a vehicle operation assistance information item based on a previously identified vehicle operation assistance information item at 4100.

For example, vehicle operation assistance information management may include identifying a first vehicle operation assistance information item at 4100, may determine that the immanency for the first vehicle operation assistance information item exceeds a maximum relevant immanence at 4200, may store the first vehicle operation assistance information item at 4700, may subsequently identify the first vehicle operation assistance information item as a second vehicle operation assistance information item, may evaluate the second vehicle operation assistance information item, and may determine that the immanency for the second vehicle operation assistance information item is with the maximum relevant immanence at 4200, such as where the vehicle traversed the vehicle transportation network at 4600 to move closer to the geographic location indicated by the vehicle operation assistance information.

In another example, vehicle operation assistance information management may include identifying a first vehicle operation assistance information item at 4100, may determine that the immanency for the first vehicle operation assistance information item is 15 seconds at 4200, may present the first vehicle operation assistance information item as advance vehicle operation assistance information at 4500, may subsequently identify the first vehicle operation assistance information item as a second vehicle operation assistance information item, may evaluate the second vehicle operation assistance information item, may determine that the immanency for the second vehicle operation assistance information item is ten seconds at 4200, and may present the second vehicle operation assistance information item as advisory vehicle operation assistance information at 4500. Vehicle operation assistance information management may include subsequently identifying the second vehicle operation assistance information item as a third vehicle operation assistance information item, may evaluate the third vehicle operation assistance information item, may determine that the immanency for the third vehicle operation assistance information item is four seconds at 4200, and may present the third vehicle operation assistance information item as warning vehicle operation assistance information at 4500.

In another example, vehicle operation assistance information management may include identifying a first vehicle operation assistance information item at 4100, may determine that the immanency for the first vehicle operation assistance information item exceeds a maximum relevant immanence at 4200, may store the first vehicle operation assistance information item at 4700, may subsequently identify a second vehicle operation assistance information item at 4100, such as based on sensor information indicating a front impact collision warning, may evaluate the second vehicle operation assistance information item, may present the second vehicle operation assistance information item as warning vehicle operation assistance information at 4500, may subsequently cease presenting the second vehicle operation assistance information item, may subsequently identify the first vehicle operation assistance information item as a third vehicle operation assistance information item, may evaluate the third vehicle operation assistance information item, and may determine that the immanency for the third vehicle operation assistance information item is with the maximum relevant immanence at 4200, such as where the vehicle traversed the vehicle transportation network at 4600 to move closer to the geographic location indicated by the vehicle operation assistance information.

In some embodiments, one or more elements of vehicle operation assistance information may be implemented in an external device. For example, identifying a vehicle operation assistance information item at 4100, identifying an immanency for the vehicle operation assistance information item at 4200, determining an urgency at 4300; determining a utility metric at 4400, storing information representing the vehicle operation assistance information item at 4700, or a combination thereof, may be implemented in an external device, the vehicle may communicate with the external device via a wireless electronic communication link, the vehicle may receive processed, or partially processed, vehicle operation assistance information from the external device, and the vehicle may utilize the vehicle operation assistance information item at 4500.

Figure 5:
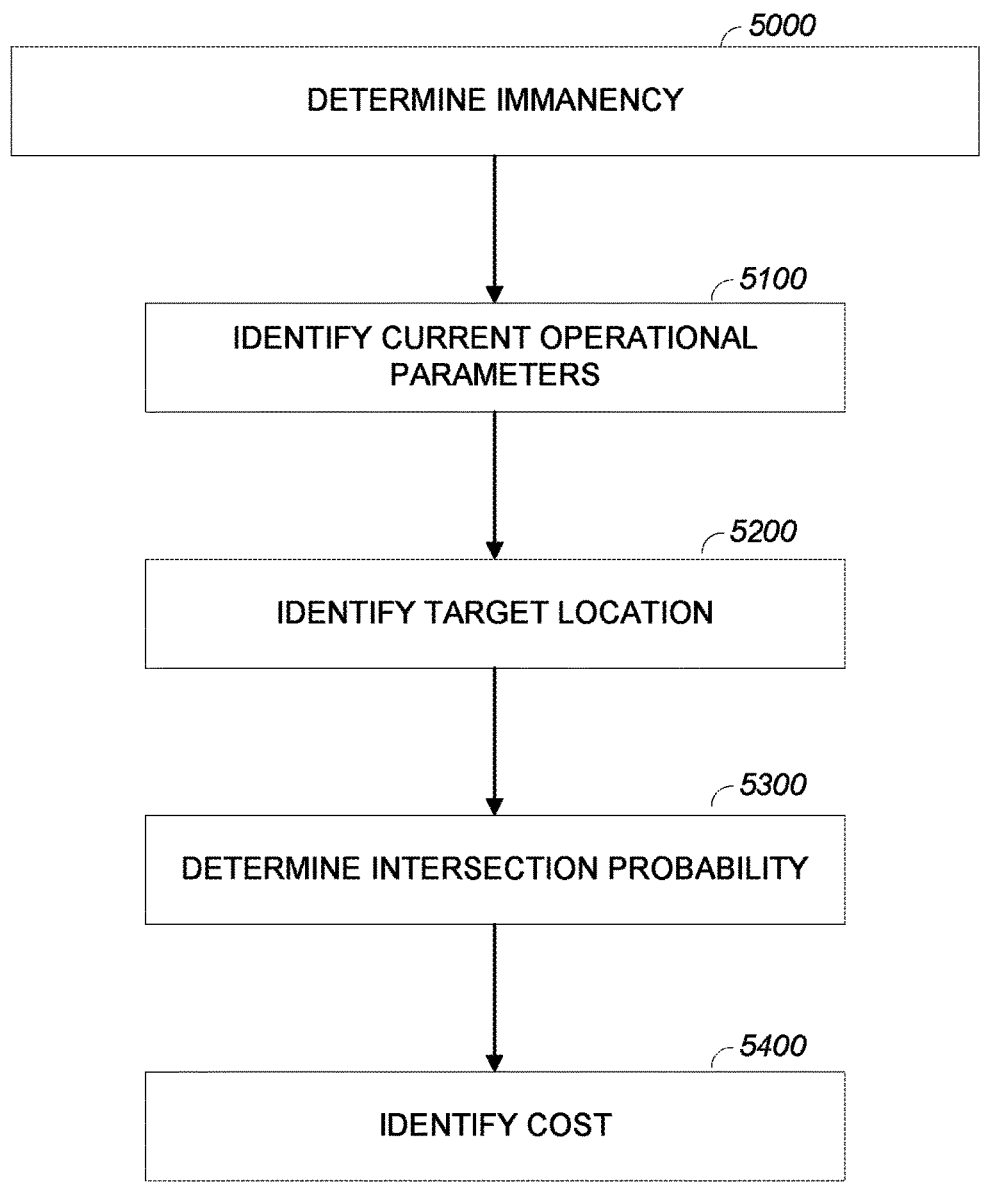
FIG. 5 is a diagram of determining an immanency in accordance with this disclosure.

FIG. 5 is a diagram of determining an immanency in accordance with this disclosure. In some embodiments, an immanency may indicate spatial or temporal distance between the vehicle and a geospatial location in the vehicle transportation network indicated by vehicle operation assistance information, such as the vehicle operation assistance information identified as shown at 4100 in FIG. 4.

In some embodiments, determining the immanency at 5000 may include identifying current operational parameters for the vehicle at 5100, identifying a target location at 5200, determining an intersection probability at 5300, identifying a cost at 5400, or a combination thereof.

In some embodiments, the vehicle operation assistance information may include an express or implied immanency and one or more elements of determining an immanency, such as identifying a target location at 5200, determining an intersection probability at 5300, or identifying a cost at 5400, may be omitted. For example, the vehicle operation assistance information may indicate front collision information. In some embodiments, the front collision information may expressly indicate an expected time to collision, such as three or four seconds, which may be identified as the immanency. In some embodiments, the front collision information may omit an express immanency, and a defined front collision immanency, such as three or four seconds, may be identified as the immanency.

In some embodiments, current operational parameters for the vehicle may be identified at 5100. In some embodiments, identifying the current operational parameters at 5100 may include identifying a current geospatial location of the vehicle, a current vehicle operational state for the vehicle, a current expected path for the vehicle, or a combination thereof. In some embodiments, the current geospatial location of the vehicle may be identified contemporaneously with identifying the vehicle operation assistance information.

In some embodiments, identifying the current vehicle operational state of the vehicle may include identifying a current heading for the vehicle, identifying a current speed of the vehicle, identifying a current acceleration for the vehicle, identifying a current active turn signal for the vehicle, or identifying any other current operational characteristic, or combination of characteristics for the vehicle.

In some embodiments, the current expected path for the vehicle may be identified based on the current vehicle location, the current vehicle operational state, the vehicle transportation network topology for a portion of the vehicle transportation network within a defined geospatial distance from the current location of the vehicle, a defined route for the vehicle, such as a route identified in a navigation system, or a combination thereof. For example, referring to FIG. 3, the current expected path for the host vehicle 3200 may indicate that the host vehicle 3200 is expected to travel from the current location of the host vehicle 3200 as shown in the right hand lane 3030.

In some embodiments, a target location may be identified at 5200. In some embodiments, the vehicle operation assistance information may indicate a geospatial location within the vehicle transportation network, such as a geospatial point, which may be indicated by, for example, GPS coordinates, a feature of the vehicle transportation network, such as a lane or a road, or a portion thereof, which may be indicated by two or more geospatial locations, such as a first geospatial location along a the vehicle transportation network feature corresponding to an edge of the portion of the vehicle transportation network feature indicated by the vehicle operation assistance information and a second geospatial location along the vehicle transportation network feature corresponding to an opposite edge of the portion of the vehicle transportation network feature indicated by the vehicle operation assistance information.

For example, referring to FIG. 3, the portion of the lane 3030 that includes the host vehicle 3200 may be associated with a higher speed limit than the portion of the lane 3030 near the top of FIG. 3, the vehicle operation assistance information may indicate reduce speed zone information and may indicate one or more locations within the vehicle transportation network, such as a geospatial location of a portion of the lower speed portion of the vehicle transportation network most proximate to the higher speed portion of the vehicle transportation network as indicated at 3300.

In some embodiments, an intersection probability may be determined at 5300. The intersection probability may be determined based on the current operational parameters identified at 5100, the target location identified at 5200, or a combination thereof. For example, determining the intersection probability at 5300 may include determining whether the current expected path for the vehicle identified at 5100 intersects with a portion of the vehicle transportation network indicated by the vehicle operation assistance information, which may correspond with the target location identified at 5200. In some embodiments, identifying the target location at 5200 may include identifying the most proximal geospatial location in the vehicle transportation network corresponding to the geospatial location information indicated in the vehicle operation assistance information, along, or within a defined buffer distance from, the current expected path for the vehicle.

For example, a portion of the vehicle transportation network may include a highway and an exit ramp, the highway may include an exit lane, which may intersect with the exit ramp, and a non-exit lane, which may not intersect with the exit ramp, the vehicle may traverse the highway in the non-exit lane to a geospatial location approaching the exit ramp, vehicle operation assistance information management may include identifying vehicle operation assistance information indicating reduced speed zone information for the exit ramp, vehicle operation assistance information management may include determining that the current expected path for the vehicle includes the non-exit lane at 5100, vehicle operation assistance information management may include identifying the intersection of the exit lane with the exit ramp as the target location at 5200, and vehicle operation assistance information management may include identifying a low intersection probability at 5300, which may indicate a determination of a low probability that the vehicle will traverse the portion of the vehicle transportation network indicated by the vehicle operation assistance information.

In another example, a portion of the vehicle transportation network may include a highway and an exit ramp, the highway may include an exit lane, which may intersect with the exit ramp, and a non-exit lane, which may not intersect with the exit ramp, the vehicle may traverse the highway in the exit lane to a geospatial location approaching the exit ramp, vehicle operation assistance information management may include identifying vehicle operation assistance information indicating reduced speed zone information for the exit ramp, vehicle operation assistance information management may include determining that the current expected path for the vehicle includes the exit lane and the exit ramp at 5100, vehicle operation assistance information management may include identifying the intersection of the exit lane with the exit ramp as the target location at 5200, and vehicle operation assistance information management may include identifying a high intersection probability at 5300, which may indicate a determination of a high probability that the vehicle will traverse the portion of the vehicle transportation network indicated by the vehicle operation assistance information.

In some embodiments, the intersection probability identified at 5300 may be within, such as less than or equal to, a minimum relevance threshold, which may indicate a maximum intersection probability that is not currently relevant to vehicle operation, and the vehicle operation assistance information may be identified as not currently relevant. For example, information representing the vehicle operation assistance information may be stored, or a value exceeding a maximum relevant immanence may be identified as the immanency for the vehicle operation assistance information. In some embodiments, the maximum relevant immanence may indicate a maximum temporal or geospatial distance, from the current geospatial location of the vehicle, based on the current operating characteristics of the vehicle, such as the speed and expected path of the vehicle, which may affect the current operation of the vehicle. For example, an immanency exceeding the maximum relevant immanence may indicate that the geospatial or temporal distance between the current location of the vehicle and the geospatial location indicated by the vehicle operation assistance information is so large that the vehicle operation assistance information is not currently relevant to the operation of the vehicle. In some embodiments, the maximum relevant immanence may be a defined value, such as 30 seconds. In some embodiments, the maximum relevant immanence may be calculated. For example, the maximum relevant immanence may be calculated based on current vehicle transportation network conditions, the current vehicle operating state, user input, such as a driver preference, or a combination thereof.

In some embodiments, a cost may be identified at 5400. In some embodiments, the intersection probability identified at 5300 may exceed, such as be greater than, the minimum relevance threshold, which may indicate that the vehicle operation assistance information may be relevant to the current vehicle operation, and a cost, such as a spatial or temporal cost, for the vehicle to traverse the vehicle transportation network from the current geospatial location of the vehicle identified at 5100 to the target geospatial location identified at 5200 using the expected path identified at 5100 may be identified as the cost at 5400. For example, a geospatial distance in the vehicle transportation network between the current geospatial location of the vehicle identified at 5100 and the target geospatial location identified at 5200 may be identified as a spatial cost, or a temporal distance, which may indicate an amount of time, for the vehicle to traverse the vehicle transportation network from the current geospatial location of the vehicle identified at 5100 to the target geospatial location identified at 5200 based on the current vehicle operating parameters, such as speed, identified at 5100, may be identified as the cost.

Figure 6:
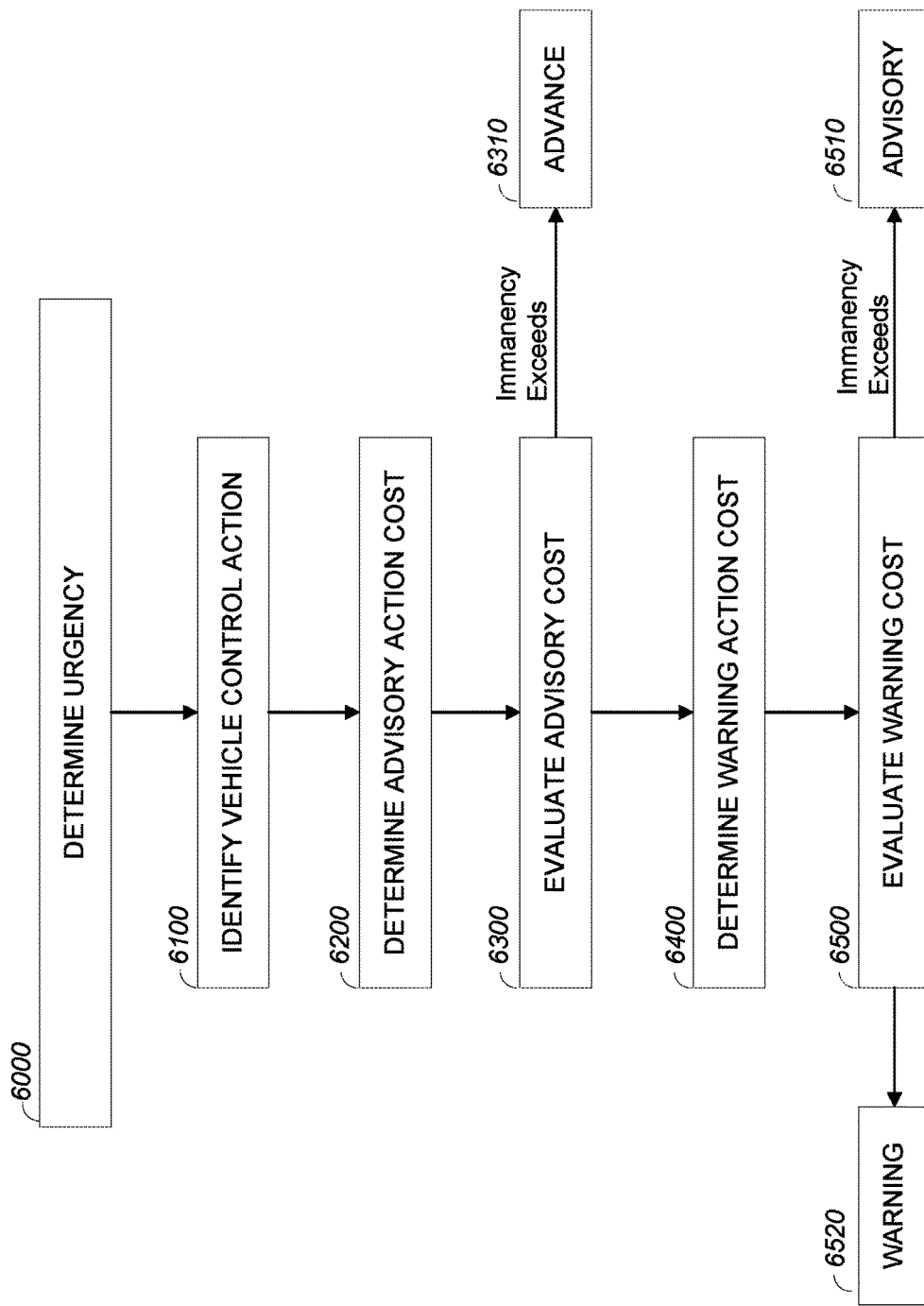
FIG. 6 is a diagram of determining urgency in accordance with this disclosure.

FIG. 6 is a diagram of determining urgency in accordance with this disclosure. In some embodiments, determining the urgency may include determining a temporal or spatial distance available for utilizing the vehicle operation assistance information to traverse the vehicle transportation network and quantizing, or categorizing, the temporal or spatial distance into a defined set of urgency types, categories, or bands. For example, a relatively small temporal or spatial distance may be categorized as high, or warning, urgency; a relatively large temporal or spatial distance may be categorized as low, or advance, urgency; and a temporal or spatial distance between the warning urgency and the advance urgency may be categorized as moderate, or advisory, urgency. Although three urgency bands, or categories, are described herein, any number and organization of urgency bands may be used. For example, the advisory urgency may be replaced with a low advisory urgency, greater than, or more urgent than, the advance urgency, and a high advisory urgency, greater than the low advisory urgency and less urgent than the warning urgency. In some embodiments, determining urgency at 6000 may be similar to the urgency determination shown at 4300 in FIG. 4.

In some embodiments, determining urgency at 6000 may include identifying a vehicle control action at 6100, determining an advisory action cost at 6200, evaluating an advisory cost at 6300, determining a warning action cost at 6400, evaluating a warning cost at 6500, or a combination thereof.

In some embodiments, the vehicle operation assistance information may indicate an express or implied urgency and determining urgency at 6000 may include using the urgency included in the vehicle operation assistance information as the urgency. For example, a vehicle operation assistance information item, such as a front collision vehicle operation assistance information item, may expressly indicate a warning urgency, which may be identified as the urgency. In another example, a vehicle operation assistance information item, such as a front collision vehicle operation assistance information item, which may omit an express urgency, may be associated with a defined urgency, such as the warning urgency, and the defined urgency may be identified as the urgency.

In some embodiments, an available vehicle control action responsive to the vehicle operation assistance information may be identified at 6100. A vehicle control action may indicate a vehicle control action, operation, or maneuver, such as accelerating, decelerating, turning, or stopping, that may be performed by the vehicle, such as in response to driver input, to traverse a portion of the vehicle transportation network.

In some embodiments, available vehicle control actions may be identified at 6100 based on vehicle operation assistance information and the current vehicle operational conditions. For example, a vehicle operation assistance information item may indicate a reduced speed zone, the current vehicle operational conditions may indicate a speed greater than a speed limit for the reduced speed zone, and a deceleration vehicle control action may be identified. In another example, the current vehicle operational conditions may indicate that the vehicle is turning, the vehicle operation assistance information item may indicate that the vehicle is turning into oncoming traffic, and a vehicle control action that indicates that it is safe to proceed, or that it is unsafe to proceed, In some embodiments, a vehicle control action responsive to the vehicle operation assistance information may be unavailable and an available vehicle control action responsive to the vehicle operation assistance information may not be identified at 6100. For example, a vehicle operation assistance information item may indicate a reduced speed zone, the current vehicle operational conditions may indicate a speed within the speed limit for the reduced speed zone, and a vehicle control action responsive to the vehicle operation assistance information may be unavailable.

In some embodiments, vehicle operation assistance information may indicate a defined vehicle operational condition, such as a speed limit, and a corresponding vehicle control action responsive to the vehicle operation assistance information may indicate a corresponding target vehicle operational condition, such as a target maximum speed. In some embodiments, the target vehicle operational control condition may be based on a defined vehicle operational condition and may differ from the defined vehicle operational condition. For example, a vehicle operation assistance information may indicate a defined speed and the corresponding target maximum speed may differ from the speed limit by a defined offset, which may be greater than the defined speed indicated by the vehicle operation assistance information.

In some embodiments, an advisory action cost may be identified at 6200. In some embodiments, an action cost may indicate a cost, such as a temporal cost or a spatial cost, for the vehicle to traverse the vehicle transportation network in accordance with an identified vehicle control action, such as the vehicle control action identified at 6100, based on the current vehicle operational conditions and one or more acceptability metrics.

In some embodiments, acceptability metrics may include safety metrics, such as metrics indicating collision avoidance; vehicle transportation network control compliance metrics, such as metrics indicating compliance with vehicle transportation network rules and regulations, such as a speed limit; physical capability metrics, such as metrics indicating a maximum braking capability of the vehicle; or any other metric related to vehicle operation. In some embodiments, an acceptability metric may indicate a defined rate, range, or limit. For example, a vehicle control action may indicate a reduction in speed, and a corresponding acceptability metric may indicate a defined target rate of deceleration, a defined range of deceleration rates, or a defined maximum rate of deceleration.

In some embodiments, an acceptability metric may be based on a balanced combination of passenger comfort and safety. For example, a comfortable deceleration acceptability metric may indicate a maximum deceleration rate of 11 feet per second squared. In some embodiments, an acceptability may be based on maximizing safety or avoiding a collision. For example, an emergent deceleration acceptability metric may indicate a maximum rate of deceleration, such as a deceleration rate greater than 11 feet per second squared.

In some embodiments, a vehicle control action responsive to the vehicle operation assistance information may be unavailable, or an available vehicle control action responsive to the vehicle operation assistance information may not be identified at 6100, and the advisory action cost identified at 6200 may be a defined advisory action cost, which may be a defined temporal cost, such as eight seconds.

In some embodiments, the advisory action cost identified at 6200 may be a determined advisory action cost, which may indicate a temporal cost for the vehicle to traverse the vehicle transportation network in accordance with a vehicle control action, such as the vehicle control action identified at 6100, and a corresponding advisory acceptability metric.

For example, a vehicle operation assistance information item may indicate a reduced speed zone, the current vehicle operational conditions may indicate a speed greater than a defined speed for the reduced speed zone; a deceleration vehicle control action may be identified at 6100, which may indicate a target maximum speed; an advisory deceleration acceptability metric may indicate an acceptable, or comfortable, rate of deceleration, such as a deceleration rate of 11 feet per second squared or less; and the determined advisory action cost identified at 6200 may indicate a temporal cost for the vehicle to traverse the vehicle transportation network by reducing speed from the current speed of the vehicle to the target maximum speed at a deceleration rate of 11 feet per second squared. In some implementations, one or more metrics may be identified based on driver information, such as an age of the driver, a vehicle operation profile associated with the driver, a licensing class of the driver, or the like.

In some embodiments, an advisory cost may be evaluated at 6300. In some embodiments, evaluating the advisory cost at 6300 may include identifying the advisory cost. In some embodiments, the advisory cost may be based on the advisory action cost identified at 6200 and an advisory offset, such as two seconds. For example, the advisory action cost identified at 6200 may be eight seconds, the advisory offset may be two seconds, and the advisory cost may be identified as a sum of the action cost and the advisory offset, such as ten seconds. In some embodiments, evaluating the advisory cost at 6300 may include determining whether an immanency, such as the immanency identified as shown at 4200 in FIG. 4 or as shown in FIG. 5, exceeds the advisory cost.

In some embodiments, the immanency may exceed the advisory cost and the current urgency may be identified as the advance urgency at 6310. For example, an immanency, such as the immanency identified as shown at 4200 in FIG. 4 or as shown in FIG. 5, may be twelve seconds, the advisory action cost identified at 6200 may be eight seconds, the advisory offset may be two seconds, the advisory cost may be ten seconds (8+2=10), the immanency may exceed the advisory cost (12>10), and the current urgency may be identified as the advance urgency at 6310. Identifying the current urgency as the advanced urgency at 6310 may indicate that more than enough time, or space, is available for the vehicle to traverse the vehicle transportation network in accordance with the vehicle operation assistance information and the advisory acceptability metric.

In some embodiments, the immanency may be within the advisory cost and a warning action cost may be determined at 6400. In some embodiments, the warning action cost identified at 6400 may indicate temporal cost for the vehicle to traverse the vehicle transportation network in accordance with the vehicle control action identified at 6100 and a corresponding warning acceptability metric. For example, a vehicle operation assistance information item may indicate a front collision, a stop vehicle control action may be identified at 6100, a warning deceleration acceptability metric may indicate an emergent rate of deceleration, which may be a rate of deceleration at or near a maximum practicable rate, such as a deceleration rate greater than 11 feet per second squared, and the warning action cost identified at 6400 may indicate a temporal cost for the vehicle to traverse the vehicle transportation network by reducing speed from the current speed of the vehicle to zero at a deceleration rate greater than 11 feet per second squared.

In some embodiments, a vehicle control action responsive to the vehicle operation assistance information may be unavailable, or an available vehicle control action responsive to the vehicle operation assistance information may not be identified at 6100, and a defined warning action cost, which may be a defined temporal cost, such as four seconds, may be identified as the warning action cost at 6400.

In some embodiments, a warning cost may be evaluated at 6500. In some embodiments, evaluating the warning cost at 6500 may include identifying the warning cost. In some embodiments, the warning cost may be based on the warning action cost identified at 6400 and a warning offset, such as one second. For example, the warning action cost identified at 6400 may be three seconds, the warning offset may be one second, and the warning cost may be identified as a sum of the warning action cost and the warning offset, such as four seconds. In some embodiments, evaluating the warning cost at 6500 may include determining whether an immanency, such as the immanency identified as shown at 4200 in FIG. 4 or as shown in FIG. 5, exceeds the warning cost.

In some embodiments, the immanency may exceed the warning cost and the current urgency may be identified as the advisory urgency at 6510. For example, the immanency, such as the immanency identified as shown at 4200 in FIG. 4 or as shown in FIG. 5, may be six seconds, the warning action cost identified at 6400 may be three seconds, the warning offset may be one second, the warning cost may be four seconds (3+1=4), the immanency may exceed the warning cost (6>4), and the current urgency may be identified as the advisory urgency at 6510. Identifying the current urgency as the advisory urgency at 6510 may indicate that more than enough time, or space, may be available for the vehicle to traverse the vehicle transportation network in accordance with the vehicle operation assistance information and the warning acceptability metric, and that a minimal, or lower, amount of time, or space, may be available for the vehicle to traverse the vehicle transportation network in accordance with the vehicle operation assistance information and the advisory acceptability metric.

In some embodiments, the immanency may be within the warning cost and the current urgency may be identified as the warning urgency at 6520. For example, the immanency, such as the immanency identified as shown at 4200 in FIG. 4 or as shown in FIG. 5, may be three seconds, the warning action cost identified at 6400 may be three seconds, the warning offset may be one second, the warning cost may be four seconds (3+1=4), the immanency may be within the warning cost (3<=4), and the current urgency may be identified as the warning urgency at 6520. Identifying the current urgency as the warning urgency at 6520 may indicate that enough time, or space, for the vehicle to traverse the vehicle transportation network in accordance with the vehicle operation assistance information and the advisory acceptability metric is not available, and may indicate that a minimal, or lower, amount of time, or space, may be available for the vehicle to traverse the vehicle transportation network in accordance with the vehicle operation assistance information and the warning acceptability metric.

In some embodiments, the vehicle control action identified at 6100 may include more than one vehicle control action, such as a primary vehicle control action and a secondary vehicle control action. For example, the primary vehicle control action may include proceeding along the expected path for the vehicle, and the secondary vehicle control action may indicate stopping or waiting before proceeding along the expected path for the vehicle.

In some embodiments, an advisory action cost may be identified at 6200 for the first, or primary, vehicle control action identified at 6100 and a corresponding primary advisory cost may be identified at 6300. In some embodiments, the immanency may exceed the primary advisory cost, the urgency may be identified as the advance urgency at 6310, and evaluating the secondary vehicle control action may be omitted. In some embodiments, the immanency may be within the primary advisory cost, a primary warning action cost may be determined at 6400, and a primary warning cost may be evaluated at 6500. In some embodiments, the immanency may exceed the primary warning cost, the urgency may be identified as the advisory urgency at 6510 in association with the primary vehicle control action, and evaluating the secondary vehicle control action may be omitted. In some embodiments, the immanency may be within the primary warning cost, a warning action cost for the secondary vehicle control action may be determined at 6400, and a secondary warning cost may be evaluated at 6500. In some embodiments, the immanency may exceed the secondary warning cost, and the urgency may be identified as the advisory urgency at 6510 in association with the secondary vehicle control action. In some embodiments, the immanency may be within the secondary warning cost, and the urgency may be identified as the warning urgency at 6510 in association with the secondary vehicle control action.

For example, the expected path for the vehicle may include a turn that intersects with oncoming traffic. The vehicle operation assistance information may indicate oncoming traffic information. A primary vehicle control action indicating proceeding with the turn, and a secondary vehicle control action indicating to stop, such as where the current vehicle state information indicates that the vehicle is moving, or wait, such as where the current vehicle state information indicates that the vehicle is stationary, may be identified at 6100.

An advisory action cost may be identified for the primary vehicle control action at 6200. The primary advisory action cost may be identified based on an advisory acceptability metric associated with the primary vehicle control action. For example, the advisory acceptability metric may indicate an acceptable minimum distance, such as eight seconds, between the vehicle and an identified point of impact between the vehicle, along the expected path of the vehicle, and the most proximate oncoming remote vehicle, along an expected path for the remote vehicle. In some embodiments, the acceptable minimum distance may be determined based on an acceptable advisory acceleration rate, an acceptable advisory angular force, or a combination thereof, for proceeding with traversing the vehicle transportation network by turning through the intersection. The immanency may be within the primary advisory cost evaluated at 6300, which may indicate that the identified point of impact between the vehicle, along the expected path of the vehicle, and the most proximate oncoming remote vehicle, along an expected path for the remote vehicle is within, for example, ten seconds, a primary warning action cost may be determined at 6400, and a primary warning cost may be evaluated at 6500.

In some embodiments, the immanency may exceed the primary warning cost, the urgency may be identified as the advisory urgency at 6510 in association with the primary vehicle control action, which may correspond with presenting an advisory to proceed, as indicated by the primary vehicle control action, and evaluating the secondary vehicle control action may be omitted.

In some embodiments, the immanency may be within the primary warning cost, which may indicate that the identified point of impact between the vehicle, along the expected path of the vehicle, and the most proximate oncoming remote vehicle, along an expected path for the remote vehicle is within, for example, five seconds, a warning action cost for the secondary vehicle control action may be determined at 6400, and a secondary warning cost may be evaluated at 6500. In some embodiments, the immanency may exceed the secondary warning cost, and the urgency may be identified as the advisory urgency at 6510 in association with the secondary vehicle control action, which may correspond with presenting an advisory to not proceed, such as "Caution—yield to oncoming traffic". In some embodiments, the immanency may be within the secondary warning cost, and the urgency may be identified as the warning urgency at 6510 in association with the secondary vehicle control action, which may correspond with presenting a warning to not proceed, such as "Stop—potential collision".

Figure 7:
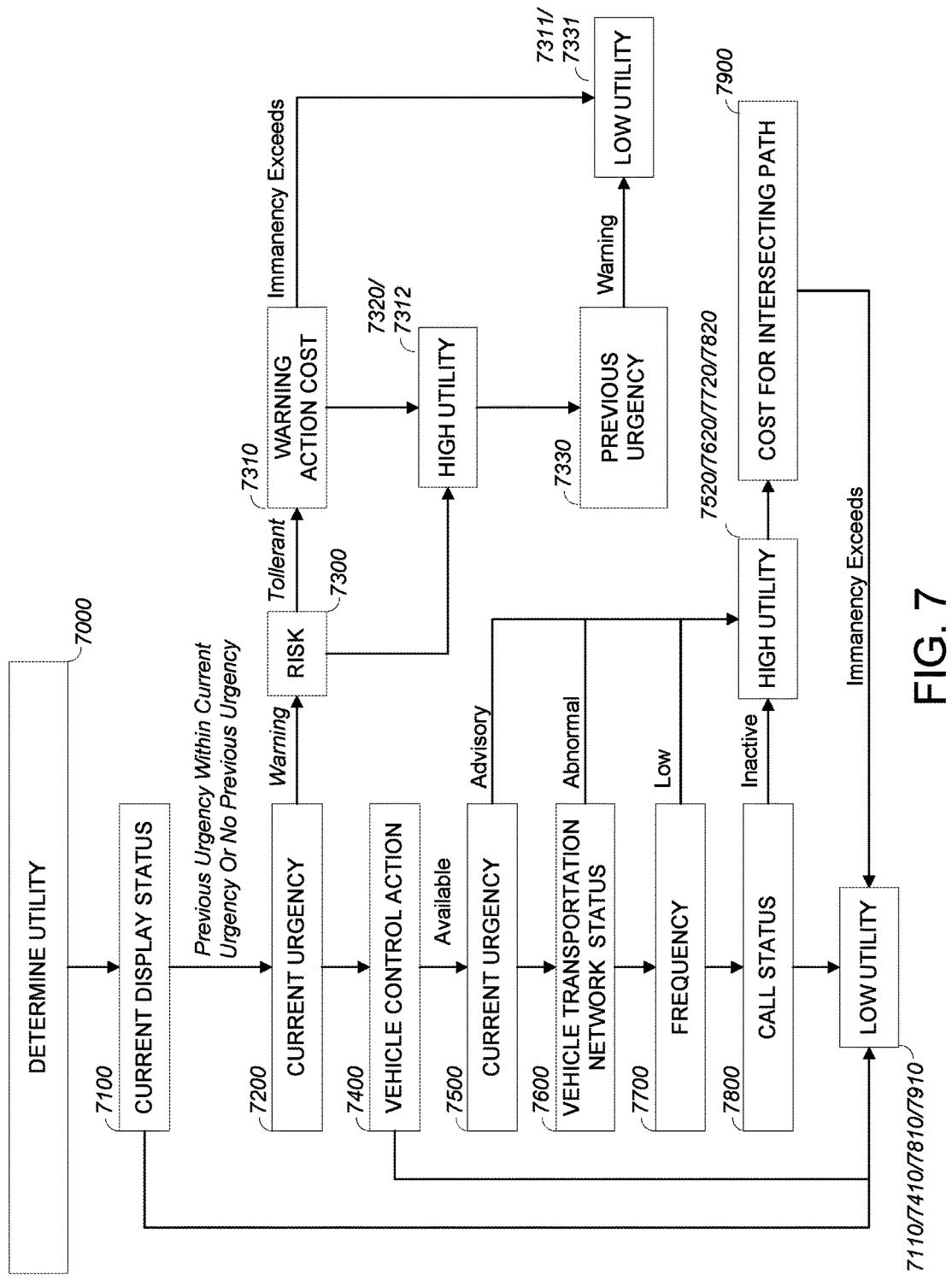
FIG. 7 is a diagram of determining a utility metric in accordance with this disclosure.

FIG. 7 is a diagram of determining a utility metric in accordance with this disclosure. In some embodiments, a defined set of utility metrics may be used, such as a low utility and a high utility. In some embodiments, the low utility may indicate that vehicle operation assistance information, such as the vehicle operation assistance information identified as shown at 4100 in FIG. 4, may be stored and that other contemporaneous use of the vehicle operation assistance information may be omitted. In some embodiments, the high utility may indicate that the vehicle operation assistance information may be contemporaneously used for traversing the vehicle transportation network. Although two utility metrics are described herein, any number of utility metrics may be used. For example, a low utility, a medium utility, and a high utility may be used. In some embodiments, determining a utility metric at 7000 may be similar to the utility determination shown at 4400 in FIG. 4.

In some embodiments, determining a utility metric at 7000 may include evaluating a current display status at 7100, evaluating a current urgency at 7200, evaluating a vehicle operation risk metric at 7300, evaluating the warning action cost at 7310, evaluating a previous urgency at 7330, evaluating the vehicle control action at 7400, evaluating the current urgency at 7500, evaluating the vehicle transportation network status indicated by the vehicle operation assistance information at 7600, evaluating a frequency for the vehicle operation assistance information at 7700, evaluating a call status at 7800, evaluating an intersecting path cost at 7900, or a combination thereof.

In some embodiments, the vehicle operation assistance information may include an express or implied utility metric and one or more elements of determining the utility metric at 7000 may be omitted. For example, a vehicle operation assistance information item, such as a front collision vehicle operation assistance information item, may expressly indicate a high utility, which may be identified as the utility metric. In another example, a front collision vehicle operation assistance information item may omit an express urgency, may be associated with a defined utility, such as a high utility, and the defined utility may be identified as the utility metric.

In some embodiments, a vehicle information presentation status may be identified at 7100. The vehicle information presentation status identified at 7100 may indicate an information presentation status of one or more user interface units of the vehicle, such as the user interface 1350 shown in FIG. 1. For example, the vehicle may include a graphical display unit and the vehicle information presentation status may indicate that the graphical display unit is not currently displaying information, that the graphical display unit is currently displaying navigation information, or that the graphical display unit is currently displaying information representing previously identified vehicle operation assistance information. In some embodiments, the vehicle information presentation status identified at 7100 may indicate that the user interface unit is currently displaying other information, such as information other than navigation information or information representing vehicle operation assistance information.

In some embodiments, the vehicle information presentation status identified at 7100 may indicate that the user interface unit is currently displaying information representing previously identified vehicle operation assistance information, and identifying the vehicle information presentation status at 7100 may include identifying an urgency associated with the previously identified vehicle operation assistance information. For simplicity and clarity, the urgency associated with the previously identified vehicle operation assistance information may be referred to herein as the previous urgency.

In some embodiments, the previous urgency identified at 7100 may exceed the current urgency, which may be, for example, the current urgency identified as shown at 4300 in FIG. 4 or as shown in FIG. 6, and a low utility may be identified as the utility metric at 7110. For example, the previous urgency may be the warning urgency, the current urgency may be the advisory urgency or the advance urgency, and a low utility may be identified as the utility metric. In another example, the previous urgency may be the advisory urgency, the current urgency may be the advance urgency, and a low utility may be identified as the utility metric.

In some embodiments, the current urgency may be evaluated at 7200. For example, the previous urgency identified at 7100 may be within the current urgency, or the vehicle information presentation status may omit information that indicates a previously identified vehicle operation assistance information item, and the current urgency may be evaluated at 7200. In an example, the previous urgency may be the warning urgency, the current urgency may be the warning urgency, and the current urgency may be evaluated at 7200. In another example, the previous urgency may be the advisory urgency, the current urgency may be the warning urgency or the advisory urgency, and the current urgency may be evaluated at 7200. In another example, the previous urgency may be the advance urgency, the current urgency may be the warning urgency, the advisory urgency, or the advance urgency, and the current urgency may be evaluated at 7200.

In some embodiments, evaluating the current urgency at 7200 may include determining whether the current urgency is the warning urgency. For example, the current urgency may be the warning urgency and a vehicle operation risk metric may be evaluated at 7300. In another example, the current urgency may be the advance urgency or the advisory urgency and the vehicle control action may be evaluated at 7400.

In some embodiments, the vehicle operation risk metric may be evaluated at 7300. For example, the current urgency may indicate a warning urgency and the vehicle operation risk metric may be evaluated at 7300. In some embodiments, evaluating the vehicle operation risk metric at 7300 may include determining the vehicle operation risk metric. In some embodiments, the vehicle operation risk metric may indicate a pattern, such as a risk tolerance pattern, associated with recent vehicle operations, which may include vehicle operations performed within a defined temporal period, such as two hours; vehicle operations performed after leaving a defined location, such as a home location or a work location defined for a driver of the vehicle; or vehicle operations performed after a defined event, such as a parked event. In some embodiments, a high vehicle operation risk metric may indicate risk tolerant vehicle operation and a low vehicle operation risk metric may indicate risk intolerant vehicle operation. In some embodiments, determining the vehicle operation risk metric at 7300 may be similar to determining the vehicle operation risk metric as shown at 8000 in FIG. 8.

In some embodiments, a warning action cost may be evaluated at 7310. For example, the vehicle operation risk metric identified at 7300 may exceed a defined risk tolerance threshold, which may indicate risk tolerant vehicle operation, and the warning action cost may be evaluated at 7310. The warning action cost may indicate a temporal cost, such as the warning action cost identified as shown at 6400 in FIG. 6, for the vehicle to traverse the vehicle transportation network in accordance with a vehicle control action, such as the vehicle control action identified as shown at 6100 in FIG. 6, and a corresponding warning acceptability metric. In some embodiments, evaluating the warning action cost at 7310 may include determining whether the immanency, such as the immanency identified as shown at 4200 in FIG. 4 or as shown in FIG. 5, exceeds the warning action cost at 7310 may be similar to the determination whether the immanency exceeds the warning cost shown at 6500 in FIG. 6, except that the warning offset may be omitted.

In some embodiments, the immanency may exceed the warning action cost, which may indicate that more than enough time, or space, is available for the vehicle to traverse the vehicle transportation network in accordance with the vehicle operation assistance information and the warning acceptability metric, and a low utility may be identified for the vehicle operation assistance information at 7311. Identifying a low utility for a vehicle operation risk metric that exceeds a defined risk threshold and an immanency that exceeds the warning action cost may suppress unwanted warnings.

In some embodiments, the immanency may be within the warning action cost, which may indicate that a minimal, or lower, amount of time, or space, is available for the vehicle to traverse the vehicle transportation network in accordance with the vehicle operation assistance information, and a high utility may be identified for the vehicle operation assistance information at 7312.

In some embodiments, the vehicle operation risk metric identified at 7300 may be within the defined risk tolerance threshold, which may indicate risk intolerant vehicle operation, and a high utility may be identified for the vehicle operation assistance information at 7320.

In some embodiments, identifying the utility metric as indicating a high utility at 7312/7320 may include evaluating the previous urgency at 7330. In some embodiments, the vehicle information presentation status may omit information that indicates a previously identified vehicle operation assistance information item and evaluating the previous urgency at 7330 may be omitted. In some embodiments, the previous urgency may be the warning urgency, and a low utility may be identified for the vehicle operation assistance information at 7331. In some embodiments, identifying a low utility for the vehicle operation assistance information at 7331 where the previous urgency is the warning urgency may suppress the concurrent presentation of multiple warnings, which may be distracting or confusing. Although not shown in FIG. 7, in some embodiments, identifying a low utility for the vehicle operation assistance information at 7331 may be omitted, and multiple warnings may be concurrently presented.

In some embodiments, a vehicle control action may be evaluated at 7400. In some embodiments, evaluating the vehicle control action at 7400 may include identifying the vehicle control action, which may be similar to identifying the vehicle control action as shown at 6100 in FIG. 6. In some embodiments, a vehicle control action may be unavailable, and a low utility may be identified for the vehicle operation assistance information at 7410. In some embodiments, identifying a low utility for the vehicle operation assistance information at 7410 where the current urgency is the advance urgency or the advisory urgency and a vehicle control action is unavailable may suppress the use of unwanted vehicle operation assistance information. In some embodiments, an available vehicle control action may be identified at 7400, and the current urgency may be evaluated at 7500.

In some embodiments, evaluating the current urgency, which may be, for example, the current urgency identified as shown at 4300 in FIG. 4 or as shown in FIG. 6, at 7500 may include determining whether the current urgency is the advisory urgency. For example, the current urgency may be the advisory urgency and a high utility may be identified for the vehicle operation assistance information at 7520. In some embodiments, identifying a high utility for the vehicle operation assistance information at 7520 where the current urgency is the advisory urgency a vehicle control action is available may encourage the use of currently actionable vehicle operation assistance information. In another example, the current urgency may be the advance urgency and a vehicle transportation network status may be evaluated at 7600.

In some embodiments, evaluating the vehicle transportation network status at 7600 may include identifying the vehicle transportation network status. For example, the vehicle transportation network status may be identified based on the vehicle operation assistance information. In some embodiments, the vehicle operation assistance information may include an express vehicle transportation network status. In some embodiments, the vehicle operation assistance information may omit an express indication of a vehicle transportation network status, and an implied vehicle transportation network status may be determined for the vehicle operation assistance information, such as from a database, look-up table, or other information store. In some embodiments, In some embodiments, the vehicle transportation network status corresponding to a vehicle operation assistance information may be identified as an expected status or an abnormal status. An expected status may indicate a vehicle transportation network condition or characteristic that defines the corresponding portion of the vehicle transportation network. For example, a vehicle operation assistance information item may indicate a school zone, which may indicate a reduced speed when children are present, which may be a vehicle transportation network condition or characteristic that defines the school zone portion of the vehicle transportation network, and the vehicle transportation network status for the vehicle operation assistance information item may be identified as an expected status. An abnormal vehicle transportation network status may indicate a vehicle transportation network condition or characteristic that differs or varies from the definition of the corresponding portion of the vehicle transportation network. For example, a vehicle operation assistance information item may indicate a disabled vehicle, which may vary from the definition of the corresponding portion of the vehicle transportation network, and the vehicle transportation network status for the vehicle operation assistance information item may be identified as an abnormal status. In another example, a vehicle operation assistance information item may indicate icy conditions, which may vary from the definition of the corresponding portion of the vehicle transportation network, and the vehicle transportation network status for the vehicle operation assistance information item may be identified as an abnormal status. In another example, a vehicle operation assistance information item may indicate a construction zone, which may vary from the definition of the corresponding portion of the vehicle transportation network, and the vehicle transportation network status for the vehicle operation assistance information item may be identified as an abnormal status. In some embodiments, identifying vehicle operation assistance information as expected or abnormal may include determining whether the vehicle operation assistance information differs from defined vehicle transportation network information. In some embodiments, identifying vehicle operation assistance information as expected or abnormal may include determining whether a count of similar vehicle operation assistance information exceeds a defined recognition threshold. In some embodiments, the vehicle operation assistance information may include information indicating an emergency vehicle and the metrics may be replaced with emergency vehicle metrics.

In some embodiments, evaluating the vehicle transportation network status at 7600 may include determining whether the vehicle transportation network status is abnormal. For example, the vehicle transportation network status may be abnormal and a high utility may be identified for the vehicle operation assistance information at 7620. In some embodiments, identifying a high utility for the vehicle operation assistance information at 7620 where the vehicle transportation network status is abnormal may encourage the use of currently actionable vehicle operation assistance information in abnormal conditions. In another example, the vehicle transportation network status may be expected and a frequency metric may be evaluated at 7700.

In some embodiments, evaluating the frequency metric at 7700 may include determining the frequency metric, which may represent a measure of how often, how recently, or a combination of how often and how recently, previously identified vehicle operation assistance information similar to the current vehicle operation assistance information was identified. In some embodiments, determining the frequency metric at 7700 may be similar to determining the frequency metric as shown at 9000 in FIG. 9.

In some embodiments, evaluating the frequency metric at 7700 may include determining whether the frequency metric indicates a low frequency or a high frequency. For example, the frequency metric may indicate a low frequency and a high utility may be identified for the vehicle operation assistance information at 7720. In some embodiments, identifying a high utility for the vehicle operation assistance information at 7720 where the vehicle operation assistance information indicates a low frequency may encourage the use of currently actionable vehicle operation assistance information in unfamiliar conditions. In another example, the frequency metric may indicate a high frequency and a call status be evaluated at 7800.

In some embodiments, evaluating the call status at 7800 may include determining whether the call status indicates an active call status or an inactive call status. For example, the call status may indicate an active call status and a low utility may be identified for the vehicle operation assistance information at 7810. In some embodiments, identifying a low utility for the vehicle operation assistance information at 7810 where the call status indicates an active call status may suppress the use of potentially distracting vehicle operation assistance information. In another example, the call status may indicate an inactive call status and a high utility may be identified for the vehicle operation assistance information at 7820. In some embodiments, identifying a high utility for the vehicle operation assistance information at 7820 where the call status indicates an inactive call status may encourage the use of currently actionable vehicle operation assistance information. In some embodiments, vehicle operation assistance information management may include temporarily suppressing other information. For example, other information may be omitted from display, may be displayed behind vehicle operation assistance information, or may be displayed via a tertiary display portion. In some embodiments, the other information may be restored subsequent to presenting the vehicle operation assistance information.

In some embodiments, determining the call status at 7800 may include determining whether a wireless telecommunication device indicates an active call. In some embodiments, the vehicle may include an electronic communication unit, such as the electronic communication unit 1320 shown in FIG. 1, configured for wireless telecommunication, and determining the call status at 7800 may include determining whether the electronic communication unit indicates an active call. For example, the electronic communication unit may include a cellular telephone unit. In some embodiments, the electronic communication unit may interface with an external wireless telecommunication device. For example, the electronic communication unit may include a Bluetooth unit, and may interface with an external wireless telecommunication device via a Bluetooth link. In some embodiments, determining the call status at 7800 may include determining whether a passenger, other than a driver of the vehicle, is present in the vehicle. For example, a driver and another passenger may be present in the vehicle and the call status may be identified as inactive.

In some embodiments, identifying the utility metric as indicating a high utility at 7520/7620/7720/7820 may include evaluating a current expected path for the vehicle at 7900. In some embodiments, evaluating the current expected path for the vehicle at 7900 may include identifying the current expected path, which may be similar to identifying the current expected path as shown at 5100 in FIG. 5.

In some embodiments, evaluating the current expected path for the vehicle may include identifying a candidate proximal geospatial location in the vehicle transportation network. In some embodiments, identifying the candidate proximal geospatial location may include identifying one or more candidate proximal geospatial locations based on the current expected path for the vehicle and vehicle transportation network information representing a portion of the vehicle transportation network corresponding to the current expected path. For example, the vehicle transportation network information may indicate that the current expected path intersects with a geo spatial location of a traffic control device, such as a stop sign, and the corresponding geospatial location may be identified as a candidate proximal geospatial location.

In some embodiments, evaluating the current expected path for the vehicle may include determining whether the current expected path intersects with the candidate proximal geospatial location. For example, a previously identified vehicle operation assistance information item, such as the previously identified vehicle operation assistance information identified at 7100, may indicate a geospatial location in the vehicle transportation network, the current expected path may intersect with the geospatial location indicated by the previously identified vehicle operation assistance information, and the geospatial location indicated by the previously identified vehicle operation assistance information may be identified as a candidate proximal geospatial location. In another example, a previously identified vehicle operation assistance information item, such as the previously identified vehicle operation assistance information identified at 7100, may indicate a geospatial location in the vehicle transportation network, the current expected path may not intersect with the geospatial location indicated by the previously identified vehicle operation assistance information, and the geospatial location indicated by the previously identified vehicle operation assistance information may not be identified as a candidate proximal geospatial location. In some embodiments, information indicating a traversed path of another vehicle may correspond with a traversed path of the host vehicle, and a portion of the traversed path information for the other vehicle may be identified as an expected path for the host vehicle. In some embodiments, the vehicle operation assistance information may be identified based on previous operation of one or more remote vehicles. For example, an aggregation of vehicle operational information corresponding to a geospatial location in the vehicle transportation network may indicate a statistical anomaly, such as statistical sharp drop in speed, which may indicate vehicles slowing down to avoid an unexpected road hazard, such as a pothole, or a series of small changes in trajectory, which may indicate vehicles swerving to avoid an unexpected road hazard, such as a pothole.

In some embodiments, the current expected path for the vehicle may intersect with the candidate proximal geospatial location, and evaluating the current expected path at 7900 may include determining a temporal cost for the vehicle to traverse the vehicle transportation network from the current geospatial location of the vehicle in the vehicle transportation network to the candidate proximal geospatial location.

In some embodiments, evaluating the current expected path at 7900 may include determining whether an immanency, such as such as the immanency identified as shown at 4200 in FIG. 4 or as shown in FIG. 5, exceeds the temporal cost for the vehicle to traverse the vehicle transportation network from the current geospatial location of the vehicle in the vehicle transportation network to the candidate proximal geospatial location.

In some embodiments, the immanency may exceed the temporal cost for the vehicle to traverse the vehicle transportation network from the current geospatial location of the vehicle in the vehicle transportation network to the candidate proximal geospatial location, and a low utility may be identified for the vehicle operation assistance information at 7910. In some embodiments, identifying a low utility for the vehicle operation assistance information at 7910 where the immanency exceeds the temporal cost for the vehicle to traverse the vehicle transportation network from the current geospatial location of the vehicle in the vehicle transportation network to the candidate proximal geospatial location may suppress the use of vehicle operation assistance information where vehicle operation assistance information representing a proximal geospatial location is available.

Figure 8:
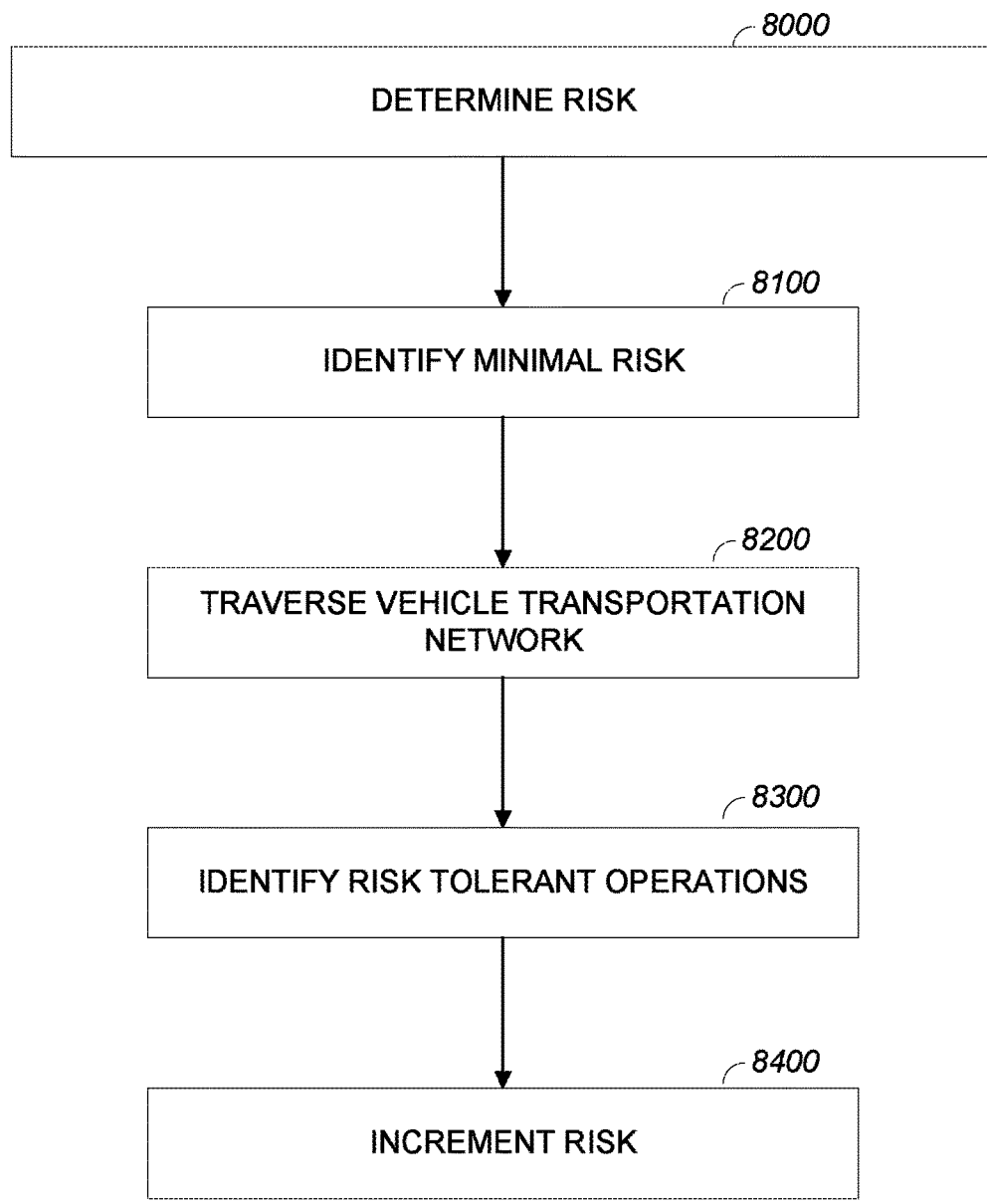
FIG. 8 is a diagram of determining a vehicle operation risk metric in accordance with this disclosure.

FIG. 8 is a diagram of determining a vehicle operation risk metric in accordance with this disclosure. In some embodiments, the vehicle operation risk metric may indicate a pattern, such as a risk tolerance pattern, associated with recent vehicle operations. In some embodiments, a high vehicle operation risk metric may indicate risk tolerant vehicle operation and a low vehicle operation risk metric may indicate risk intolerant vehicle operation. In some embodiments, determining a vehicle operation risk metric 8000 may be similar to the vehicle operation risk metric determination shown at 7200 in FIG. 7.

In some embodiments, the vehicle operation risk metric may be determined at 8000 based on recent vehicle operations, such as vehicle operations performed within a defined temporal period, such as two hours; vehicle operations performed after leaving a defined location, such as a home location or a work location defined for a driver of the vehicle; or vehicle operations performed after a defined event, such as a parked event.

In some embodiments, determining the vehicle operation risk metric at 8000 may include identifying a minimal vehicle operation risk metric at 8100, traversing a portion of the vehicle transportation network at 8200, identifying information indicating risk tolerant vehicle operation at 8300, incrementing the vehicle operation risk metric at 8400, or a combination thereof.

In some embodiments, a defined minimal vehicle operation risk metric may be identified at 8100. The defined minimal vehicle operation risk metric, which may be an integer value, such as zero, may indicate a minimal risk tolerance. In some embodiments, the defined minimal vehicle operation risk metric may be identified as the current vehicle operation risk metric. For example, the defined minimal vehicle operation risk metric may be identified as the current vehicle operation risk metric based on an event, such as the vehicle starting or powering up, the vehicle leaving the proximity of a defined geospatial location, such as a defined home location or a defined work location, detecting driver change for the vehicle, or any other event indicative of a likelihood that a previously identified vehicle operation risk metric is invalid. In some embodiments, risk tolerance metrics may be identified based on user input, such as a driver setting.

In some embodiments, the defined minimal vehicle operation risk metric identified at 8100 may be identified as the current vehicle operation risk metric in response to the vehicle traversing a portion of the vehicle transportation network. For example, the vehicle may traverse a portion of the vehicle transportation network that corresponds geospatially with a defined location or origin, such as a home location or a work location defined for a driver of the vehicle, and the defined minimal vehicle operation risk metric identified at 8100 may be identified as the current vehicle operation risk metric.

In some embodiments, the vehicle may traverse a portion of the vehicle transportation network at 8200 and information indicating risk tolerant vehicle operations may be identified at 8300.

In some embodiments, identifying information indicating risk tolerant vehicle operations at 8300 may include identifying one or more vehicle operation assistance information items temporally preceding a current vehicle operation assistance information, such as the vehicle operation assistance information identified as shown at 4100 in FIG. 4. Each of the identified temporally preceding vehicle operation assistance information items that indicates the warning urgency may correspond with risk tolerant vehicle operations.

In some embodiments, information indicating risk tolerant vehicle operations may be identified based on other vehicle operation information. For example, information indicating risk tolerant vehicle operations may be identified based on vehicle operation information indicating a high rate of acceleration, which may indicate a rate of acceleration greater than a defined comfortable rate of acceleration; a high rate of deceleration, which may indicate a rate of deceleration greater than a defined comfortable rate of deceleration; a high angular momentum, which may indicate an angular moment greater than a defined comfortable angular or turn momentum; or a lane change frequency. In some embodiments, information indicating risk tolerant vehicle operations may be identified based on identification of one or more conditions that may reduce driver attention, and risk tolerance may be reduced. In some embodiments, other information, such as a vehicle type, a driving mode profile, which may indicate vehicle configuration settings, such as handing and acceleration configuration settings. In some embodiments, information indicating risk tolerant vehicle operations may be identified based on non-operational information, such as the presence, age, size, or location in the vehicle, of passengers. For example, the presence of children in the back seat may indicate risk intolerant vehicle operation.

In some embodiments, the vehicle operation risk metric may be adjusted or incremented at 8400. In some embodiments, the vehicle operation risk metric may be adjusted or incremented at 8400 for each information item indicating risk tolerant vehicle operations identified at 8200. For example, for each of the identified temporally preceding vehicle operation assistance information items that indicates the warning urgency the vehicle operation risk metric may be incremented by a defined value, such as one.

Figure 9:
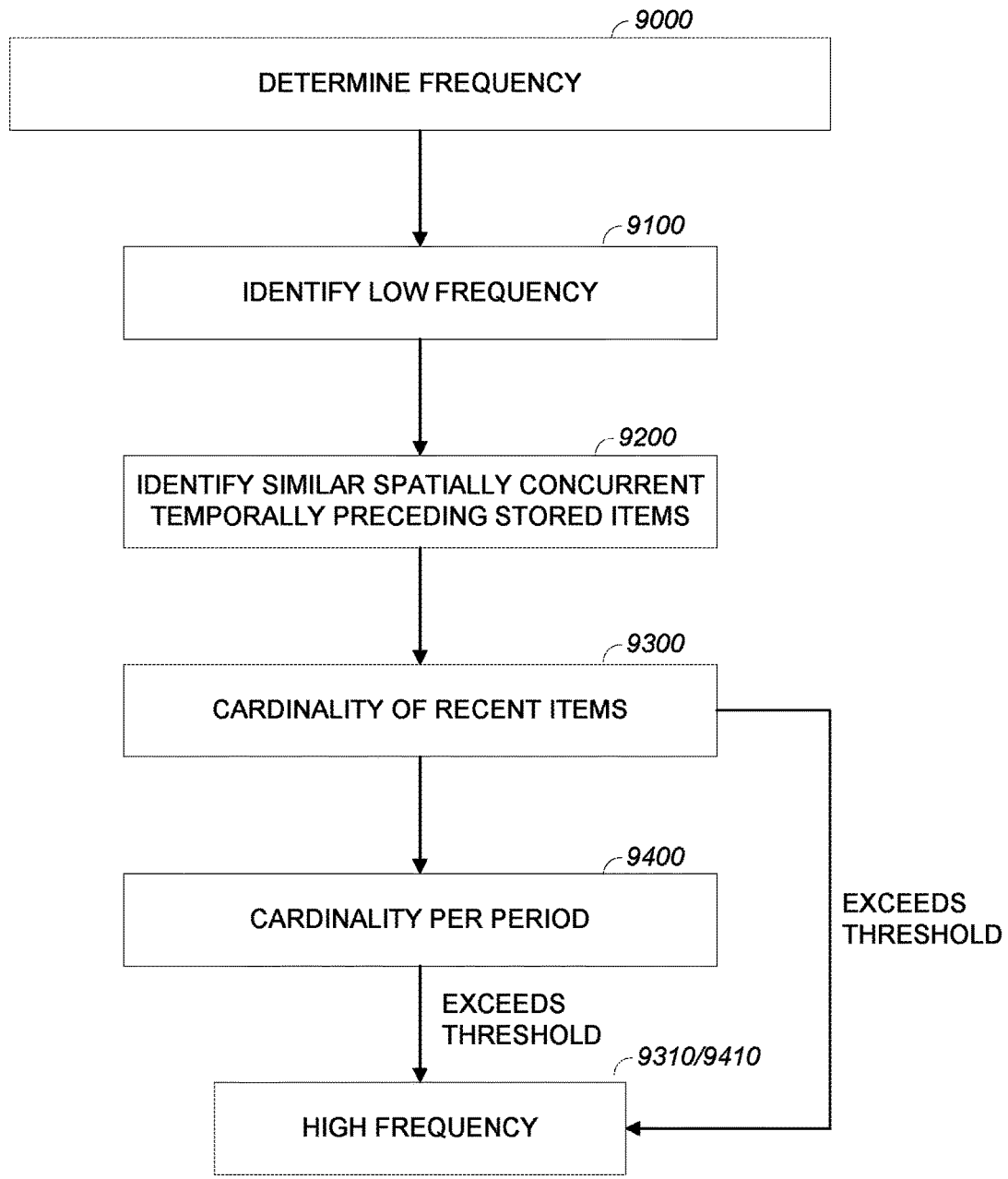
FIG. 9 is a diagram of determining a frequency metric in accordance with this disclosure.

FIG. 9 is a diagram of determining a frequency metric in accordance with this disclosure. In some embodiments, the frequency metric may represent a measure of how often, how recently, or a combination of how often and how recently, previously identified vehicle operation assistance information similar to a current vehicle operation assistance information item, such as the vehicle operation assistance information identified as shown at 4100 in FIG. 4, were identified. In some embodiments, determining the frequency metric at 9000 may be similar to the frequency determination shown at 7700 in FIG. 7.

In some embodiments, determining a frequency metric at 9000 may include identifying a defined low frequency at 9100, identifying a set of recent similar spatially concurrent temporally preceding stored vehicle operation assistance information items at 9200, determining a cardinality of the set of recent similar spatially concurrent temporally preceding stored vehicle operation assistance information items at 9300, determining per-period cardinalities for the set of recent similar spatially concurrent temporally preceding stored vehicle operation assistance information items at 9400, or a combination thereof.

In some embodiments, a frequency metric that indicates a low frequency may be identified at 9100. A frequency metric that indicates a low frequency may indicate that previously identified vehicle operation assistance information similar to the current vehicle operation assistance information is unavailable. For example, the current vehicle operation assistance information may indicate an expected status and the vehicle may not have previously traversed the current portion of the vehicle transportation network and a frequency metric that indicates a low frequency may be identified at 9100. In another example, the current vehicle operation assistance information may indicate an abnormal status and a frequency metric that indicates a low frequency may be identified at 9100.

In some embodiments, a set of spatially concurrent temporally preceding stored vehicle operation assistance information items may be identified at 9200. For example, multiple stored vehicle operation assistance information items temporally preceding the current vehicle operation assistance information item may be identified, each of the stored vehicle operation assistance information items temporally preceding the current vehicle operation assistance information item may indicate a geospatial location in the vehicle transportation network, and for each of the stored vehicle operation assistance information items temporally preceding the current vehicle operation assistance information item if a difference between a geospatial location in the vehicle transportation network indicated by the current vehicle operation assistance information and the respective geospatial location indicated by the stored temporally preceding vehicle operation assistance information item is within a defined geospatial threshold, the respective stored temporally preceding vehicle operation assistance information item may be identified as a spatially concurrent temporally preceding stored vehicle operation assistance information item. In some embodiments, each spatially concurrent temporally preceding stored vehicle operation assistance information item that indicates similar vehicle operation assistance information to the current vehicle operation assistance information item may be identified as a similar spatially concurrent temporally preceding stored vehicle operation assistance information item. In some embodiments, each similar spatially concurrent temporally preceding stored vehicle operation assistance information item may indicate a temporal location, and each similar spatially concurrent temporally preceding stored vehicle operation assistance information item that indicates a temporal location within a defined temporal distance, such as a time period of one month, from a temporal location indicated by the current vehicle operation assistance information may be included in a set of recent similar spatially concurrent temporally preceding stored vehicle operation assistance information items.

In some embodiments, a cardinality of the set of recent similar spatially concurrent temporally preceding stored vehicle operation assistance information items may be identified at 9300. In some embodiments, the cardinality of the set of recent similar spatially concurrent temporally preceding stored vehicle operation assistance information items may indicate how often the corresponding vehicle operation assistance information was presented to a driver of the vehicle in the preceding time period, which may indicate how familiar the driver is with the vehicle transportation network condition indicated by the vehicle operation assistance information. In some embodiments, the cardinality may be at least a frequency threshold defined for the temporal distance and a frequency metric that indicates a high frequency may be identified at 9310. For example, the temporal distance may be one month, the cardinality may be three, the frequency threshold defined for the one-month temporal distance may be 2, the cardinality may be at least the frequency threshold (3>=2), and a frequency metric that indicates a high frequency may be identified at 9310.

In some embodiments, per-period cardinalities for the set of recent similar spatially concurrent temporally preceding stored vehicle operation assistance information items may be determined at 9400. Determining the per-period cardinalities at 9400 may be similar to determining the cardinality at 9300, except that the set of recent similar spatially concurrent temporally preceding stored vehicle operation assistance information items may be grouped temporarily to identify multiple sets of recent similar spatially concurrent temporally preceding stored vehicle operation assistance information items, each set corresponding to a respective time period, such as one week, in a sequence, such as the weeks in a month. In some embodiments, a cardinality of recent similar spatially concurrent temporally preceding stored vehicle operation assistance information items may be identified for each period. In some embodiments, each period that has a cardinality of recent similar spatially concurrent temporally preceding stored vehicle operation assistance information items that exceeds a frequency threshold defined for the temporal distance of the period may be identified as an active period. For example, each period may represent a week, the frequency threshold defined per week may be one, and each week that includes at least one spatially concurrent temporally preceding stored vehicle operation assistance information item may be identified as an active week. In some embodiments, a cardinality of active weeks within the temporal distance, which may include four week long periods, may be three, may be greater than an active period frequency threshold defined for the temporal distance of the periods, and a frequency metric that indicates a high frequency may be identified at 9410. For example, the temporal distance may include four week long periods, the frequency threshold defined for each week may be one, three of the weeks may include at least one recent similar spatially concurrent temporally preceding stored vehicle operation assistance information item, the active period frequency threshold may be three, the cardinality of active periods may be at least the active period frequency threshold (3>=3), and a frequency metric that indicates a high frequency may be identified at 9410.

Identifying a frequency metric that indicates a high frequency at 9310/9410 may indicate that the vehicle operation assistance information is familiar and may suppress the use of familiar vehicle operation assistance information.

In some embodiments, the frequency may be associated with a driver of the vehicle. For example, a driver of the vehicle may be identified based on a credential, such as a key fob, associated with the driver, or based on a wireless electronic communication link, such as a Bluetooth link, with a portable electronic device, such as a smartphone, associated with the driver, and the frequency may be determined based on stored information associated with the identified driver.

Although not shown separately in FIG. 9, in some embodiments, whether vehicle operation assistance information indicates an expected state or an abnormal state may be determined based on remote vehicle operation information, which may include information received from the remote vehicles, information generated based on sensor information corresponding to the remote vehicles, or a combination thereof. For example, remote vehicle operation information indicating erratic or urgent vehicle operations, such as vehicle operations exceeding defined remote vehicle operational parameters, which may be similar to the acceptability metrics, may indicate that the corresponding vehicle operation assistance information indicates an abnormal state.

Figure 10:
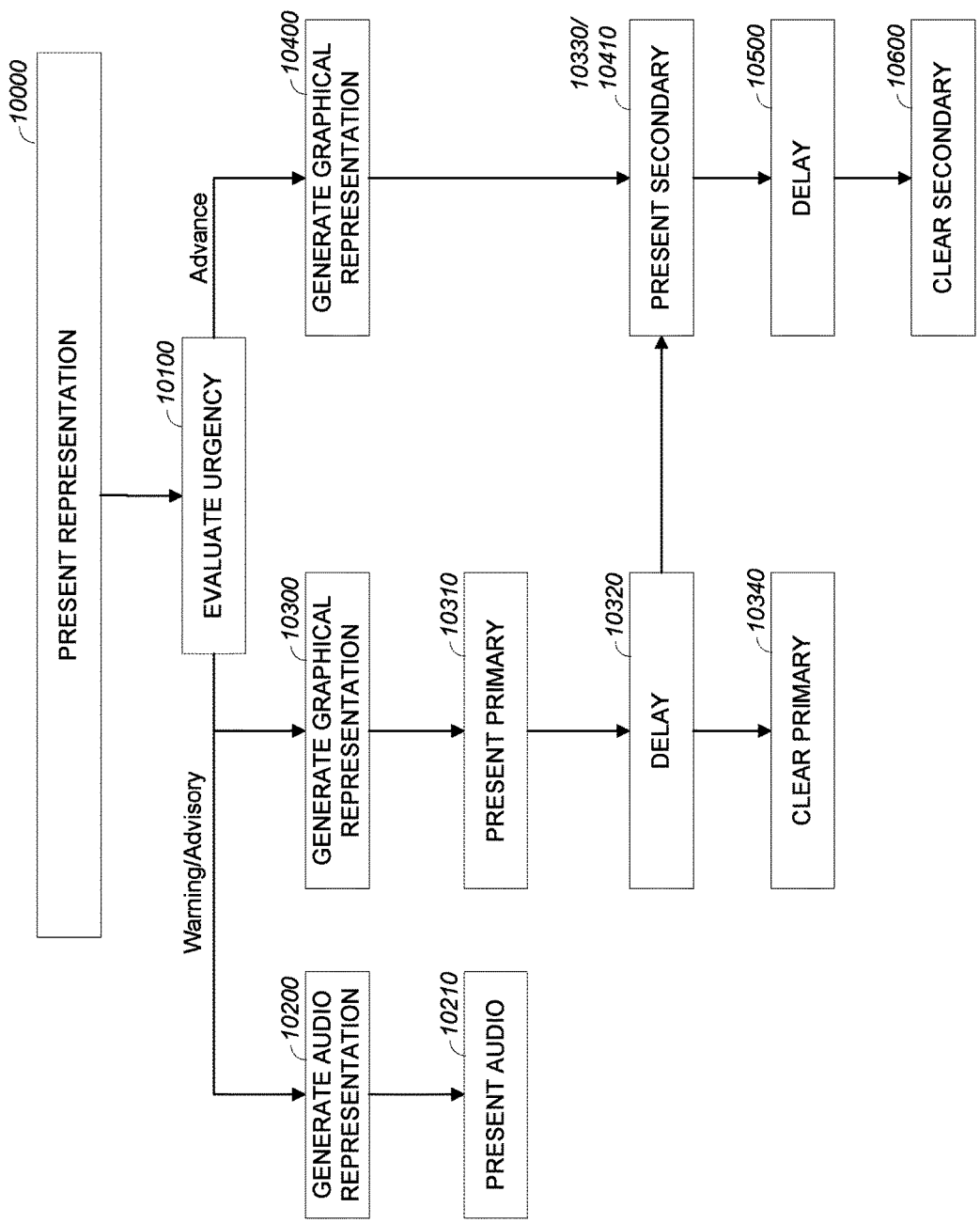
FIG. 10 is a diagram of presenting a representation of vehicle operation assistance information in accordance with this disclosure.

FIG. 10 is a diagram of presenting a representation of vehicle operation assistance information in accordance with this disclosure. In some embodiments, presenting a representation of vehicle operation assistance information, such as the vehicle operation assistance information identified as shown at 4100 in FIG. 4, may include generating and outputting one or more auditory representations of the vehicle operation assistance information, one or more visual, or graphical, representations of the vehicle operation assistance information, one or more tactile representations of the vehicle operation assistance information, or a combination thereof, for presentation to a driver, or other passenger, of the vehicle. In some embodiments, presenting a representation of vehicle operation assistance information 10000 may be similar to the presenting shown at 4500 in FIG. 4.

Figure 13:
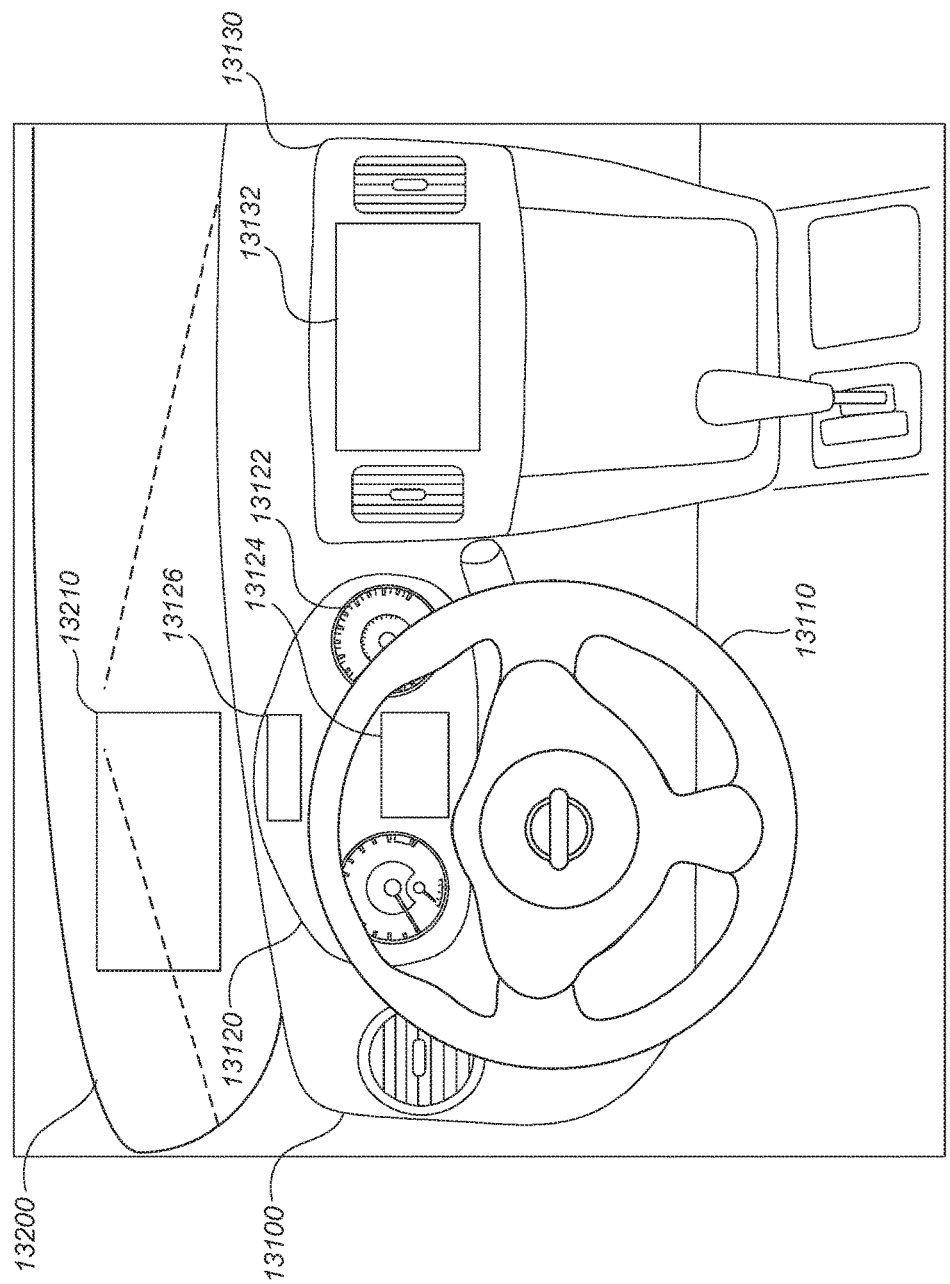
FIG. 13 is a diagram of a portion of the front of a passenger compartment of a vehicle for vehicle operation assistance information management in accordance with this disclosure.
Figure 14:
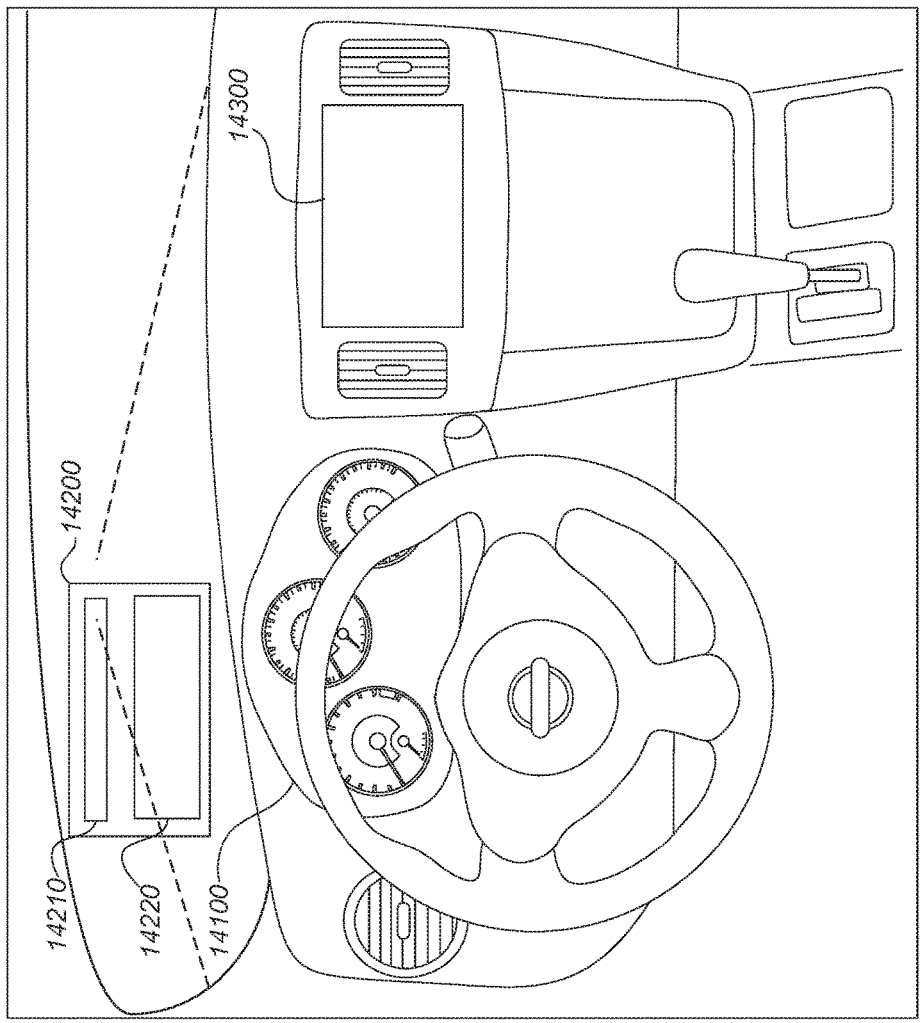
FIG. 14 is another diagram of a portion of the front of a passenger compartment of a vehicle for vehicle operation assistance information management in accordance with this disclosure.
Figure 15:
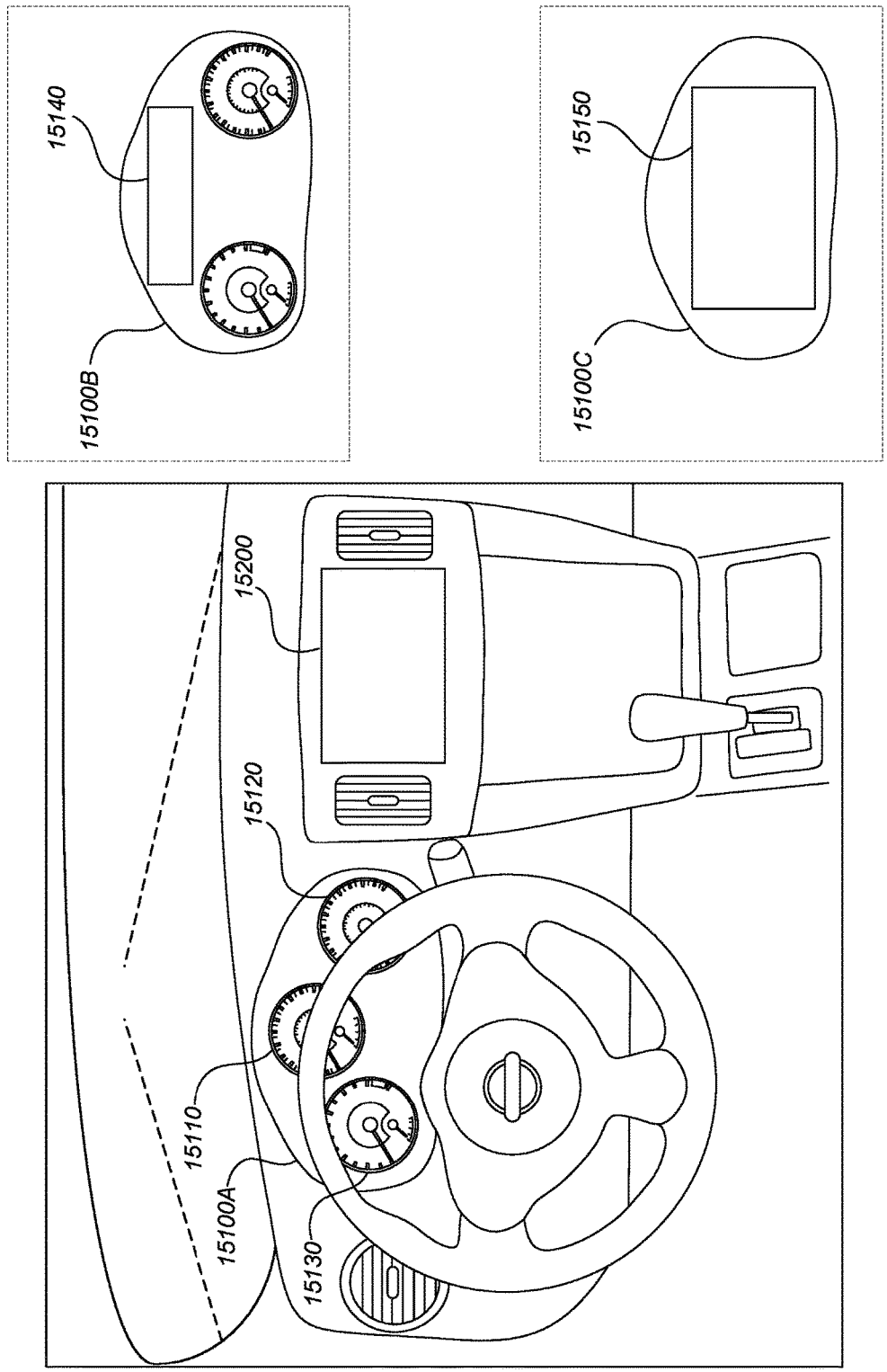
FIG. 15 is another diagram of a portion of the front of a passenger compartment of a vehicle for vehicle operation assistance information management in accordance with this disclosure.

In some embodiments, a vehicle, such as the vehicle 1000 shown in FIG. 1, the vehicles 2100/2110 shown in FIG. 2, or the host vehicle 3200 shown in FIG. 3, may present vehicle operation assistance information via one more user interface units, such as the user interface 1350 shown in FIG. 1. For example, a vehicle may include one or more graphical display portions, one or more audio presentation devises, or a combination of audio presentation devices and graphical display portions, and vehicle operation assistance information may be presented via the user interface units, or a portion thereof. FIGS. 13-15 show diagrams of examples of vehicles including graphical display portions for presenting vehicle operation assistance information.

In some embodiments, presenting a representation of vehicle operation assistance information at 10000 may include evaluating an urgency for the vehicle operation assistance information at 10100, generating an audio presentation at 10200, presenting the audio presentation at 10210, generating a graphical presentation at 10300, presenting a primary portion of the graphical presentation at 10310, delaying at 10320, presenting a secondary portion of the graphical presentation at 10330, clearing the primary portion at 10340, generating a graphical presentation at 10400, presenting the graphical presentation at 10410, delaying at 10500, clearing the secondary portion at 10600, or a combination thereof.

In some embodiments, an urgency, such as the current urgency identified as shown at 4300 in FIG. 4 or as shown in FIG. 6, for vehicle operation assistance information, such as the vehicle operation assistance information identified as shown at 4100 in FIG. 4, may be evaluated at 10100.

In some embodiments, the vehicle operation assistance information evaluated at 10100 may indicate a warning urgency or an advisory urgency and an audible representation of the vehicle operation assistance information may be generated at 10200 and presented at 10210. In some embodiments, generating audible representation of the vehicle operation assistance information may include evaluating the urgency. In some embodiments, the urgency for the vehicle operation assistance information may indicate the advance urgency and generating the audible representation of the vehicle operation assistance information at 10200 and presenting the audible representation of the vehicle operation assistance information at 10210 may be omitted. In some embodiments, the urgency for the vehicle operation assistance information may be the advisory urgency and generating the audible representation of the vehicle operation assistance information at 10200 may include identifying an advisory audible representation of the vehicle operation assistance information, such as a soft chirp, beep, or chime, or a short sequence thereof, such as two or three soft chimes. In some embodiments, the urgency for the vehicle operation assistance information may be the warning urgency and generating the audible representation of the vehicle operation assistance information at 10200 may include identifying a warning audible representation of the vehicle operation assistance information, which may include an internal representation and an external representation. The warning internal audible representation may be similar to the advisory audible representation, except that the warning internal audible representation may be louder, longer, or both. For example, the advisory audible representation may include three relatively quiet chimes and the warning internal audible representation may include five relatively loud chimes. The external warning audible representation may include sounding a horn of the vehicle once or in a series, such as two or three short beeps.

Although not shown separately in FIG. 10, in some embodiments, the representation of the vehicle operation assistance information, or a portion thereof, such as the audible representation, the graphical representation of the vehicle operation assistance information presented via the primary graphical display portion, the graphical representation of the vehicle operation assistance information presented via the secondary graphical display portion, may be suppressed, omitted, or cleared, in response to input, such as user input clearing the vehicle operation assistance information presentation or based on a configuration setting. In some embodiments, vehicle operation assistance information management may include determining whether to present the vehicle operation assistance information using the primary graphical display portion, the secondary graphical display portion, the audible presentation device, one or more tactile presentation units, or a combination thereof. In some embodiments, presenting the vehicle operation assistance information using the primary graphical display portion, the secondary graphical display portion, the audible presentation device, one or more tactile presentation units, or a combination thereof, may include evaluating vehicle operation assistance information presentation configuration settings. For example, the frequency, or relative loudness of the audible presentation may be determined based on corresponding vehicle operation assistance information presentation configuration settings.

Figure 17:
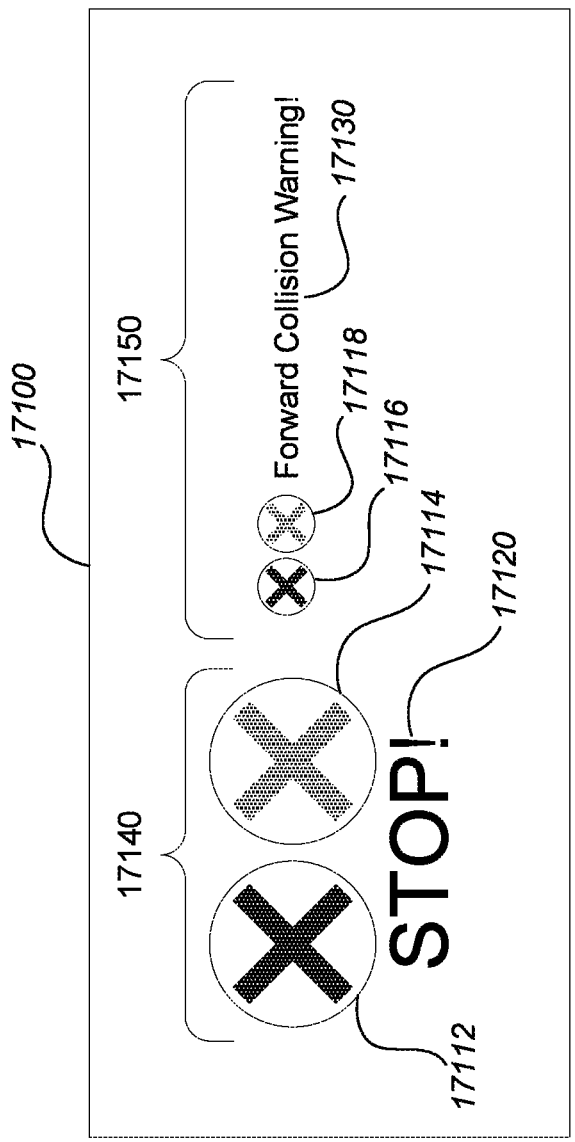
FIG. 17 shows examples of a graphical representation of vehicle operation assistance information in accordance with this disclosure.

In some embodiments, the vehicle operation assistance information evaluated at 10100 may indicate a warning urgency or an advisory urgency and a graphical, or visual, representation of the vehicle operation assistance information be identified or generated at 10300. Generating, or identifying, the graphical representation of the vehicle operation assistance information may include identifying, or generating, one or more pictographic representations of the vehicle operation assistance information, identifying one or more text representations of the vehicle operation assistance information, identifying one or more verbal descriptions of the vehicle operation assistance information, or a combination thereof. Examples of pictographic representation, text representations, and verbal descriptions, of the vehicle operation assistance information are shown in FIG. 17.

In some embodiments, the graphical representation of the vehicle operation assistance information may be presented via the primary graphical display portion at 10310. In some embodiments, presenting the graphical representation of the vehicle operation assistance information via the primary graphical display portion at 10310 may be similar the primary presentation shown in FIG. 11.

In some embodiments, a primary delay timer, or other temporal delay, may be initiated at 10320. For example, a primary delay timer may be initiated at 10320 in response to, or in conjunction with, presenting the graphical representation of the vehicle operation assistance information via the primary graphical display portion at 10310.

In some embodiments, the graphical representation of the vehicle operation assistance information may be presented via the secondary graphical display portion at 10330. In some embodiments, the graphical representation of the vehicle operation assistance information may be presented via the secondary graphical display portion at 10330 in response to detecting the primary delay timer initiated at 10320 exceeding a defined secondary display delay, such as one second. In some embodiments, presenting the secondary portion at 10330 may be similar the secondary presentation shown in FIG. 12.

In some embodiments, the primary portion may be cleared at 10340. In some embodiments, the graphical representation of the vehicle operation assistance information presented via the primary graphical display portion at 10310 may be cleared, or omitted from the primary graphical display portion, in response to an event, such as detecting the primary delay timer initiated at 10320 exceeding a defined primary display duration, such as three seconds, detecting that the vehicle traversed the vehicle transportation network in accordance with the vehicle control action, or otherwise determining that the vehicle operation assistance information is no longer relevant.

In some embodiments, the vehicle operation assistance information evaluated at 10100 may indicate an advance urgency and a graphical, or visual, representation of the vehicle operation assistance information be generated at 10400. Generating, or identifying, the graphical representation of the vehicle operation assistance information may include identifying, or generating, one or more pictographic representations of the vehicle operation assistance information, identifying one or more verbal descriptions of the vehicle operation assistance information, or a combination thereof. Examples of pictographic representation, text representations, and verbal descriptions, of the vehicle operation assistance information are shown in FIG. 17.

In some embodiments, the graphical representation of the vehicle operation assistance information may be presented via the secondary graphical display portion at 10410. In some embodiments, presenting the representation at 10410 may be similar the secondary presentation shown in FIG. 12.

In some embodiments, a secondary delay timer, or other temporal delay, may be initiated at 10500. For example, a secondary delay timer may be initiated at 10500 in response to, or in conjunction with, presenting the graphical representation of the vehicle operation assistance information via the secondary graphical display portion 10330/10410.

In some embodiments, the secondary portion may be cleared at 10600. In some embodiments, the graphical representation of the vehicle operation assistance information presented via the secondary graphical display portion at 10330/10410 may be cleared, or omitted from the primary graphical display portion, in response to an event, such as detecting the secondary delay timer initiated at 10500 exceeding a defined secondary display duration, such as five seconds, detecting that the vehicle traversed the vehicle transportation network in accordance with the vehicle control action, or otherwise determining that the vehicle operation assistance information is no longer relevant.

Although not shown separately in FIG. 10, in some embodiments, presentations representing defined vehicle operation assistance information may be generated, or identified, and presented in response to input, such as user input selecting the presentations, such that a user, such as a driver of the vehicle, may review, configure, or both, the presentations representing vehicle operation assistance information.

Figure 11:
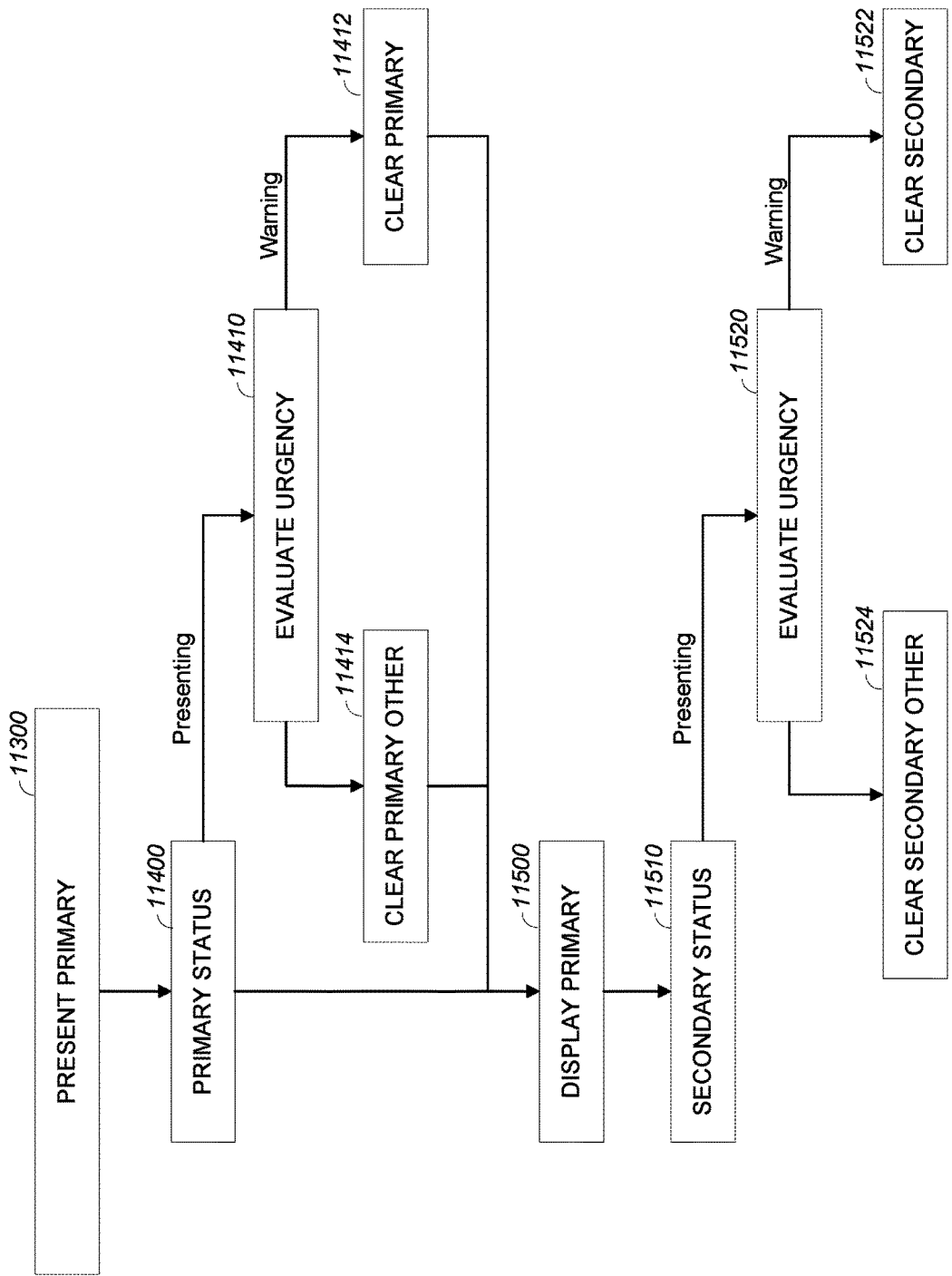
FIG. 11 is a diagram of presenting a graphical representation of the vehicle operation assistance information via a primary graphical display portion in accordance with this disclosure.

FIG. 11 is a diagram of presenting a graphical representation of the vehicle operation assistance information via a primary graphical display portion in accordance with this disclosure. In some embodiments, presenting a graphical representation of the vehicle operation assistance information presented via a primary graphical display portion 11000 may be similar to the primary presenting shown at 10310 in FIG. 10.

In some embodiments, presenting the graphical representation of the vehicle operation assistance information via the primary graphical display portion at 11300 may include identifying a current presentation status for the primary graphical display portion at 11400, evaluating the urgency at 11410, clearing the primary graphical display portion, or a portion thereof at 11412/11414, displaying a portion of the graphical representation of the vehicle operation assistance information presented via the primary graphical display portion at 11500, identifying a current presentation status for the secondary graphical display portion at 11510, evaluating the urgency at 11520, clearing the primary graphical display portion, or a portion thereof at 11522/11524, or a combination thereof.

In some embodiments, identifying the current presentation status for the primary graphical display portion at 11400 may include determining whether the primary graphical display portion is currently displaying information, such as other vehicle operation assistance information, navigation information, or other information, such as non-vehicle operation assistance information.

In some embodiments, the current presentation status for the primary graphical display portion may indicate that the primary graphical display portion is displaying information, and the urgency may be evaluated at 11410. In some embodiments, the urgency may indicate a warning urgency and the primary graphical display portion may be cleared at 11412. In some embodiments, the urgency may indicate an advisory urgency, the current presentation status for the primary graphical display portion may indicate that the primary graphical display portion is displaying other information, such as non-vehicle operation assistance information, and the other information may be cleared at 11414. In some embodiments, the urgency may indicate an advisory urgency, the current presentation status for the primary graphical display portion may indicate that the primary graphical display portion is displaying navigation information, and the navigation information may be cleared at 11414. In some embodiments, clearing the navigation information at 11414 may be omitted.

In some embodiments, the current presentation status for the primary graphical display portion may indicate that the primary graphical display portion is not displaying information, and evaluating the urgency at 11410 and clearing the primary graphical display portion, or a portion thereof at 11412/11414 may be omitted.

In some embodiments, a portion of the graphical representation of the vehicle operation assistance information may be presented via the primary graphical display portion at 11500. In some embodiments, presenting the graphical representation of the vehicle operation assistance information via the primary graphical display portion at 11500 may include presenting a first portion of the graphical representation of the vehicle operation assistance information, such as the portion shown at 17140 in FIG. 17, which may include a large pictographic representation of the vehicle operation assistance information, such as the large pictographic representation shown at 17112/17114 in FIG. 17, and a text representation of the vehicle operation assistance information, such as the text representation shown at 17120 in FIG. 17. In some embodiments, the current presentation status for the primary graphical display portion may indicate that the primary graphical display portion is displaying navigation information and presenting the graphical representation of the vehicle operation assistance information via the primary graphical display portion at 11500 may include combining a portion of the graphical representation of the vehicle operation assistance information with the representation of the navigation information, and presenting the combined representation.

In some embodiments, a current presentation status for the secondary graphical display portion may be identified at 11510. In some embodiments, identifying the current presentation status for the secondary graphical display portion at 11510 may include determining whether the secondary graphical display portion is currently displaying information, such as other vehicle operation assistance information, navigation information, or other information, such as non-vehicle operation assistance information.

In some embodiments, the urgency may be evaluated at 11520. In some embodiments, the urgency may indicate a warning urgency and the secondary graphical display portion may be cleared at 11522. In some embodiments, the urgency may indicate an advisory urgency, the current presentation status for the secondary graphical display portion may indicate that the secondary graphical display portion is displaying other information, such as non-vehicle operation assistance information, and the other information may be cleared at 11524. In some embodiments, the urgency may indicate an advisory urgency, the current presentation status for the secondary graphical display portion may indicate that the secondary graphical display portion is displaying navigation information, and the navigation information may be cleared at 11524. In some embodiments, clearing the navigation information at 11524 may be omitted.

In some embodiments, the current presentation status for the secondary graphical display portion may indicate that the secondary graphical display portion is not displaying information, and evaluating the urgency at 11520 and clearing the secondary graphical display portion, or a portion thereof at 11522/11524 may be omitted.

Figure 12:
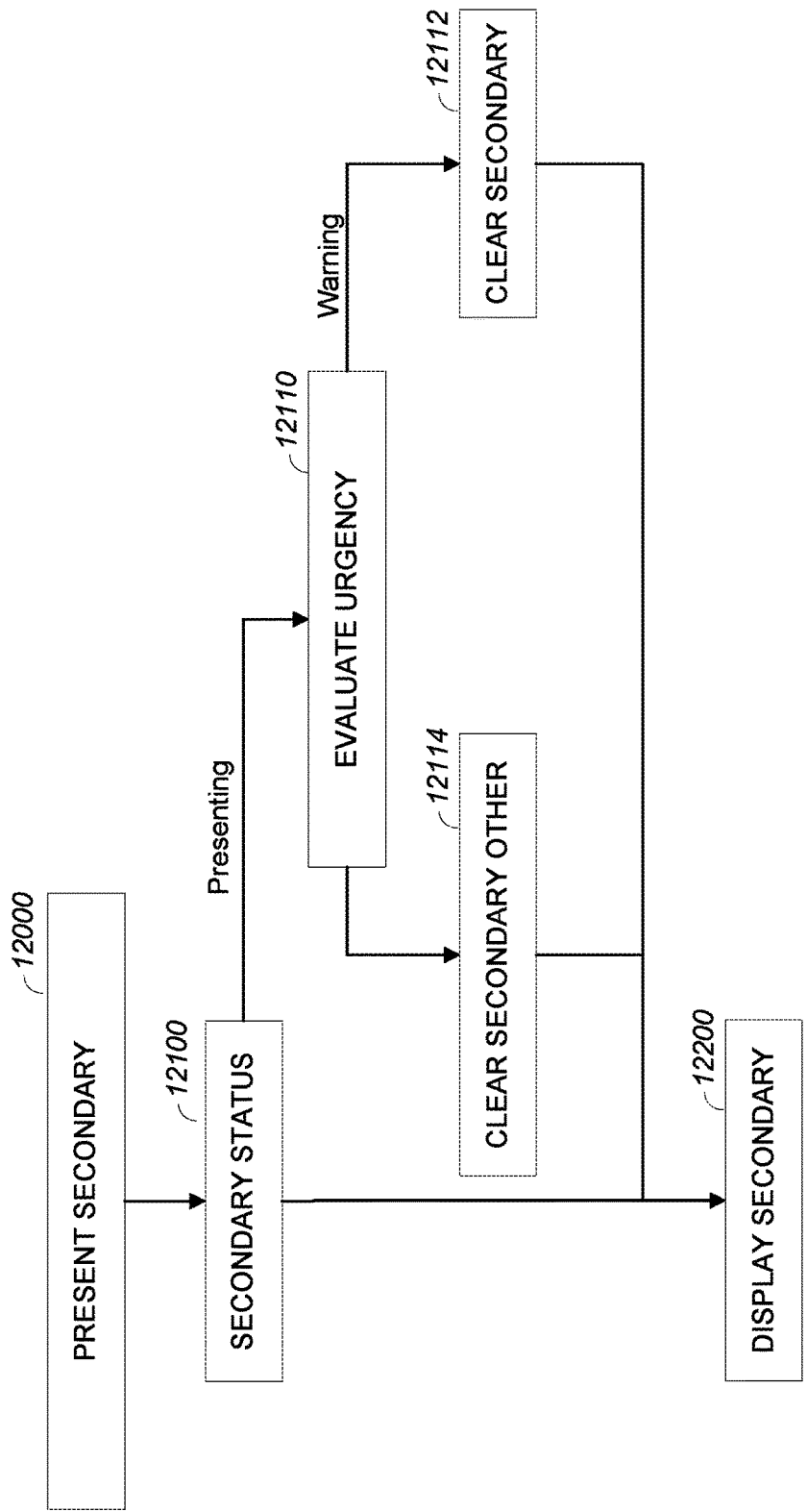
FIG. 12 is a diagram of presenting a graphical representation of the vehicle operation assistance information via a secondary graphical display portion in accordance with this disclosure.

FIG. 12 is a diagram of presenting a graphical representation of the vehicle operation assistance information via a secondary graphical display portion in accordance with this disclosure. In some embodiments, presenting a secondary portion of a representation of vehicle operation assistance information 12000 may be similar to the secondary presenting shown at 10330/10410 in FIG. 10.

In some embodiments, presenting the graphical representation of the vehicle operation assistance information via the secondary graphical display portion at 12000 may include identifying a current presentation status for the secondary graphical display portion at 12100, evaluating the urgency at 12110, clearing the secondary graphical display portion, or a portion thereof at 12112/12114, displaying a portion of the graphical representation of the vehicle operation assistance information presented via the secondary graphical display portion at 12200, or a combination thereof.

In some embodiments, identifying the current presentation status for the secondary graphical display portion at 12100 may include determining whether the secondary graphical display portion is currently displaying information, such as other vehicle operation assistance information, navigation information, or other information, such as non-vehicle operation assistance information.

In some embodiments, the current presentation status for the secondary graphical display portion may indicate that the secondary graphical display portion is displaying information, and the urgency may be evaluated at 12110. In some embodiments, the urgency may indicate a warning urgency and the secondary graphical display portion may be cleared at 12112. In some embodiments, the urgency may indicate an advisory urgency or an advance urgency, the current presentation status for the secondary graphical display portion may indicate that the secondary graphical display portion is displaying other information, such as non-vehicle operation assistance information, and the other information may be cleared at 12114. In some embodiments, the urgency may indicate an advisory urgency or an advance urgency, the current presentation status for the secondary graphical display portion may indicate that the secondary graphical display portion is displaying navigation information, and the navigation information may be cleared at 12114. In some embodiments, clearing the navigation information at 12114 may be omitted.

In some embodiments, the current presentation status for the secondary graphical display portion may indicate that the secondary graphical display portion is not displaying information, and evaluating the urgency at 12110 and clearing the secondary graphical display portion, or a portion thereof at 12112/12114 may be omitted.

In some embodiments, a portion of the graphical representation of the vehicle operation assistance information may be presented via the secondary graphical display portion at 12200. In some embodiments, presenting the graphical representation of the vehicle operation assistance information via the secondary graphical display portion at 12200 may include presenting a second portion of the graphical representation of the vehicle operation assistance information, such as the portion shown at 14150 in FIG. 17, which may include a small pictographic representation of the vehicle operation assistance information, such as the small pictographic representation shown at 17116/17118 in FIG. 17, and a verbal description of the vehicle operation assistance information, such as the verbal description shown at 17130 in FIG. 17. In some embodiments, the current presentation status for the secondary graphical display portion may indicate that the secondary graphical display portion is displaying navigation information and presenting the graphical representation of the vehicle operation assistance information via the secondary graphical display portion at 12200 may include combining a portion of the graphical representation of the vehicle operation assistance information with the representation of the navigation information, and presenting the combined representation.

FIGS. 13-16 show diagrams of portions of a front of a passenger compartment of a vehicle for vehicle operation assistance information management in accordance with this disclosure. The examples shown in FIGS. 13-16 include graphical display portions; however, although not shown in FIGS. 13-16, a vehicle may include other elements for use in vehicle operation assistance information management, such as one or more interior auditory presentation devices, one or more exterior auditory presentation devices, one or more tactile presentation units, one or more exterior visual presentation devices, or a combination thereof.

In some embodiments, the passenger compartment of a vehicle may include one or more interior auditory presentation devices, such as speakers, which may, individually, or in combination, present audible information, such as the audible presentation shown at 10210 in FIG. 10, for use in vehicle operation assistance information management. For example, one or more speakers may audibly present a chime or beep, or a series thereof, representing or indicating vehicle operation assistance information. In some embodiments, the vehicle may include a dedicated vehicle operation assistance information auditory presentation device, which may be located proximate to the primary display portion.

In some embodiments, the vehicle may include one or more external auditory presentation devices, such as a horn, which may, individually, or in combination, present audible information, such as the audible presentation shown at 10210 in FIG. 10, for use in vehicle operation assistance information management. For example, the horn may sound one or more times, representing or indicating vehicle operation assistance information.

In some embodiments, the vehicle may include one or more tactile user interface units, such as a haptic feedback unit, which may, individually, or in combination, present tactile information for use in vehicle operation assistance information management. For example, the vehicle may include a seat, which may include a tactile user interface unit, which may vibrate one or more times, representing or indicating vehicle operation assistance information. In another example, the vehicle may include a steering wheel that may include a left side tactile user interface unit and a right side tactile user interface unit. The left side tactile user interface unit may present tactile information corresponding to vehicle operation assistance information to the left of the vehicle, the right side tactile user interface unit may present tactile information corresponding to vehicle operation assistance information to the right of the vehicle, and both tactile user interface units may present tactile information corresponding to vehicle operation assistance information ahead of the vehicle. In another example, a pedal, such as an acceleration pedal, may include a tactile user interface unit, which may present tactile information corresponding to vehicle operation assistance information.

In some embodiments, the vehicle may include one or more exterior visual presentation units, such as headlights, which may, individually, or in combination, externally present visual information for use in vehicle operation assistance information management. For example, the headlights may flash one or more times, representing or indicating vehicle operation assistance information.

In some embodiments, presenting vehicle operation assistance information may include presenting the vehicle operation assistance information using a combination of the user interface units. For example, the vehicle operation assistance information may indicate a potential front impact collision warning, and presenting the vehicle operation assistance information may include contemporaneously sounding the horn, playing a sequence of beeps via the speakers, vibrating the seat, flashing the headlights, and displaying a graphical representation of the vehicle operation assistance information via a primary graphical display portion.

In some embodiments, the graphical display portions may graphically, or visually, present information, such as vehicle operation assistance information, navigation information, or other information, which may include audio system information, systems information, or any other information other than vehicle operation assistance information and navigation information. In some embodiments, one or more of the graphical display portions may be a dedicated primary graphical display portion. A dedicated primary graphical display portion may omit presenting information other than vehicle operation assistance information.

In some embodiments, a vehicle may include one or more tertiary graphical or visual display portions and vehicle operation assistance information management may include omitting presenting vehicle operation assistance information via the tertiary graphical or visual display portions, which may reduce driver confusion or distraction.

Figure 16:
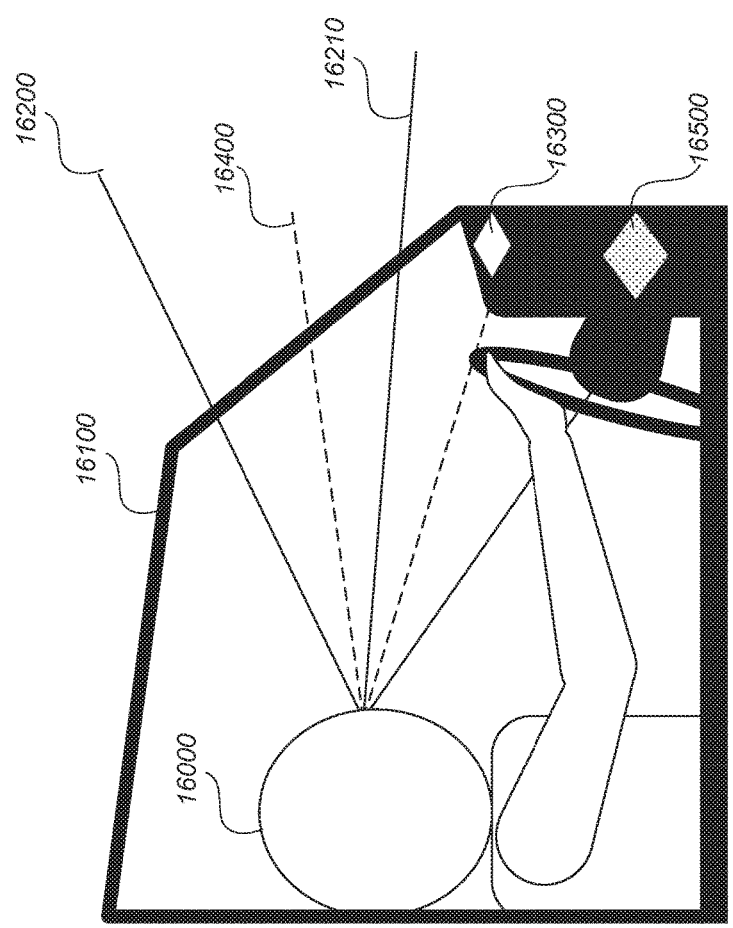
FIG. 16 is a diagram of positioning vehicle operation assistance information graphical presentations within a vehicle in accordance with this disclosure.

Although example configurations of portions of a front of a passenger compartment of a vehicle are shown in FIGS. 13-16; any alignment, positioning, or configuration of any of the elements shown in FIGS. 13-16, or otherwise described herein, may be used. In some embodiments, vehicle operation assistance information management may include positioning the graphical display portions within the vehicle as shown in FIG. 16.

FIG. 13 is a diagram of a portion of the front of a passenger compartment of a vehicle for vehicle operation assistance information management in accordance with this disclosure. In some embodiments, a vehicle, such as the vehicle 1000 shown in FIG. 1 or the vehicles 2100/2110 shown in FIG. 2, may include an instrument panel 13100, a windshield 13200, or a combination thereof.

In some embodiments, the instrument panel 13100 may include a steering wheel 13110, a meter cluster 13120, a center console 13130, or a combination thereof.

In some embodiments, the steering wheel 13110 may extend from the instrument panel 13100 along a center column (not shown), and may include steering wheel controls (not expressly shown). In some embodiments, the steering wheel 13110 may include one or more user interface units (not shown), such as one or more tactile user interface units, one or more speakers, one or more graphical display units, or a combination thereof.

In some embodiments, the meter cluster 13120 may include one or more meters or gauges 13122, such as a speedometer or a tachometer. In some embodiments, the meter cluster 13120 may include one or more graphical display portions 13124/13126. For example, the graphical display portion 13126 at the top of the meter cluster 13120 may be a primary graphical display portion, and the graphical display portion 13124 at the bottom of the meter cluster 13120 may be a secondary graphical display portion. In another example, the graphical display portion 13124 at the bottom of the meter cluster 13120 may be omitted. In another example, the graphical display portion 13126 at the top of the meter cluster 13120 may be omitted and the graphical display portion 13124 at the bottom of the meter cluster 13120 may be may be a primary graphical display portion.

In some embodiments, the graphical display portion 13126 at the top of the meter cluster 13120 and the graphical display portion 13124 at the bottom of the meter cluster 13120 may be included in a single physical graphical display unit. In some embodiments, the graphical display portion 13126 at the top of the meter cluster 13120 may be included in a first physical graphical display unit and the graphical display portion 13124 at the bottom of the meter cluster 13120 may be included in a second physical graphical display unit.

In some embodiments, the center console 13130 may include one or more graphical display portions 13132. For example, the meter cluster 13120 may include the primary graphical display portion 13126 at the top of the meter cluster 13120 and the center console 13130 may include the secondary graphical display portion 13132. In another example, the meter cluster 13120 may include the primary graphical display portion 13124 at the bottom of the meter cluster 13120 and the center console 13130 may include the secondary graphical display portion 13132.

In some embodiments, the windshield 13200 may include a graphical display portion 13210. For example, the windshield 13200 may include a primary graphical display portion, a secondary graphical display portion, or both. In some embodiments, the graphical display portion 13210 included in the windshield 13200 may be a heads-up, or augmented reality display. In some embodiments, the windshield 13200 may include the graphical display portion 13210 in a translucent physical graphical display device. In some embodiments, the graphical display portion 13210 may be projected on the windshield by a projector device (not separately shown), which may be physically separate from the windshield.

FIG. 14 is another diagram of a portion of the front of a passenger compartment of a vehicle for vehicle operation assistance information management in accordance with this disclosure. The example shown in FIG. 14 may be similar to the example shown in FIG. 13, except that the meter cluster 14100 may omit the primary graphical display portion and the secondary graphical display portion, and the heads-up display 14200 may include a primary graphical display portion 14210 and a secondary graphical display portion 14220. In some embodiments, the center console graphical display unit 14300 may omit the primary graphical display portion and the secondary graphical display portion. In another example, the heads-up display 14200 may include the primary graphical display portion 14210 and omit the secondary graphical display portion 14220, and the center console graphical display unit 14300 may include the secondary graphical display portion.

FIG. 15 is another diagram of a portion of the front of a passenger compartment of a vehicle for vehicle operation assistance information management in accordance with this disclosure. The example shown in FIG. 15 may be similar to the example shown in FIG. 13, except as described herein.

In some embodiments, the vehicle may include a primary graphical display portion 15100 in a meter cluster aligned with the steering wheel, and may include a secondary graphical display portion 15200 in a center console adjacent to the steering wheel. As shown on the left, the primary graphical display portion 15100A may include one or more virtual meters 15110/15120/15130 and may omit vehicle operation assistance information. Vehicle operation assistance information management may include controlling the primary graphical display portion 15100 and the secondary graphical display portion 15200 to display vehicle operation assistance information.

For example, vehicle operation assistance information management may include controlling the graphical display unit in the meter cluster 15100A to display the meters 15110/15120/15130. Subsequently, vehicle operation assistance information management may include identifying vehicle operation assistance information, as shown at 4100 in FIG. 4. Vehicle operation assistance information management may include determining an urgency for the vehicle operation assistance information, as shown at 4300 in FIG. 4 or as shown in FIG. 6. The urgency may be the advance urgency and vehicle operation assistance information management may include controlling the secondary graphical display portion 15200 to present a graphical representation of the vehicle operation assistance information.

In another example, as shown at the top-right, vehicle operation assistance information management may include identifying the urgency as the advisory urgency or the warning urgency, and may control the primary graphical display portion 15100B to omit one or more of the meters 15110/15120/15130, such as the center meter 15110 as shown, and present a portion 15140 of the graphical representation of the vehicle operation assistance information. Vehicle operation assistance information management may include controlling the secondary graphical display portion 15200 to present a second portion of the graphical representation of the vehicle operation assistance information.

In another example, as shown at the bottom-right, vehicle operation assistance information management may include identifying the urgency as the advisory urgency or the warning urgency, and may control the primary graphical display portion 15100C to omit the meters 15110/15120/15130 and present a portion 15150 of the graphical representation of the vehicle operation assistance information. Vehicle operation assistance information management may include controlling the secondary graphical display portion 15200 to present a second portion of the graphical representation of the vehicle operation assistance information.

In another example, vehicle operation assistance information management may include controlling the primary graphical display portion to present advisory vehicle operation assistance information as shown at the top-right 15100B, and may control the primary graphical display portion to present warning vehicle operation assistance information as shown at the bottom-right 15100B.

In some embodiments, the primary display portion, the secondary display portion, or both, may be configured to provide the appearance of depth such that displayed elements may be displayed such that some elements appear closer or further away in the same display portion. For example, the primary display portion, the secondary display portion, or both, may be included in a physical display device, which may be a thin-film-transistor (TFT) display device. In some embodiments, clearing the primary display portion, the secondary display portion, or both, may include showing other information as further away and showing the vehicle operation assistance information as closer to the observer.

FIG. 16 is a diagram of positioning vehicle operation assistance information graphical presentations within a vehicle in accordance with this disclosure. In some embodiments, a driver 16000 of a vehicle 16100 may have a primary field of view 16200. The primary field of view 16200 may have a center 16210, which may correspond with focal point for the driver 16000.

In some embodiments, positioning vehicle operation assistance information graphical presentations within a vehicle 16100 may include spatially locating a primary graphical display portion, which is indicated by a white diamond 16300 in FIG. 16, in the vehicle 16100 along a defined primary angular offset 16400 from the center 16210 of the field of view 16200 of the driver 16000.

In some embodiments, positioning vehicle operation assistance information graphical presentations within a vehicle 16100 may include spatially locating a secondary graphical display portion, which is indicated by a stippled diamond 16500 in FIG. 16, in the vehicle 16100 along a defined secondary angular offset from the center 16210 of the field of view 16200 of the driver 16000. In some embodiments, the second angular offset may be substantially greater than the first angular offset 16400, so that the primary graphical display portion 16300 is visually distinct from the secondary graphical display portion 16500.

Although not shown in FIG. 16, spatially locating the primary and secondary graphical display portions may include identifying a visual depth for the primary graphical display portion, which may indicate an apparent spatial distance from the observer, such as the driver of the vehicle, to the primary graphical display portion, identifying a visual depth for the secondary graphical display portion, which may indicate an apparent spatial distance from the observer, such as the driver of the vehicle, to the secondary graphical display portion, or identifying the visual depth for the primary graphical display portion and the visual depth for the secondary graphical display portion. For example, the visual depth for the primary graphical display portion may be identified as more proximal than the visual depth for the secondary graphical display portion, such that the primary graphical display portion is visually distinct from the secondary graphical display portion.

FIG. 17 shows examples of a graphical representation of vehicle operation assistance information in accordance with this disclosure. In some embodiments, presenting a representation 17100 of the vehicle operation assistance information, such as the presenting shown at 10000 in FIG. 10, may include identifying, or generating, one or more pictographic representations 17112/17114/17116/17118 of the vehicle operation assistance information, identifying one or more text representations 17120 of the vehicle operation assistance information, identifying one or more verbal descriptions 17130 of the vehicle operation assistance information, or a combination thereof. For example, the pictographic representations 17112/17114/17116/17118, the text representations 17120, the verbal descriptions 17130, or a combination thereof may be identified based on vehicle operation assistance information type information, such as the vehicle operation assistance information type identified as shown at 4100 in FIG. 4.

In some embodiments, a pictographic representation 17112/17114/17116/17118 of vehicle operation assistance information may be similar to an icon, and may include a simple, easily recognizable, representation of the vehicle operation assistance information. For example, the vehicle operation assistance information may indicate a forward collision warning, and the pictographic representation may include two red circles 17112/17114 or 17116/17118, each of which may include an 'X'. In some embodiments, the red 'X' circles may oscillate, such as in size, color, or brightness, as indicated by the dark stippling on the left at 17112/17116 and the light stippling on the right at 17114/17118. In some embodiments, a primary portion of the representation may include a relatively large version of the pictographic representation 17112/17114, and a secondary portion may include a relatively small version 17116/17118. In some embodiments, the large version of the pictographic representation 17112/17114 may oscillate, and the small version 17116/17118 may omit oscillation.

In some embodiments, a text representation 17116 of the vehicle operation assistance information may include a single word, such as 'STOP!', 'WAIT!', 'AHEAD!', or 'GO!', or a short phrase, such as '25 MPH!'. In some embodiments, a verbal description 17130 of the vehicle operation assistance information may explain or confirm the meaning of the pictographic representation 17112/17114/17116/17118, which may include an explanation of the vehicle operation assistance information.

In some embodiments, vehicle operation assistance information management may include presenting the representation 17110 of the vehicle operation assistance information, which may include controlling the primary graphical display portion to present a first portion 17140 of the graphical representation, which may include the large pictographic representation 17112/17114 and the text representation 17120. In some embodiments, vehicle operation assistance information management may include presenting the representation 17110 of the vehicle operation assistance information, which may include controlling the secondary graphical display portion to present a second portion 17150 of the graphical representation, which may include the small pictographic representation 17116/17118 and the verbal description 17130.

In some embodiments, generating or identifying a graphical representation of vehicle operation assistance information may include including visual elements that indicate an association between the elements representing the vehicle operation assistance information. For example, the pictographic representation shown on the left 17112/17114 is visually similar to the pictographic representation shown in the center 17116/17118, which may indicate an association between the representations.

In some embodiments, the representation of a vehicle operation assistance information item may be identified or generated based on the urgency identified for the vehicle operation assistance information. In some embodiments, the visual elements representing the vehicle operation assistance information, such as the pictographic representation, the text representation, or the verbal description, may depend on the urgency associated with the vehicle operation assistance information item. In some embodiments, other display elements, such as a display background or a boarder around a portion, such as the portion included in the primary graphical display portion, may depend on the urgency associated with the vehicle operation assistance information.

For example, a vehicle operation assistance information item may be identified as an advance urgency vehicle operation assistance information item, and portion of the representation shown on the left 17140 may be omitted. In another example, the urgency for the vehicle operation assistance information item may be identified as advisory, and the representation shown at 17100 may be used. In another example, the urgency for the vehicle operation assistance information item may be identified as a warning urgency, and the representation shown on the left at 17140 may be adjusted to indicate the warning urgency, such as by increasing the size, changing a background color, or adding a boarder around the portion, such as a thick red boarder.

In another example, the vehicle operation assistance information may indicate that the vehicle is approaching a curve associated with a speed limit that is substantially lower, such as 20 miles per hour lower, than a current speed of the vehicle. The vehicle may be relatively far away from the location of the curve in the vehicle transportation network, and the vehicle operation assistance information item may be identified as having an advance urgency. A graphical representation, which may be similar to the portion shown on the right 17150, may be generated or identified. The graphical representation may include a relatively small pictographic representation, such as a diamond shaped icon having a yellow background, a black boarder, and a thick black left bending arrow. The graphical representation may include an informative verbal description, such as "Curve ahead." The vehicle operation assistance information may be identified as having an advisory urgency, and a similar graphical representation may be generated or identified. The advisory graphical representation may include a relatively large pictographic representation, a text representation, a relatively small pictographic representation, and an instructive verbal description. The pictographic representations may be similar to the pictographic representation identified for the advance urgency, the text representation may indicate the identified speed, such as "25 mph", and the verbal description may be informative and instructive, such as "Curve ahead, reduce speed." The vehicle operation assistance information may be identified as having a warning urgency, and a similar graphical representation may be generated or identified. The warning graphical representation may include the relatively large pictographic representation with highlighting, such as a bright red boarder. The text representation may indicate a heightened imperative, such as by including an exclamation mark, "25 mph!", and the verbal description may be instructive and imperative, such as "At curve, reduce speed now!".

Figure 18:
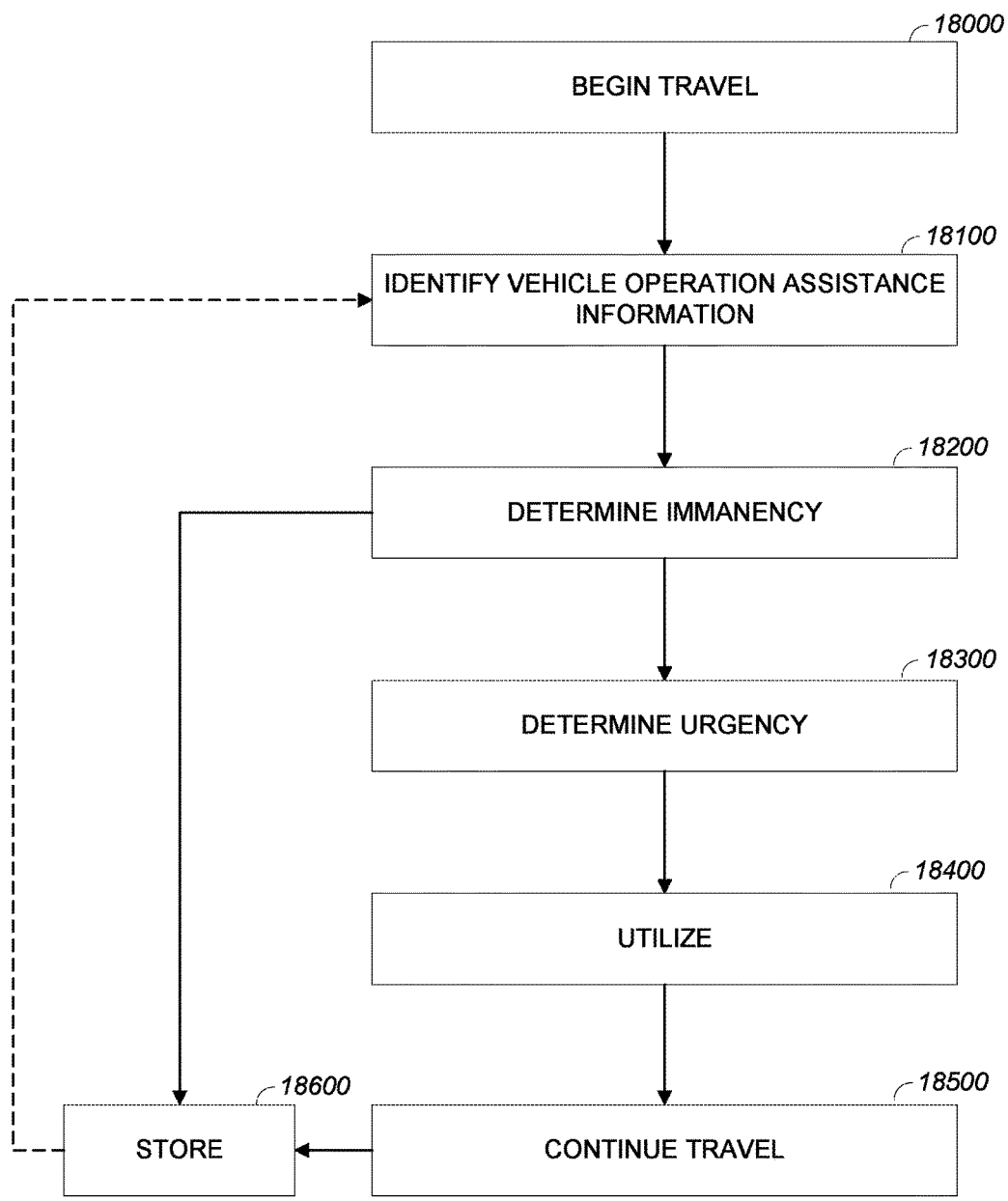
FIG. 18 is a diagram of vehicle operation assistance information management for autonomous vehicle control operation in accordance with this disclosure.

FIG. 18 is a diagram of vehicle operation assistance information management for autonomous vehicle control operation in accordance with this disclosure. In some embodiments, vehicle operation assistance information management for autonomous vehicle control operation may be implemented in a vehicle, such as the vehicle 1000 shown in FIG. 1, the vehicles 2100/2110 shown in FIG. 2, or the host vehicle 3200 shown in FIG. 3. In some embodiments, vehicle operation assistance information management for autonomous vehicle control operation may be similar to vehicle operation assistance information management, such as the vehicle operation assistance information management shown in FIG. 4, except as described herein.

In some embodiments, vehicle operation assistance information management for autonomous vehicle control operation may include traversing a portion of a vehicle transportation network at 18000, identifying a vehicle operation assistance information item at 18100, identifying an immanency for the vehicle operation assistance information item at 18200, determining an urgency at 18300; utilizing the vehicle operation assistance information item at 18400, traversing another portion of a vehicle transportation network at 18500, storing information representing the vehicle operation assistance information item at 18600, or a combination thereof.

In some embodiments, vehicle operation assistance information may be identified at 18100. For example, identifying vehicle operation assistance information may include receiving the vehicle operation assistance information from a source external to the vehicle, or from a source internal to the vehicle, or generating the vehicle operation assistance information in response to information received from a source external to the vehicle or a source internal to the vehicle. For example, vehicle operation assistance information may be generated based on vehicle operation assistance information stored in a memory of the vehicle. In some embodiments, identifying vehicle operation assistance information at 18100 may be similar to identifying vehicle operation assistance information as shown at 4100 in FIG. 4, except as described herein.

In some embodiments, identifying vehicle operation assistance information at 18100 may include receiving information indicating a vehicle operation control transfer request, such as a driver initiated vehicle operation control transfer request or a vehicle initiated vehicle operation control transfer request. In some embodiments, a vehicle operation control transfer indicated by a vehicle operation control transfer request may be an expected vehicle operation control transfer.

In some embodiments, identifying vehicle operation assistance information at 18100 may include receiving information indicating a vehicle operation control transfer request that includes a driver initiated vehicle operation control transfer request. For example, a driver may be operating the vehicle, or the vehicle may be stationary, such as parked, and the driver may initiate, or request, a transfer of control of the vehicle from driver control to autonomous vehicle control, such as control by an autonomous vehicle control unit. In another example, an autonomous vehicle control unit may be operating the vehicle, and a driver may initiate, or request, a transfer of control of the vehicle from autonomous vehicle control to driver control.

In some embodiments, identifying vehicle operation assistance information at 18100 may include identifying information indicating a vehicle operation control transfer request that includes a vehicle initiated vehicle operation control transfer request. For example, an autonomous vehicle control unit may be operating the vehicle, and the autonomous vehicle control unit may initiate, or request, a transfer of control of the vehicle from autonomous vehicle control to driver control. In another example, a driver may be operating the vehicle, and the autonomous vehicle control unit may initiate, or request, a transfer of control of the vehicle from driver control to autonomous vehicle control.

In some embodiments, the autonomous vehicle control unit may initiate, or request, a transfer of control of the vehicle in response to identifying vehicle transportation network information representing a portion of a vehicle transportation network, such as vehicle transportation network information identified in response to traversing a portion of the vehicle transportation network. For example, the autonomous vehicle control unit may be operating the vehicle, such as in accordance with a route, the autonomous vehicle control unit may determine that the route includes a portion that the autonomous vehicle control unit identifies as a driver control portion, and the autonomous vehicle control unit may initiate, or request, a transfer of control of the vehicle from autonomous vehicle control to driver control.

In some embodiments, the autonomous vehicle control unit may initiate, or request, a transfer of control of the vehicle in response to receiving external vehicle operation assistance information, such as via a wireless electronic communication link. In some embodiments, the autonomous vehicle control unit may initiate, or request, a transfer of control of the vehicle in response to receiving sensor information from a sensor of the vehicle, such as the sensor 1360 shown in FIG. 1.

In some embodiments, identifying vehicle operation assistance information at 18100 may include receiving information indicating a candidate vehicle control operation, such as a lane change, turning from a current road to another road, an acceleration, a deceleration, parking, or any other autonomous vehicle maneuver. For example, the vehicle may traverse a portion of a vehicle transportation network in accordance with a defined route from an origin to a destination; the route may include a turn from a road to another road, and the vehicle operation assistance information may include an indication of the turn as a candidate vehicle control operation.

In some embodiments, the vehicle operation assistance information may include an indication of a candidate vehicle control operation identified based on a current operational environment of the vehicle. In some embodiments, a candidate vehicle control operation may be an autonomous vehicle control operation. For example, the vehicle may traverse a portion of a vehicle transportation network in a lane, vehicle operation assistance information may be identified based on information indicating that a cost for traversing the current portion of the vehicle transportation network via a current lane exceeds a cost for traversing the current portion of the vehicle transportation network via another current lane, such as an adjacent lane, and the vehicle operation assistance information may include an indication of a lane change as a candidate vehicle control operation.

In some embodiments, the vehicle operation assistance information may include an indication of a candidate vehicle control operation identified based on information received from a source external to the vehicle, such as information received from another vehicle or information received from an infrastructure unit of the vehicle transportation network. In some embodiments, vehicle operation assistance information received from a source external to the vehicle may include a recommended speed profile, such as an indication of a recommended speed for traversing the vehicle transportation network in accordance with expected permitted right-of-way signal information for a traffic control device of the vehicle transportation network. For example, a recommended speed profile may indicate an increase in speed, such as an increase of five miles per hour, to allow the vehicle to arrive at an intersection concurrently with a green signal, or a recommended speed profile for accelerating from a stationary state at a red light. In some embodiments, a vehicle may generate a recommended speed profile based on information, such as traffic control device state information.

In some embodiments, the vehicle operation assistance information may include an indication of a candidate vehicle control operation identified in response to driver input, such as a driver initiated vehicle operation parking assistance request.

In some embodiments, an immanency for the vehicle operation assistance information item may be determined at 18200. In some embodiments, the immanency may indicate temporal cost, which may indicate a temporal or spatial distance, for the vehicle to traverse the vehicle transportation network from a current geospatial location in the vehicle transportation network to a target geospatial location indicated by the vehicle operation assistance information. In some embodiments, the vehicle operation assistance information may indicate a portion of the vehicle transportation network, such as a driver control portion, and the geospatial location indicated by the vehicle operation assistance information may correspond with a geospatial location of the portion of the vehicle transportation network indicated by the vehicle operation assistance information proximal to the vehicle. In some embodiments, determining an immanency for the vehicle operation assistance information item at 18200 may be similar to the immanency determination shown at 4200 in FIG. 4, the immanency determination shown in FIG. 5, or the immanency determination shown in FIG. 19.

In some embodiments, determining the immanency at 18200 may include determining whether the immanency exceeds, or is greater than, a maximum relevant immanence, which may be a defined maximum relevant immanence or a calculated maximum relevant immanence. For example, the maximum relevant immanence may indicate a temporal period, such as one minute, and determining the immanency at 18200 may include determining whether the immanency is greater than one minute. In some embodiments, the immanency may be greater than the maximum relevant immanence, information representing the vehicle operation assistance information identified at 18200 may be stored at 18600, and one or more elements of vehicle operation assistance information management for autonomous vehicle control operation, such as determining an urgency at 18300, or utilizing the vehicle operation assistance information item at 18400, may be omitted.

In some embodiments, an urgency for the vehicle operation assistance information item may be determined at 18300. In some embodiments, the urgency may represent a measure of the temporal or spatial distance available for utilizing the vehicle operation assistance information to traverse the vehicle transportation network. For example, the vehicle operation assistance information may indicate that a current route for the vehicle includes a driver control portion, and the urgency may indicate a temporal distance available for utilizing the vehicle operation assistance information to complete a vehicle control transfer, such as by presenting information to the driver of the vehicle, which may include information representative of the condition, event, or probable event, and may include instructions for transferring control of the vehicle, operating the vehicle, or both. In some embodiments, determining an urgency at 18300 may be similar to the urgency determination shown at 4300 in FIG. 4, the urgency determination shown in FIG. 6, or the urgency determination shown in FIG. 20.

Although not shown in FIG. 18, in some embodiments, a utility metric for the vehicle operation assistance information item may be determined. In some embodiments, the utility metric may indicate a value of the vehicle operation assistance information relative to current operating characteristics for the vehicle. In some embodiments, determining the utility metric for the vehicle operation assistance information item may be similar to the utility metric determination shown at 4400 in FIG. 4 or the utility metric determination shown in FIG. 7.

In some embodiments, the vehicle operation assistance information may be utilized at 18400. For example, utilizing the vehicle operation assistance information at 18400 may include presenting a representation of the vehicle operation assistance information, storing the vehicle operation assistance information, transmitting the vehicle operation assistance information to an external device, controlling one or more operations of the vehicle, or a combination thereof. Transmitting the vehicle operation assistance information may include transmitting a portion of the vehicle operation assistance information, related information, or a combination thereof.

In some embodiments, utilizing the vehicle operation assistance information at 18400 may include transferring vehicle control, such as from autonomous vehicle control to driver control, or from driver control to autonomous vehicle control. In some embodiments, utilizing the vehicle operation assistance information at 18400 may include controlling the vehicle in accordance with a primary vehicle control action or a secondary vehicle control action. For example, the vehicle operation assistance information may indicate a vehicle operation control transfer, the primary vehicle control action may be the vehicle operation control transfer and the secondary vehicle control action may be a safety action, such as safely stopping the vehicle. In some embodiments, utilizing the vehicle operation assistance information at 18400 may be similar to the utilization shown in FIG. 21.

In some embodiments, the vehicle may traverse another portion of a vehicle transportation network at 18500. For example, the vehicle may traverse the vehicle transportation network at 18500 based on the vehicle operation assistance information. In some embodiments, traversing another portion of the vehicle transportation network at 18500 may include storing information representing the vehicle operation assistance information at 18600.

In some embodiments, information representing the vehicle operation assistance information item may be stored at 18600, which may be similar to the information storage shown at 4700 in FIG. 4. Although not shown separately in FIG. 18, in some embodiments, vehicle operation assistance information management for autonomous vehicle control operation may include maintaining, or managing, stored vehicle operation assistance information. In some embodiments, identifying the vehicle operation assistance information at 18100 may include identifying a vehicle operation assistance information item based on previously identified vehicle operation assistance information as indicated by the broken line shown on the left of FIG. 18.

In some embodiments, identifying the second vehicle operation assistance information item based on the first vehicle operation assistance information item at 18100 may include copying the vehicle operation assistance information from the first vehicle operation assistance information item to the second vehicle operation assistance information, or using the first vehicle operation assistance information item as the second vehicle operation assistance information item. In some embodiments, monitoring stored or currently presented vehicle operation assistance information may include periodically, or in response to an event, such as traversing a defined geospatial distance in the vehicle transportation network at 18500, determining whether to identify a vehicle operation assistance information item based on a previously identified vehicle operation assistance information item at 18100.

In some embodiments, one or more elements of vehicle operation assistance information may be implemented in an external device. For example, identifying a vehicle operation assistance information item at 18100, identifying an immanency for the vehicle operation assistance information item at 18200, determining an urgency at 18300, storing information representing the vehicle operation assistance information item at 18600, or a combination thereof, may be implemented in an external device, the vehicle may communicate with the external device via a wireless electronic communication link, the vehicle may receive processed, or partially processed, vehicle operation assistance information from the external device, and the vehicle may utilize the vehicle operation assistance information item at 18400.

Figure 19:
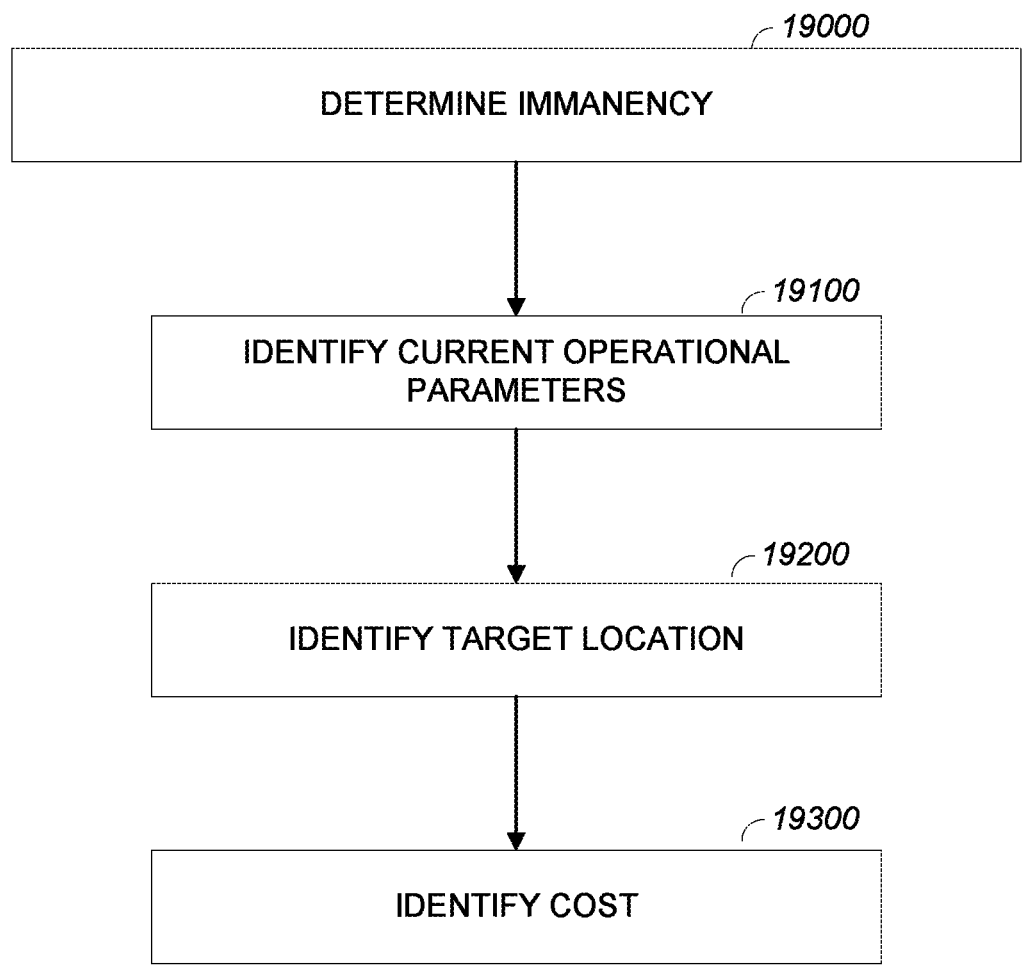
FIG. 19 is a diagram of determining an immanency for autonomous vehicle control operation in accordance with this disclosure.

FIG. 19 is a diagram of determining an immanency for autonomous vehicle control operation in accordance with this disclosure. In some embodiments, an immanency may indicate spatial or temporal distance between the vehicle and a geospatial location in the vehicle transportation network indicated by vehicle operation assistance information, such as the vehicle operation assistance information identified as shown at 4100 in FIG. 4 or the vehicle operation assistance information identified as shown at 18100 in FIG. 18. In some embodiments, determining the immanency at 19000 may include identifying current operational parameters for the vehicle at 19100, identifying a target location at 19200, identifying a cost at 19300, or a combination thereof.

In some embodiments, the vehicle operation assistance information may include an express or implied immanency and one or more elements of determining an immanency, such as identifying a target location at 19200, or identifying a cost at 19300, may be omitted. For example, the vehicle operation assistance information may indicate front collision information. In some embodiments, the front collision information may expressly indicate an expected time to collision, such as three or four seconds, which may be identified as the immanency. In some embodiments, the front collision information may omit an express immanency, and a defined front collision immanency, such as three or four seconds, may be identified as the immanency.

In some embodiments, current operational parameters for the vehicle may be identified at 19100. In some embodiments, identifying the current operational parameters at 19100 may include identifying a current geospatial location of the vehicle, a current vehicle operational state for the vehicle, a current expected path for the vehicle, a current route for the vehicle, or a combination thereof. In some embodiments, the current geospatial location of the vehicle may be identified contemporaneously with identifying the vehicle operation assistance information. In some embodiments, identifying the current operational parameters at 19100 may be similar to identifying current operational parameters as shown at 5100 in FIG. 5, except as described herein.

In some embodiments, a target location may be identified at 19200. In some embodiments, the vehicle operation assistance information may indicate a geospatial location within the vehicle transportation network, such as a geospatial point, which may be indicated by, for example, GPS coordinates, a feature of the vehicle transportation network, such as a lane or a road, or a portion thereof, which may be indicated by two or more geospatial locations, such as a first geospatial location along a the vehicle transportation network feature corresponding to an edge of the portion of the vehicle transportation network feature indicated by the vehicle operation assistance information and a second geospatial location along the vehicle transportation network feature corresponding to an opposite edge of the portion of the vehicle transportation network feature indicated by the vehicle operation assistance information. In some embodiments, identifying the target location at 19200 may be similar to identifying a target location as shown at 5200 in FIG. 5, except as described herein.

In some embodiments, the vehicle operation assistance information may include information indicating a location of an expected vehicle operation control transfer. For example, the vehicle operation assistance information may include a vehicle operation control transfer request indicating a vehicle initiated transfer of control of the vehicle responsive to vehicle operation assistance information indicating that a current route for the vehicle includes a driver control portion, and identifying a target location at 19200 may include identifying a location in the vehicle transportation network of point of convergence between the route and the driver control portion of the vehicle transportation network relative to a current location of the vehicle in the route.

In another example, the vehicle operation assistance information may include a vehicle operation control transfer request indicating a vehicle initiated transfer of control of the vehicle, such as a vehicle initiated transfer of control of the vehicle responsive to vehicle operation assistance information received from an external device, such as another vehicle, or generated based on sensor information from a sensor of the vehicle, and identifying a target location at 19200 may include identifying a location in the vehicle transportation network indicated by, or based on, the received information.

In another example, the vehicle operation assistance information may include a vehicle operation control transfer request indicating a driver initiated transfer of control of the vehicle, and identifying a target location at 19200 may include determining a temporal transfer period for transferring vehicle control and identifying a location in the vehicle transportation network corresponding to an expected location of the vehicle in the vehicle transportation network at the end of the transfer period based on current vehicle operational conditions.

In some embodiments, the vehicle operation assistance information may include information indicating a location of a candidate vehicle control operation. For example, the vehicle may traverse a portion of a vehicle transportation network in accordance with a defined route from an origin to a destination; the route may include a turn from a road to another road, and identifying a target location at 19200 may include identifying a location of the turn in the vehicle transportation network.

In some embodiments, the vehicle operation assistance information may include information indicating a location of a candidate vehicle control operation relative to the vehicle. For example, the vehicle may traverse a portion of a vehicle transportation network in a lane, vehicle operation assistance information may be identified based on information indicating that a cost for traversing the current portion of the vehicle transportation network via a current lane exceeds a cost for traversing the current portion of the vehicle transportation network via another current lane, such as an adjacent lane, and identifying a target location at 19200 may include identifying a location in the vehicle transportation network for changing lanes, which may be relative to a current location of the vehicle.

In some embodiments, a cost for the vehicle operation assistance information may be identified at 19300. In some embodiments, a cost, such as a spatial or temporal cost, for the vehicle to traverse the vehicle transportation network from the current geospatial location of the vehicle identified at 19100 to the target geospatial location identified at 19200 based on the current operational parameters identified at 19100 may be identified as the cost at 19300. For example, a geospatial distance in the vehicle transportation network between the current geospatial location of the vehicle identified at 19100 and the target geospatial location identified at 19200 may be identified as a spatial cost, or a temporal distance, which may indicate an amount of time, for the vehicle to traverse the vehicle transportation network from the current geospatial location of the vehicle identified at 19100 to the target geospatial location identified at 19200 based on the current vehicle operating parameters, such as speed, identified at 19100, may be identified as the cost. In some embodiments, identifying the cost at 19300 may be similar to identifying a cost as shown at 5400 in FIG. 5, except as described herein.

In some embodiments, the target location may be identified at 19200 based on the cost identified at 19300. For example, the vehicle operation assistance information may include a vehicle operation control transfer request indicating a driver initiated transfer of control of the vehicle a cost, such as a temporal period, for transferring vehicle control may be identified at 19300, and identifying a target location at 19200 may include determining an expected spatial location of the vehicle in the vehicle transportation network corresponding to the end of the temporal period for transferring vehicle control based on current vehicle operating parameters as the target location.

In some embodiments, the cost may be identified at 19300 based on expected right-of-way signal information for a traffic control device of the vehicle transportation network. For example, the vehicle operation assistance information may indicate an expected right-of-way signal status for a traffic control device, such as a current status, or a status corresponding to an expected arrival of the vehicle at a location in the vehicle transportation network corresponding to the traffic control device based on current operating parameters for the vehicle. In some embodiments, the cost may indicate an expected duration for the signal, such as a period of time before a permitted right-of-way signal transitions to a denied right-of-way signal, or a period of time before a denied right-of-way signal transitions to a permitted right-of-way signal.

Figure 20:
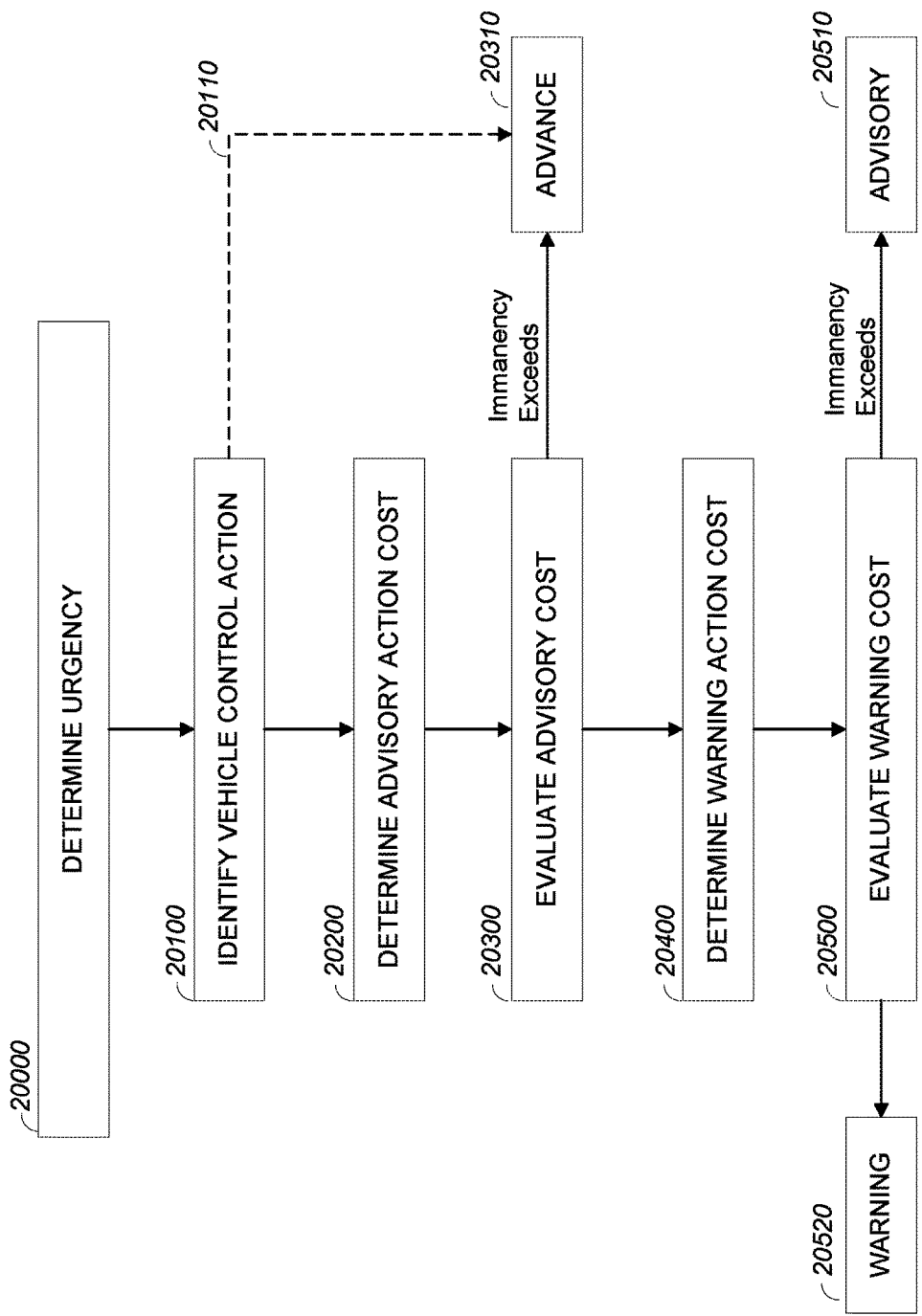
FIG. 20 is a diagram of determining urgency for autonomous vehicle control operation in accordance with this disclosure.

FIG. 20 is a diagram of determining urgency for autonomous vehicle control operation in accordance with this disclosure. In some embodiments, determining the urgency may include determining a temporal or spatial distance available for utilizing the vehicle operation assistance information and quantizing, or categorizing, the temporal or spatial distance into a defined set of urgency types, categories, or bands. In some embodiments, determining urgency at 20000 may be similar to the urgency determination shown at 4300 in FIG. 4, the urgency determination shown in FIG. 6, or the urgency determination shown at 18300 in FIG. 18, except as described herein. In some embodiments, determining urgency at 20000 may include identifying a vehicle control action at 20100, determining an advisory action cost at 20200, evaluating an advisory cost at 20300, determining a warning action cost at 20400, evaluating a warning cost at 20500, or a combination thereof.

In some embodiments, an available vehicle control action responsive to the vehicle operation assistance information may be identified at 20100. A vehicle control action may indicate a vehicle control action, operation, or maneuver, such as accelerating, decelerating, turning, or stopping, that may be performed by the vehicle, such as in response to driver input or in response to Autonomous Vehicle control, to traverse a portion of the vehicle transportation network. In some embodiments, identifying an available vehicle control action at 20100 may be similar to the available vehicle control action identification shown at 6100 in FIG. 6, except as described herein.

In some embodiments, the available vehicle control action responsive to the vehicle operation assistance information identified at 20100 may include more than one vehicle control action, such as a primary vehicle control action and a secondary vehicle control action. For example, the vehicle operation assistance information may include a vehicle operation control transfer request, the primary vehicle control action may include a vehicle operation control transfer, and the secondary vehicle control action may include autonomously controlling the vehicle to traverse the vehicle transportation network in accordance with current operational parameters, or to safely stop. In another example, the vehicle operation assistance information may include a candidate vehicle control operation, such as a lane change, the primary vehicle control action may include the lane change, and the secondary vehicle control action may include autonomously controlling the vehicle to traverse the vehicle transportation network in accordance with current operational parameters, such as by continuing to traverse the vehicle transportation network via the current lane.

In some embodiments, a vehicle operation control transfer may be a vehicle control action. For example, vehicle operation assistance information, such as the vehicle operation assistance information received as shown at 18100 in FIG. 18, may include a vehicle operation control transfer request indicating a transfer of control of the vehicle from driver control to autonomous vehicle control or from autonomous vehicle control to driver control, and a transfer of vehicle control may be identified as the available vehicle control action at 20100.

In some embodiments, an advisory action cost may be identified at 20200. In some embodiments, an action cost may indicate a cost, such as a temporal cost or a spatial cost, for the vehicle to traverse the vehicle transportation network in accordance with an identified vehicle control action, such as the vehicle control action identified at 20100, based on the current vehicle operational conditions and, in some embodiments, one or more acceptability metrics. In some embodiments, an advisory action cost may be an action cost associated with one or more advisory acceptability metrics, such as an advisory vehicle control transfer period. In some embodiments, identifying an advisory action cost at 20200 may be similar to the advisory action cost identification shown at 6200 in FIG. 6, except as described herein.

In some embodiments, the vehicle operation assistance information may include a vehicle operation control transfer request indicating a driver initiated transfer of control of the vehicle and identifying the advisory action cost at 20200 may include identifying an advisory vehicle control transfer period, which may indicate a defined or determined temporal cost for transferring vehicle control, such as five seconds, and using the advisory vehicle control transfer period as the advisory action cost.

In some embodiments, an advisory cost may be evaluated at 20300. In some embodiments, evaluating the advisory cost at 20300 may include identifying the advisory cost. In some embodiments, the advisory cost may be identified based on the advisory action cost identified at 20200 and an advisory offset. For example, the advisory cost may be identified as a sum of the advisory action cost identified at 20200 and the advisory offset. In some embodiments, evaluating the advisory cost at 20300 may be similar to the advisory cost evaluation shown at 6300 in FIG. 6, except as described herein.

In some embodiments, determining the advisory cost at 20300 may include identifying the advisory offset. In some embodiments, an advisory offset may be identified based on vehicle operation assistance information, such as the vehicle operation assistance information received as shown at 18100 in FIG. 18. For example, an advisory offset, such as twenty-five seconds, may be associated with vehicle operation assistance information indicating that a current route for the vehicle includes a driver control portion.

In some embodiments, the advisory offset may be zero or may be omitted, and the advisory cost may be based on the advisory action cost identified at 20200. For example, an advisory offset associated with vehicle operation assistance information indicating a driver initiated vehicle operation control transfer may be associated with an advisory offset of zero, or an advisory offset for vehicle operation assistance information indicating a driver initiated vehicle operation control transfer may be omitted.

In some embodiments, evaluating the advisory cost at 20300 may include determining whether an immanency, such as the immanency identified as shown at 18200 in FIG. 18 or as shown in FIG. 19, exceeds the advisory cost. In some embodiments, the immanency may exceed the advisory cost and the current urgency may be identified as the advance urgency at 20310.

In some embodiments, the immanency may be within the advisory cost and a warning action cost may be determined at 20400. In some embodiments, the warning action cost identified at 20400 may indicate temporal cost for the vehicle to traverse the vehicle transportation network in accordance with the vehicle control action identified at 20100 and a corresponding warning acceptability metric. For example, the warning acceptability metric may be a warning vehicle control transfer period, such as two seconds.

In some embodiments, a warning cost may be evaluated at 20500. In some embodiments, evaluating the warning cost at 20500 may include identifying the warning cost. In some embodiments, the warning cost may be based on the warning action cost identified at 20400 and a warning offset, such as one second. In some embodiments, warning offset may be omitted, and the warning cost may be based on the warning action cost identified at 20400.

In some embodiments, evaluating the warning cost at 20500 may include determining whether an immanency, such as the immanency identified as shown at 18200 in FIG. 18 or as shown in FIG. 19, exceeds the warning cost. In some embodiments, the immanency may exceed the warning cost and the current urgency may be identified as the advisory urgency at 20510. In some embodiments, the immanency may be within the warning cost and the current urgency may be identified as the warning urgency at 20520.

Figure 21:
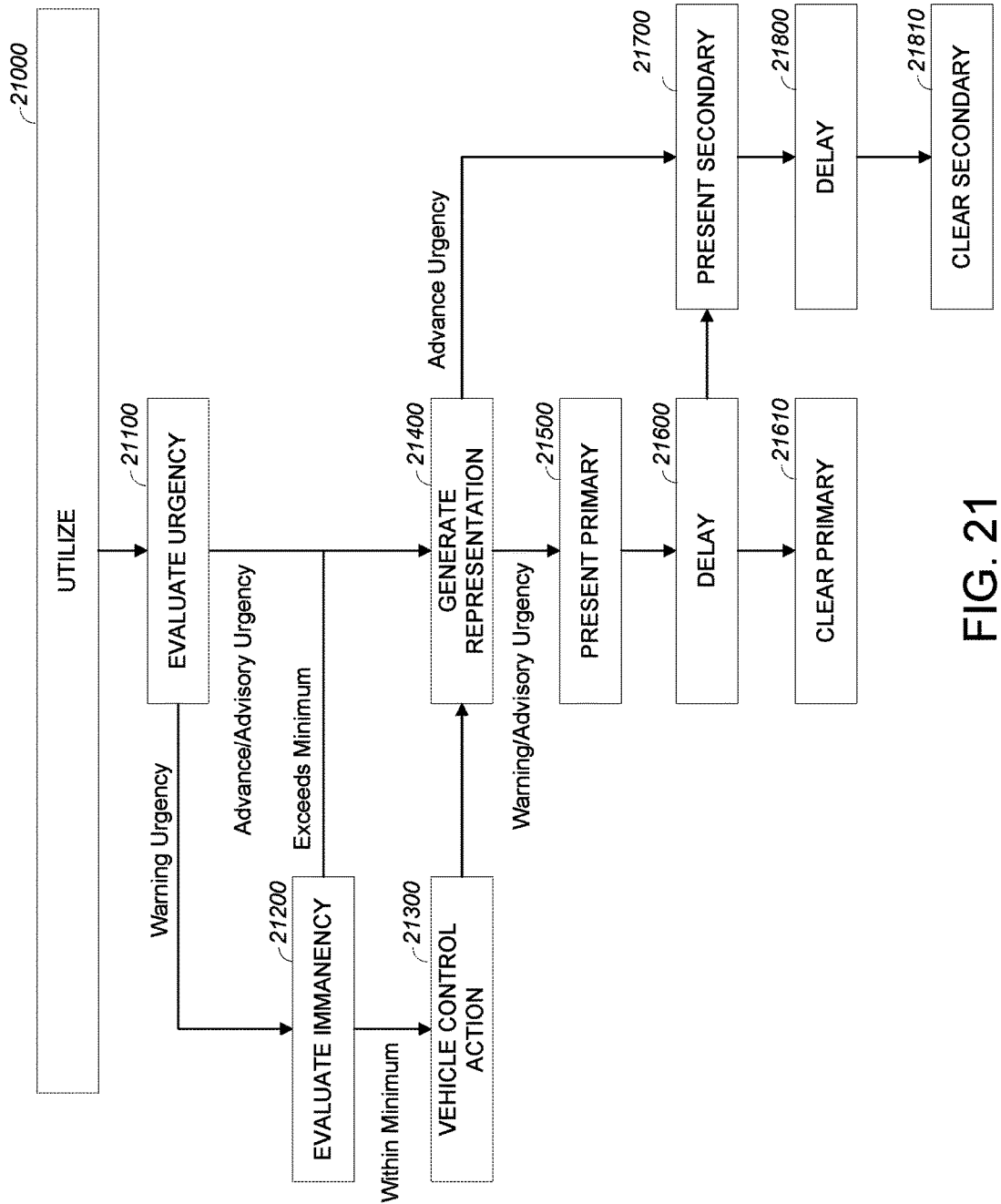
FIG. 21 is a diagram of utilizing vehicle operation assistance information in accordance with this disclosure.

FIG. 21 is a diagram of utilizing vehicle operation assistance information in accordance with this disclosure. In some embodiments, utilizing vehicle operation assistance information, such as the vehicle operation assistance information identified as shown at 18100 in FIG. 18, may include presenting a representation of the vehicle operation assistance information, controlling the vehicle to traverse a portion of the vehicle transportation network in accordance with an identified vehicle control action, such as the vehicle control action at 20100 in FIG. 21, or a combination thereof.

In some embodiments, utilizing vehicle operation assistance information at 21000 may include evaluating an urgency for the vehicle operation assistance information at 21100, evaluating an immanency for the vehicle operation assistance information at 21200, operating the vehicle in accordance with an identified vehicle control action at 21300, generating a representation of the vehicle operation assistance information at 21400, presenting a primary portion of the graphical presentation at 21500, delaying at 51600, clearing the primary portion at 21610, presenting a secondary portion of the graphical presentation at 21700, delaying at 21800, clearing the secondary portion at 21810, or a combination thereof.

Although not shown separately in FIG. 21, in some embodiments, utilizing vehicle operation assistance information at 21000 may include determining whether a candidate vehicle control operation is an approved vehicle control operation. In some embodiments, a candidate vehicle control operation not otherwise identified as an approved vehicle control operation may be identified as an unapproved vehicle control operation. In some embodiments, a candidate vehicle control operation may be identified as an approved vehicle control operation in response to driver input, such as driver input indicating that the candidate vehicle control operation is an approved vehicle control operation.

For example, the candidate vehicle control operation may be a lane change vehicle control operation identified based on current vehicle operating environment information, the candidate vehicle control operation may be identified as an unapproved vehicle control operation in response to identifying the candidate vehicle control operation, and the candidate vehicle control operation may be identified as an approved vehicle control operation in response to driver input indicating that the candidate vehicle control operation is an approved vehicle control operation.

In another example, the vehicle may traverse a portion of the vehicle transportation network in accordance with a defined route from an origin to a destination, which may be a route identified in response to driver input, the candidate vehicle control operation may be identified as an expected vehicle control operation based on the route, and the candidate vehicle control operation may be identified as an approved vehicle control operation in response to identifying the route.

In another example, the candidate vehicle control operation may be identified as an approved vehicle control operation in response to driver input, such as driver input requesting the candidate vehicle control operation. For example, the candidate vehicle control operation may be identified as an approved vehicle control operation in response to a driver initiated vehicle operation parking assistance request.

In some embodiments, a candidate vehicle control operation identified as an approved vehicle control operation may be identified as an unapproved vehicle control operation. For example, the vehicle may traverse a portion of the vehicle transportation network in accordance with a defined route from an origin to a destination, the candidate vehicle control operation may be identified as an expected vehicle control operation based on the route, such as a turn from a road to another road, the candidate vehicle control operation may be identified as an approved vehicle control operation in response to identifying the route, and the candidate vehicle control operation may be identified as an unapproved vehicle control operation in response to driver input indicating that the candidate vehicle control operation is an unapproved vehicle control operation, canceling the route, or changing the route such that the candidate vehicle control operation is no longer included in the route.

In some embodiments, utilizing the vehicle operation assistance information at 21000 may include evaluating an urgency, such as the current urgency identified as shown at 18300 in FIG. 18 or as shown in FIG. 20. Although not shown separately in FIG. 21, in some embodiments, evaluating the urgency at 21100 may include identifying and evaluating vehicle operation control metrics for the vehicle operation assistance information at 21100. For example, the vehicle operation assistance information may indicate a request for vehicle operation control transfer, and utilizing the vehicle operation assistance information at 21000 may include evaluating vehicle operation control metrics for the vehicle operation assistance information at 21100. In some embodiments, evaluating the vehicle operation control metrics for the vehicle operation assistance information at 21100 may be omitted. For example, the urgency may be the advance urgency, the vehicle operation control metrics for the vehicle operation assistance information may be identified at 21100, and evaluating the vehicle operation control metrics may be omitted.

The vehicle operation control metrics may include one or more aspects of vehicle operation control that may be evaluated for vehicle operation control transfer. For example, the vehicle operation control metrics may include a steering control metric, an acceleration control metric, a situational awareness control metric, or a combination thereof.

In some embodiments, evaluating the vehicle operation control metrics at 21100 may include determining a vehicle status, a driver status, or a combination of vehicle status and driver status corresponding to respective vehicle operation control metrics. A driver status corresponding to a vehicle operation control metric may indicate a status or condition of the driver with respect to an aspects of vehicle operation control corresponding the vehicle operation control metric.

In some embodiments, evaluating a steering control metric may include determining whether the driver of the vehicle is actively engaged with a steering control unit of the vehicle, such as a steering wheel. For example, the steering wheel may include one or more sensors configured to sense driver engagement, such as contact or pressure, with the steering wheel, and the steering control metric may be determined based on data or signals from the steering wheel sensors. For example, the steering wheel sensor data may indicate that the driver is gripping the steering wheel and the steering control metric may evaluate to a positive value or true, indicating that the driver status for the steering control metric is engaged. In another example, the steering wheel sensor data may indicate that the driver is not gripping the steering wheel, or is not sufficiently gripping the steering wheel, and the steering control metric may evaluate to a negative value or false, indicating that the driver status for the steering control metric is disengaged.

In some embodiments, evaluating an acceleration control metric may include determining whether the driver of the vehicle is actively engaged with one or more acceleration control units of the vehicle, such as a gas pedal or a brake pedal. For example, a gas pedal, a brake pedal, or both, respectively, may include one or more sensors, such as pressure sensors, configured to sense driver engagement, such as contact or pressure, with the respective pedal, and the acceleration control metric may be determined based on data or signals from the respective pedal sensors. For example, the pedal sensor data may indicate that the driver is pressing the acceleration pedal and the acceleration control metric may evaluate to a positive value or true, indicating that the driver status for the acceleration control metric is engaged. In another example, the pedal sensor data may indicate that the driver is not in contact with either pedal, or is not sufficiently actuating either pedal, and the acceleration control metric may evaluate to a negative value or false, indicating that the driver status for the acceleration control metric is disengaged.

In some embodiments, evaluating a situational awareness control metric may include determining whether the driver of the vehicle is actively engaged with, or aware of, the operational state of the vehicle. For example, the vehicle may include one or more situational awareness sensors configured to identify information indicative of driver attention or engagement with vehicle operations. In some embodiments, a vehicle may include one or more sensors, such as cameras, configured to capture images of the driver, and a unit of the vehicle, may be configured to identify a field of view or focal point for the driver based on the driver image data. For example, the situational awareness sensor data may indicate that a focal point for the driver is directed in accordance with the expected path for the vehicle, and the situational awareness control metric may evaluate to a positive value or true, indicating that the driver status for the situational awareness control metric is engaged. In another example, the situational awareness sensor data may indicate that the field of view of the driver is not directed in accordance with the expected path for the vehicle, and the situational awareness control metric may evaluate to a negative value or false, indicating that the driver status for the situational awareness control metric is disengaged.

In some embodiments, an immanency, such as the immanency identified as shown at 18200 in FIG. 18 or as shown in FIG. 19, may be evaluated at 21200. For example, the urgency evaluated at 21100 may be the warning urgency, and the immanency may be evaluated at 21200. In another example, the urgency evaluated at 21100 may be the advisory urgency, and evaluating the immanency at 21200 may be omitted. In some embodiments, evaluating the immanency at 21200 may include determining whether the immanency exceeds a minimum relevant immanence, which may indicate a defined value, such as zero seconds or one second.

In some embodiments, utilizing the vehicle operation assistance information may include operating the vehicle in accordance with an identified vehicle control action at 21300. For example, the immanency evaluated at 21200 may be within the minimum relevant immanence and utilizing the vehicle operation assistance information may include operating the vehicle in accordance with an identified vehicle control action, such as the vehicle control action identified as shown at 20100 in FIG. 20. In another example, the immanency evaluated at 21200 may exceed the minimum relevant immanence and operating the vehicle in accordance with an identified vehicle control action may be omitted.

In an example, vehicle operation assistance information, such as the vehicle operation assistance information identified as shown at 18100 in FIG. 18, may include a vehicle operation control transfer request, vehicle control transfer may be identified as a vehicle control action, the immanency evaluated at 21200 may be within the minimum relevant immanence, the driver status for each of the vehicle operation control metrics identified at 21100 may indicate that the driver is engaged, operating the vehicle in accordance with an identified vehicle control action at 21300 may include transferring vehicle control, and a representation of the vehicle operation assistance information indicating the transfer of control may be generated at 21500.

In another example, vehicle operation assistance information, such as the vehicle operation assistance information identified as shown at 18100 in FIG. 18, may include a vehicle operation control transfer request, vehicle control transfer may be identified as a primary vehicle control action, a secondary vehicle control action, such as the secondary vehicle control action identified as shown at 20100 in FIG. 20, may be identified, the immanency evaluated at 21200 may be within the minimum relevant immanence, the driver status for a vehicle operation control metric identified at 21100 may indicate that the driver is disengaged, utilizing the vehicle operation assistance information at 21300 may include controlling the vehicle in accordance with the secondary vehicle control action, and a representation of the vehicle operation assistance information indicating the secondary vehicle control action may be generated at 21400. In some embodiments, presenting a representation of the vehicle operation assistance information indicating the secondary vehicle control action may include presenting a representation of the vehicle operation assistance information indicating that the vehicle control transfer was omitted, which may include presenting a representation of one or more disengaged vehicle operation control metrics.

In some embodiments, operating the vehicle in accordance with an identified vehicle control action at 21300 may include omitting a vehicle control action, or a primary vehicle control action, in response to determining that a candidate vehicle control operation is an unapproved vehicle control operation, and operating the vehicle in accordance with current operating parameters or a secondary vehicle control action.

For example, the candidate vehicle control operation may be a lane change vehicle control operation identified based on current vehicle operating environment information, the candidate vehicle control operation may be identified as an unapproved vehicle control operation in response to identifying the candidate vehicle control operation, the lane change vehicle control operation may be identified as a primary vehicle control action, maintaining current operating parameters may be identified as a secondary vehicle control action, and operating the vehicle in accordance with an identified vehicle control action at 21300 may include omitting the lane change vehicle control operation in response to determining that a candidate vehicle control operation is an unapproved vehicle control operation, and operating the vehicle in accordance with the secondary vehicle control action. In another example, the lane change vehicle control operation may be identified as an approved vehicle control operation in response to driver input indicating that the candidate vehicle control operation is an approved vehicle control operation, and operating the vehicle in accordance with an identified vehicle control action at 21300 may include autonomously operating the vehicle to change lanes in accordance with the candidate vehicle control operation.

In another example, the vehicle may traverse a portion of the vehicle transportation network in accordance with a defined route from an origin to a destination, which may be a route identified in response to driver input, the candidate vehicle control operation may be identified as an expected vehicle control operation, such as a turn from a road to another road, based on the route, the candidate vehicle control operation may be identified as an approved vehicle control operation in response to identifying the route, the turn vehicle control operation may be identified as a primary vehicle control action, maintaining current operating parameters may be identified as a secondary vehicle control action, and operating the vehicle in accordance with an identified vehicle control action at 21300 may include autonomously operating the vehicle to turn in accordance with the candidate vehicle control operation. In another example, the turn vehicle control operation may be identified as an unapproved vehicle control operation in response to driver input indicating that the candidate vehicle control operation is an unapproved vehicle control operation, and operating the vehicle in accordance with an identified vehicle control action at 21300 may include omitting the turn vehicle control operation in response to determining that the candidate vehicle control operation is an unapproved vehicle control operation, and operating the vehicle in accordance with the secondary vehicle control action.

In some embodiments, a representation of the vehicle operation assistance information may be identified, or generated, at 21400. Generating, or identifying, the representation of the vehicle operation assistance information may include generating, or identifying, a graphical representation of the vehicle operation assistance information, an audible representation of the vehicle operation assistance information, or both.

In some embodiments, the representation of the vehicle operation assistance information generated at 21400 may depend on the urgency evaluated at 21100. For example, the urgency may be an advance urgency and an advance representation of the vehicle operation assistance information may be generated. In another example, the urgency may be an advisory urgency and an advisory representation of the vehicle operation assistance information may be generated. In another example, the urgency may be a warning urgency and a warning representation of the vehicle operation assistance information may be generated.

In some embodiments, the representation of the vehicle operation assistance information generated at 21400 may depend on whether a candidate vehicle control operation is an approved vehicle control operation or an unapproved vehicle control operation.

For example, the vehicle operation assistance information may indicate a candidate vehicle control operation identified based on a defined route, the urgency may be an advisory urgency, or the urgency may be a warning urgency and the immanency may exceed the minimum relevant immanence, the candidate vehicle control operation may be an approved vehicle control operation, and generating the representation of the vehicle operation assistance information at 21400 may include generating a representation of an offer to cancel of the vehicle control operation.

In another example, the vehicle operation assistance information may indicate a candidate vehicle control operation identified based on current vehicle operating environment information, the urgency may be an advisory urgency, or the urgency may be a warning urgency and the immanency may exceed the minimum relevant immanence, the candidate vehicle control operation may be an unapproved vehicle control operation, and generating the representation of the vehicle operation assistance information at 21400 may include generating a representation of a request for approval of the vehicle control operation.

In another example, the vehicle operation assistance information may indicate a candidate vehicle control operation identified based on current vehicle operating environment information, the urgency may be a warning urgency and the immanency may be within the minimum relevant immanence, the candidate vehicle control operation may be an unapproved vehicle control operation, and generating the representation of the vehicle operation assistance information at 21400 may include generating a graphical representation of an aborted vehicle control operation.

In some embodiments, generating or identifying the representation of the vehicle operation assistance information at 21400 may include generating or identifying a graphical, or visual, representation of the vehicle operation assistance information. Generating, or identifying, the graphical representation of the vehicle operation assistance information may include identifying, or generating, one or more pictographic representations of the vehicle operation assistance information, identifying one or more text representations of the vehicle operation assistance information, identifying one or more verbal descriptions of the vehicle operation assistance information, or a combination thereof. Examples of pictographic representation, text representations, and verbal descriptions, of the vehicle operation assistance information are shown in FIGS. 22-26.

In some embodiments, the graphical representation of the vehicle operation assistance information may be presented via the primary graphical display portion at 21500. For example, the urgency may be an advisory urgency, a graphical representation of the vehicle operation assistance information may be generated at 21400, and the graphical representation of the vehicle operation assistance information generated at 21400 may be presented via the primary graphical display portion at 21500. In another example, the urgency may be a warning urgency, the immanency evaluated at 21200 may exceed the minimum relevant immanence, a graphical representation of the vehicle operation assistance information may be generated at 21400, a graphical representation of the vehicle operation assistance information may be generated at 21400, and the graphical representation of the vehicle operation assistance information generated at 21400 may be presented via the primary graphical display portion at 21500. In another example, the urgency may be a warning urgency, the immanency evaluated at 21200 may be within the minimum relevant immanence, the vehicle may be operated in accordance with an identified vehicle control action at 21300, a graphical representation of the vehicle operation assistance information may be generated at 21400, and the graphical representation of the vehicle operation assistance information generated at 21400 may be presented via the primary graphical display portion at 21500. In some embodiments, presenting the graphical representation of the vehicle operation assistance information via the primary graphical display portion at 21500 may be similar the primary presentation shown in FIG. 11, except as described herein.

In some embodiments, a primary delay timer, or other temporal delay, may be initiated at 21600 in response to, or in conjunction with, presenting the graphical representation of the vehicle operation assistance information via the primary graphical display portion at 21500.

In some embodiments, the primary graphical display portion may be cleared at 21610. In some embodiments, the graphical representation of the vehicle operation assistance information presented via the primary graphical display portion at 21500 may be cleared, or omitted from the primary graphical display portion, in response to an event, such as detecting the primary delay timer initiated at 21600 exceeding a defined primary display duration, such as three seconds, detecting that the vehicle traversed the vehicle transportation network in accordance with the vehicle control action, or otherwise determining that the vehicle operation assistance information is no longer relevant.

In some embodiments, the graphical representation of the vehicle operation assistance information may be presented via the secondary graphical display portion at 21700. In some embodiments, presenting the secondary portion at 21700 may be similar the secondary presentation shown in FIG. 12, except as described herein. In some embodiments, the graphical representation of the vehicle operation assistance information may be presented via the secondary graphical display portion at 21700 in response to detecting the primary delay timer initiated at 21600 exceeding a defined secondary display delay, such as one second. In some embodiments, the graphical representation of the vehicle operation assistance information may be presented via the secondary graphical display portion at 21700 in conjunction with initiating the primary delay timer at 21600.

In some embodiments, evaluating the immanency at 21200, operating the vehicle in accordance with the identified vehicle control action at 21300, and presenting the graphical representation of the vehicle operation assistance information via the primary graphical display portion at 21500, may be omitted and the graphical representation of the vehicle operation assistance information may be presented via the secondary graphical display portion at 21700 in response to generating the representation at 21400. For example, the urgency may be identified as the advance urgency, evaluating the immanency at 21200, operating the vehicle in accordance with the identified vehicle control action at 21300, and presenting the graphical representation of the vehicle operation assistance information via the primary graphical display portion at 21500, may be omitted, and the graphical representation of the vehicle operation assistance information may be presented via the secondary graphical display portion at 21700 in response to generating the representation at 21400.

In some embodiments, a secondary delay timer, or other temporal delay, may be initiated at 21800. For example, a secondary delay timer may be initiated at 21800 in response to, or in conjunction with, presenting the graphical representation of the vehicle operation assistance information via the secondary graphical display portion at 21700.

In some embodiments, the secondary portion may be cleared at 21810. In some embodiments, the graphical representation of the vehicle operation assistance information presented via the secondary graphical display portion at 21700 may be cleared, or omitted from the secondary graphical display portion, in response to an event, such as detecting the secondary delay timer initiated at 21800 exceeding a defined secondary display duration, such as five seconds, detecting that the vehicle traversed the vehicle transportation network in accordance with the vehicle control action, or otherwise determining that the vehicle operation assistance information is no longer relevant.

Although not shown separately in FIG. 21, in some embodiments, generating the representation at 21400 may include generating or identifying an auditory representation of the vehicle operation assistance information item and controlling the auditory presentation device to present the auditory representation of the vehicle operation assistance information item.

For example, the vehicle operation assistance information may indicate a vehicle initiated request for vehicle operation control transfer responsive to identifying a driver control portion of the vehicle transportation network in a current route for the vehicle, the urgency may be identified as the advanced urgency, and utilizing the vehicle operation assistance information at 21000 may include generating or identifying an auditory representation of the vehicle operation assistance information item at 21400 and controlling the auditory presentation device to present the auditory representation of the vehicle operation assistance information item in conjunction with presenting the secondary portion at 21700.

In another example, the vehicle operation assistance information may indicate a vehicle initiated request for vehicle operation control transfer from autonomous vehicle control to driver control, the urgency may be identified as the warning urgency, the immanency evaluated at 21200 may be exceed the minimum relevant immanence, a disengaged driver status may be identified for one or more vehicle operational control metrics at 21100, and utilizing the vehicle operation assistance information at 21000 may include generating or identifying an auditory representation of the vehicle operation assistance information item at 21400 and controlling the auditory presentation device to present the auditory representation of the vehicle operation assistance information item in conjunction with presenting the primary portion at 21500.

Figure 23:
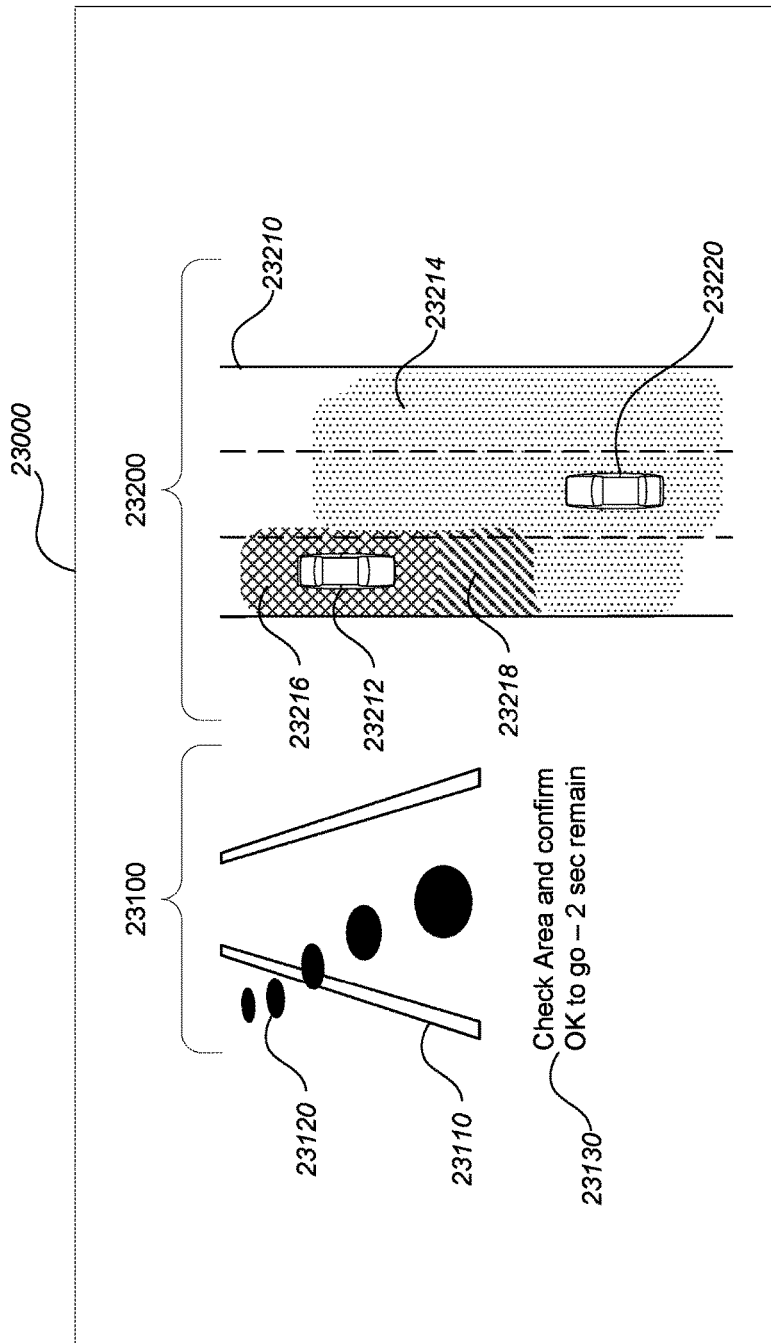
FIG. 23 shows an example of a graphical representations of vehicle operation assistance information for autonomous vehicle control lane change in accordance with this disclosure.
Figure 24:
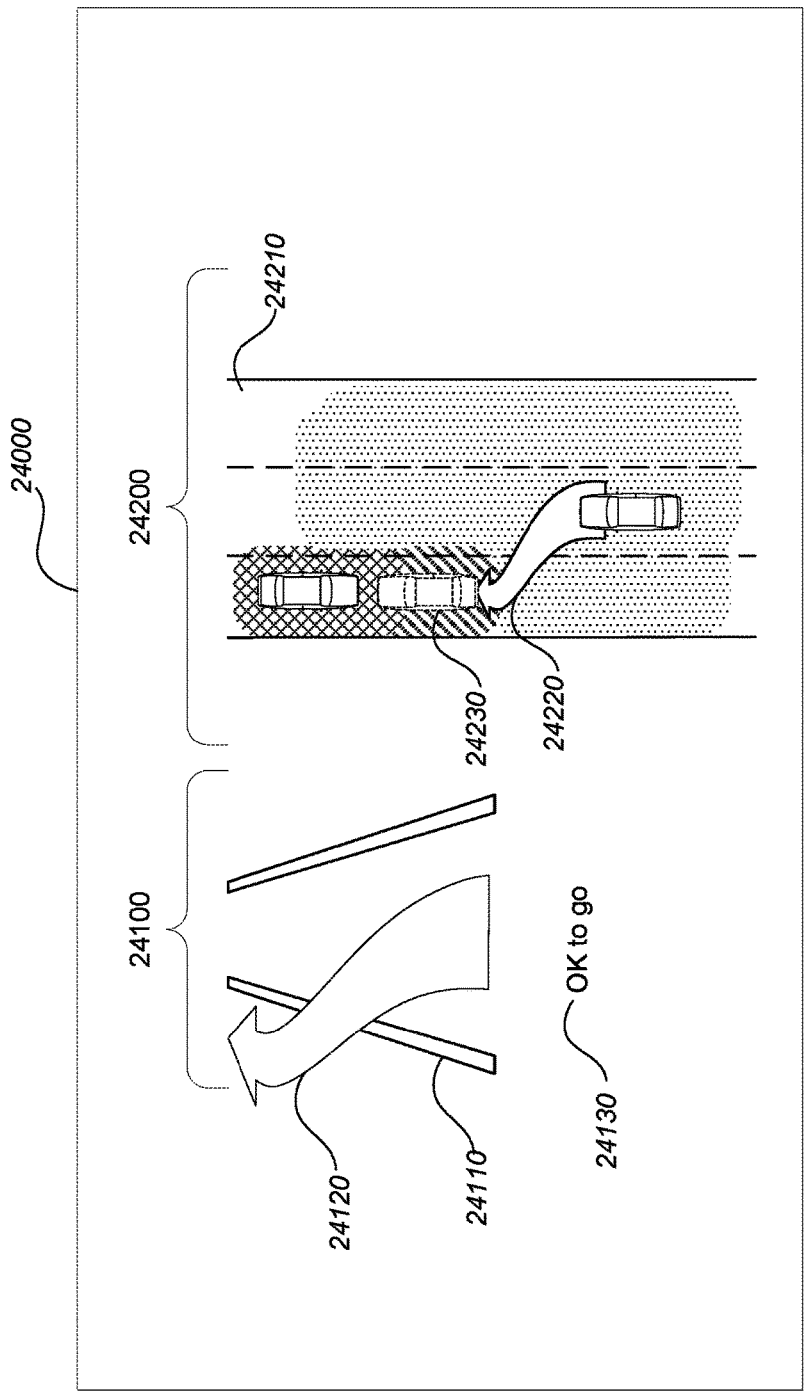
FIG. 24 shows another example of a graphical representations of vehicle operation assistance information for autonomous vehicle control lane change in accordance with this disclosure.
Figure 25:
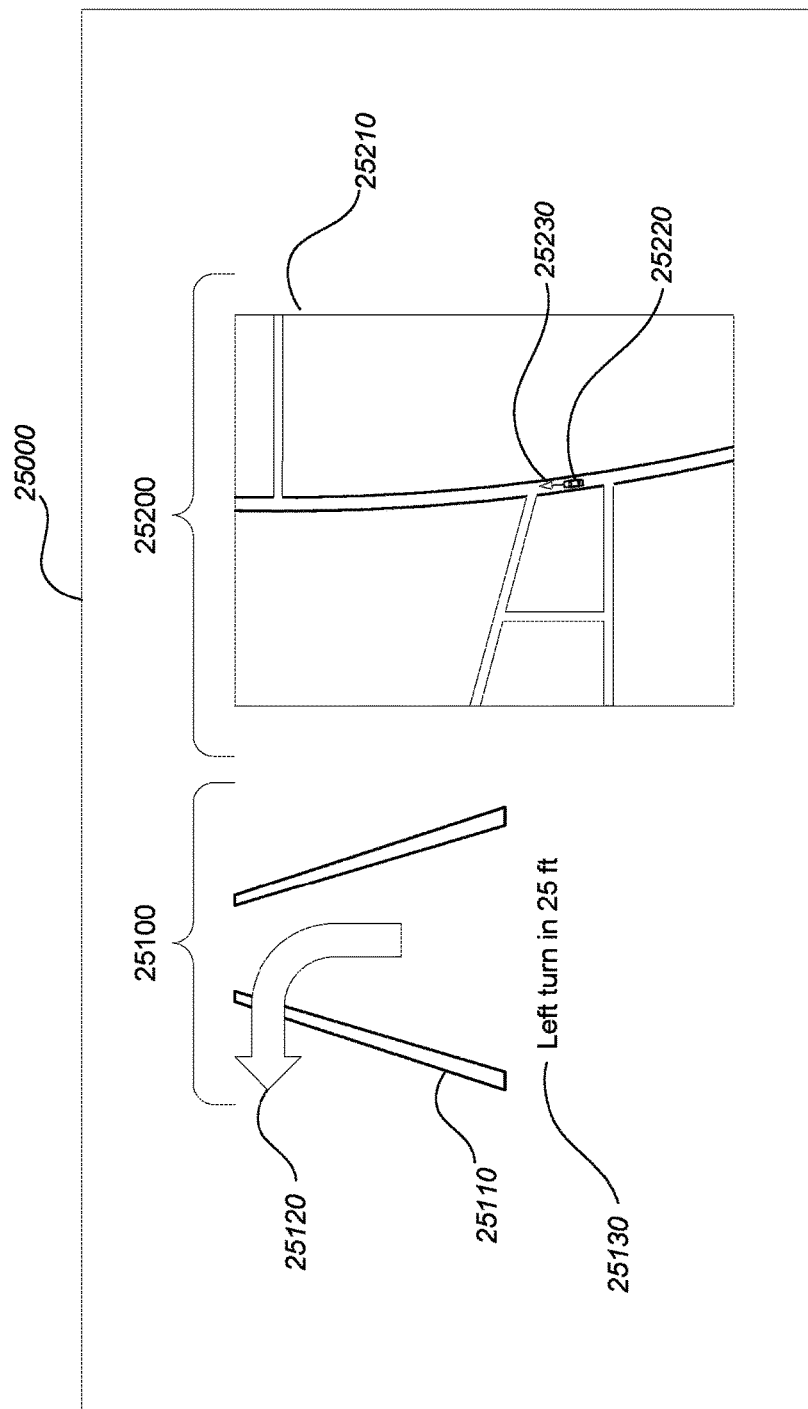
FIG. 25 shows an example of a graphical representations of vehicle operation assistance information for an autonomous vehicle control turn operation in accordance with this disclosure.
Figure 26:
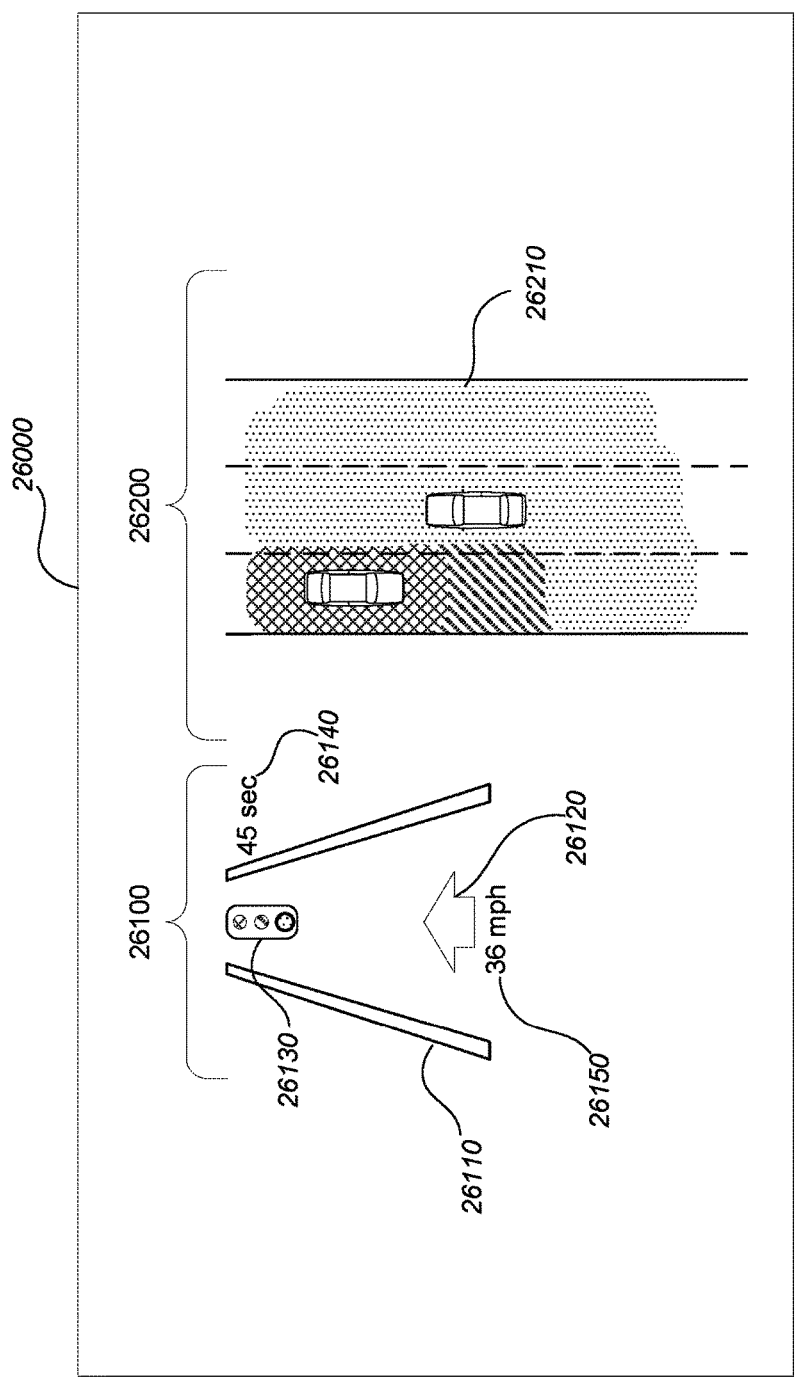
FIG. 26 shows an example of a graphical representations of vehicle operation assistance information for an autonomous vehicle speed control operation in accordance with this disclosure.

In some embodiments, vehicle operation assistance information may be generated in response to information indicating a vehicle operation control transfer, such as a transfer from autonomous vehicle control to driver control, or from driver control to autonomous vehicle control, or in response to information indicating an autonomous vehicle operation or maneuver, such as a lane change, a speed change, a turn, or parking. In some embodiments, vehicle operation assistance information for autonomous vehicle control operation may include presenting a representation of the vehicle operation assistance information. Examples of presenting vehicle operation assistance information for vehicle operation control transfer are shown in FIG. 22, examples of presenting vehicle operation assistance information for an autonomous vehicle lane change operation are shown in FIGS. 23-24, an example of presenting vehicle operation assistance information for an autonomous vehicle turn operation is shown in FIG. 25, and an example of presenting vehicle operation assistance information for an autonomous vehicle speed change operation is shown in FIG. 26.

FIG. 22 shows examples of graphical representations of vehicle operation assistance information for autonomous vehicle control transfer in accordance with this disclosure. In some embodiments, generating a representation 22100/22200/22300 of the vehicle operation assistance information, such as the generating shown at 21400 in FIG. 21, may include identifying, or generating, one or more text representations 22218/22218 of the vehicle operation assistance information, generating or identifying one or more pictographic representations 22112-22116/22212-22216/22312-22316 of the vehicle operation assistance information, generating or identifying one or more verbal descriptions 22122/22222/22322 of the vehicle operation assistance information, or a combination thereof. In some embodiments, the graphical representations of vehicle operation assistance information for autonomous vehicle control transfer may be similar to the graphical representation shown in FIG. 17, except as described herein.

In some embodiments, a pictographic representation 22112-22116/22212-22216/22312-22316 of vehicle operation assistance information may be similar to an icon, and may include a simple, easily recognizable, representation of the vehicle operation assistance information.

In some embodiments, a pictographic representation 22212-22216/22212-22216/22312-22316 of vehicle operation assistance information may be identified, or generated, based on the vehicle operation assistance information, the immanency, the urgency, vehicle operation control metrics, driver status information for the vehicle operation control metrics, vehicle operation control status information for the vehicle operation control metrics, or a combination thereof. In some embodiments, the vehicle operation control status information may indicate whether the corresponding vehicle operation control is driver controlled or autonomous vehicle controlled. In some embodiments, one or more pictographic representation 22212-22216/22212-22216/22312-22316 may oscillate, such as in size, color, or brightness.

For example, the vehicle operation assistance information may indicate a request for vehicle operation control transfer, one or more vehicle operation control metrics corresponding to the request, such as a steering control metric, an acceleration control metric, and a situational awareness control metric, may be identified, driver status information corresponding to the vehicle operation control metrics may be identified, vehicle operation control status information corresponding to the vehicle operation control metrics may be identified, an immanency may be identified, an urgency may be identified, and presenting a representation 22200/22200/22300 of the vehicle operation assistance information may include identifying, or generating, pictographic representations 22212-22216/22212-22216/22312-22316 of one or more of the vehicle operation control metrics, such as a pictographic representation of an acceleration vehicle operation control metric 22212/22212/22312, a pictographic representation of a steering vehicle operation control metric 22214/22214/22314, or a pictographic representation of a situational awareness vehicle operation control metric 22216/22216/22316, as shown, based on the vehicle operation control metrics, the driver status information, the vehicle operation control status information, the immanency, the urgency, or a combination thereof. In some embodiments, a pictographic representation 22212-22216/22212-22216/22312-22316 may include a visual indication of the corresponding driver control status, the corresponding vehicle operation control status, the immanency, the urgency, or a combination thereof.

In some embodiments, a text representation 22218/22218 of the vehicle operation assistance information may include a representation of the immanence. For example, the vehicle operation assistance information may indicate a request for vehicle operation control transfer, and the text representation 22218/22218 of the vehicle operation assistance information may indicate a temporal distance, or amount of time, to the vehicle operation control transfer, such as "30 seconds".

In some embodiments, a verbal description 22222/22222/22322 of the vehicle operation assistance information may explain or confirm the meaning of the pictographic representation 22212-22216/22222-22216/22312-22316, which may include an explanation of the vehicle operation assistance information, an explanation of one or more of the vehicle operation control metrics, a representation of the immanence, an explanation of a vehicle operation control status, or a combination thereof. In some embodiments, a verbal description explaining one or more of the identified vehicle operation control metrics may be omitted.

In an example, as shown in the representation at the top 22100 of FIG. 22, the vehicle operation assistance information may indicate a driver initiated request for vehicle operation control transfer, the immanency may be identified as five (5) seconds, the urgency may be identified as the advisory urgency, a steering control metric, an acceleration control metric, and a situational awareness control metric, may be identified, a disengaged driver status may be identified for each of the steering control metric, the acceleration control metric, and the situational awareness control metric, the text representation 22118 may include "5 seconds", and a first portion 22110 of the graphical representation may include a pictographic representation of the acceleration control metric 22112, which may visually indicate the corresponding disengaged driver status using, for example, a defined color, such as yellow, as indicated by the stippling at 22112, a pictographic representation of the steering control metric, which may visually indicate the corresponding disengaged driver status, as indicated by the stippling at 22114, and a pictographic representation of the situational awareness control metric, which may visually indicate the corresponding disengaged driver status, as indicated by the stippling at 22116, which may be presented via the primary graphical display portion. A second portion 22120 of the representation at the top 22100 of FIG. 22 may include a verbal description 22122 explaining the request for vehicle operation control transfer, the steering control metric, the acceleration control metric, and the immanency, which may be presented via the secondary graphical display portion. In the in the representation shown at the top 22100 of FIG. 22, a verbal description explaining the situational awareness vehicle operation control metric is omitted.

In another example, as shown in the representation at the middle 22200 of FIG. 22, the vehicle operation assistance information may indicate a driver initiated request for vehicle operation control transfer, the immanency may be identified as three (3) seconds, the urgency may be identified as the warning urgency, a steering control metric, an acceleration control metric, and a situational awareness control metric, may be identified, an engaged driver status may be identified for the steering control metric, a disengaged driver status may be identified for the acceleration control metric, and an engaged driver status may be identified for the situational awareness control metric, the text representation 22218 may include "3 seconds", and a first portion 22210 of the graphical representation may include a pictographic representation of the acceleration control metric 22212, which may visually indicate the corresponding disengaged driver status using, for example, a defined color, such as red, as indicated by the white coloring at 22212, and which may include oscillation, a pictographic representation of the steering control metric, which may visually indicate the corresponding engaged driver status using, for example, a defined color, such as green, as indicated by the black coloring at 22214, and a pictographic representation of the situational awareness control metric, which may visually indicate the corresponding engaged driver status, as indicated by the black coloring at 22216, which may be presented via the primary graphical display portion. A second portion 22220 of the representation at the middle 22200 of FIG. 22 may include a verbal description 22222 explaining the request for vehicle operation control transfer, the disengaged steering control metric, and the immanency, which may be presented via the secondary graphical display portion. In the in the representation shown at the middle 22200 of FIG. 22, a verbal description explaining the situational awareness vehicle operation control metric is omitted.

In another example, as shown in the representation at the bottom 22300 of FIG. 22, the vehicle operation assistance information may indicate a driver initiated request for vehicle operation control transfer, the vehicle operation control transfer may be performed, such as in response to determining an engaged driver status for the identified vehicle operation control metrics, and a first portion 22310 of the graphical representation may include a pictographic representation of the acceleration control metric 22312, which may visually indicate a transferred operational control status for each of the identified vehicle operation control metrics using, for example, a defined color, such as green, as indicated by the black coloring at 22312/22314/22316, which may be presented via the primary graphical display portion. A second portion 22320 of the representation at the bottom 22300 of FIG. 22 may include a verbal description 22322 explaining that the vehicle operation control transfer is complete, which may be presented via the secondary graphical display portion.

FIGS. 23-24 show examples of graphical representations of vehicle operation assistance information for autonomous vehicle control lane change in accordance with this disclosure. In some embodiments, the urgency of vehicle operation assistance information for autonomous vehicle control lane change may be the advance urgency, and presenting the vehicle operation assistance information may be omitted. In some embodiments, the urgency of vehicle operation assistance information for autonomous vehicle control lane change may be the advisory or the warning urgency, and the vehicle operation assistance information may be presented in response to identifying the vehicle operation assistance information, as shown in FIG. 23, the vehicle operation assistance information may be presented in response to receiving information approving the autonomous vehicle control lane change, as shown in FIG. 24, or the vehicle operation assistance information may be presented in response to determining that the immanency of vehicle operation assistance information for autonomous vehicle control lane change is within the minimum relevant immanence, as also shown in FIG. 24.

FIG. 23 shows an example of a graphical representations of vehicle operation assistance information for autonomous vehicle control lane change in accordance with this disclosure. In some embodiments, a representation 23000 of the vehicle operation assistance information may be generated, such as the generating shown at 21400 in FIG. 21. In some embodiments, the representation 23000 may include a first portion 23100, a second portion 23200, or both. In some embodiments, generating the representation 23000 may include generating, or identifying, one or more pictographic representations 23110-23120/23210-23260 of the vehicle operation assistance information, generating or identifying one or more verbal descriptions 23130 of the vehicle operation assistance information, or a combination thereof. In some embodiments, the graphical representations of vehicle operation assistance information for autonomous vehicle control operation may be similar to the graphical representation shown in FIG. 17, except as described herein.

In some embodiments, a pictographic representation 23110-23120/23210-23260 of vehicle operation assistance information may be identified, or generated, based on the vehicle operation assistance information, the immanency, the urgency, whether a candidate vehicle control operation is an approved vehicle control operation, or a combination thereof.

For example, the vehicle operation assistance information may indicate a lane change vehicle control operation identified based on current vehicle operating environment information, an immanency may be identified, an urgency may be identified, whether the candidate vehicle control operation is an approved vehicle control operation may be identified, and generating a representation 23000 of the vehicle operation assistance information may include identifying, or generating, pictographic representations 23110-23120/23210-23260, which may include one or more pictographic representations of a current vehicle operational environment 23110/23120, a pictographic representation of the candidate vehicle control operation 23120, a pictographic representation of the vehicle 23220, or a combination thereof.

In some embodiments, a pictographic representations of a current vehicle operational environment, such as a graphical representation of a portion of the vehicle transportation network spatially proximate to the vehicle, may be a perspective representation, as shown at 23110. In some embodiments, a pictographic representation of a current vehicle operational environment may be a top-down, or bird's eye, representation, as shown at 23210.

In some embodiments, a pictographic representation of a current vehicle operational environment 23210 may include a pictographic representation of a current portion of the vehicle transportation network 23210, a pictographic representation of one or more other vehicles 23212 proximate to the vehicle, a graphical representation of expected spatial availability proximate to the vehicle 23214/23216/23218. In some embodiments, the graphical representation of expected spatial availability proximate to the vehicle 23214/23216/23218, may be a heat-map or color-map representation of probabilities that areas proximate to the vehicle in the vehicle transportation network are available for traversal by the vehicle. Although not shown expressly in FIG. 23, in some embodiments, a pictographic representation of a current vehicle operational environment 23210 may be generated based on sensor data, such as data generated by a sensor of the vehicle, such as the sensors 1360 shown in FIG. 1. For example, one or more sensors may detect road geometry and obstacles, such as fixed obstacles, vehicles, pedestrians, or the like, and the graphical representation of expected spatial availability proximate to the vehicle may be based on the sensed data.

In some embodiments, the graphical representation of expected spatial availability proximate to the vehicle may include a first portion 23214 indicating that an expected spatial availability for the portion of the vehicle transportation network represented thereby is high, as indicated by the stippling shown at 23214 in FIG. 23, which may indicate a determination of a high probability, such as a probability greater than a defined available threshold, such as 95%, that the corresponding portion of the vehicle transportation network is available for traversal by the vehicle. Although the high availability areas are shown with stippling in FIG. 23, the high probability areas 23214 may be represented by any visual representation capable of indicating probable availability, such as the color green.

In some embodiments, the graphical representation of expected spatial availability proximate to the vehicle may include a second portion 23216 indicating that an expected spatial availability for the portion of the vehicle transportation network represented thereby is low, as indicated by the cross-hatching shown at 23216 in FIG. 23, which may indicate a determination of a low probability, such as a probability within a defined unavailable threshold, such as 25%, that the corresponding portion of the vehicle transportation network is unavailable for traversal by the vehicle. Although the low availability areas 23216 are shown with cross-hatching in FIG. 23, the low probability areas may be represented by any visual representation capable of indicating probable unavailability, such as the color red.

In some embodiments, the graphical representation of expected spatial availability proximate to the vehicle may include a third portion 23218 indicating that an expected spatial availability for the portion of the vehicle transportation network represented thereby is higher than the low probability and lower than the high probability, such as in the range 26-94%, as indicated by the diagonal lines shown at 23218 in FIG. 23, which may indicate a determination of a probability, such as a probability greater than the defined unavailable threshold and within the defined available threshold, that the corresponding portion of the vehicle transportation network is available-with-caution for traversal by the vehicle. Although the available-with-caution areas 23218 are shown with diagonal lines in FIG. 23, the available-with-caution areas may be represented by any visual representation capable of indicating conditional availability, such as the color yellow.

In some embodiments, a verbal description 23130 of the vehicle operation assistance information may explain or confirm the meaning of the pictographic representation 23110-23120/23210-23260, which may include an explanation of the vehicle operation assistance information, a request for approval of a vehicle operation, a representation of the immanence, or a combination thereof. Although shown below some of the pictographic representations of the current vehicle operational environment 23110/23120, the verbal description 23130 of the vehicle operation assistance information may be presented above, to the side, or superimposed over the pictographic representations of the current vehicle operational environment 23110/23120. For example, in some embodiments, the pictographic representations of the current vehicle operational environment 23110/23120 may be presented and the verbal description 23130 of the vehicle operation assistance information may be presented superimposed over the pictographic representations of the current vehicle operational environment 23110/23120 after a short delay, such as one or two seconds.

FIG. 24 shows another example of a graphical representations of vehicle operation assistance information for autonomous vehicle control lane change in accordance with this disclosure. The representation shown in FIG. 24 may be similar to the representation shown in FIG. 23, except as described herein. The example shown in FIG. 23 is an example of a graphical representations of vehicle operation assistance information for autonomous vehicle control lane change presented in response to identifying the vehicle operation assistance information. The example shown in FIG. 24 shows an example of a graphical representations of vehicle operation assistance information for autonomous vehicle control lane change that include elements presented in response to receiving information approving the autonomous vehicle control lane change, and elements presented in response to determining that the immanency of vehicle operation assistance information for autonomous vehicle control lane change is within the minimum relevant immanence.

In some embodiments, the representation 24000 may include a first portion 24100, a second portion 24200, or both. In some embodiments, generating the representation 24000 may include generating, or identifying, one or more pictographic representations 24110-24120/24210-21230 of the vehicle operation assistance information generating or identifying one or more text representations 24130 of the vehicle operation assistance information, or a combination thereof. In some embodiments, a pictographic representation of a current vehicle operational environment may be a top-down, or bird's eye, representation, as shown at 24210.

For example, the vehicle operation assistance information may be presented in response to receiving information approving the autonomous vehicle control lane change, which may indicate that the autonomous vehicle control lane change operation is an approved vehicle control operation, and generating the representation of the vehicle operation assistance information may include generating the text representation 24130, such as the text "OK to GO", a pictographic representation of the candidate vehicle control operation 24120, or a combination thereof, as shown for the first portion 24100. In some embodiments, the pictographic representation of the candidate vehicle control operation 24120 may include a visual indication that the autonomous vehicle control lane change operation is an approved vehicle control operation, such as by using a green color. In some embodiments, an auditory signal, such as a chime, may be presented in response to receiving information approving the autonomous vehicle control lane change.

In some embodiments, the vehicle operation assistance information may be presented in response to determining that the immanency of vehicle operation assistance information for autonomous vehicle control lane change is within the minimum relevant immanence. For example, the immanency of vehicle operation assistance information for autonomous vehicle control lane change may be within the minimum relevant immanence and the vehicle control lane change operation may be an unapproved vehicle control operation, and generating the representation of the vehicle operation assistance information may include generating a text representation (not shown), such as the text "Maneuver aborted", a pictographic representation of the unapproved candidate vehicle control operation 24120, or a combination thereof, for the first portion 24100. In some embodiments, the pictographic representation of the candidate vehicle control operation 24120 may include a visual indication that the autonomous vehicle control lane change operation is an unapproved vehicle control operation, such as by using a yellow color.

In another example, the immanency of vehicle operation assistance information for autonomous vehicle control lane change may be within the minimum relevant immanence and the autonomous vehicle control lane change operation may be an approved vehicle control operation, the autonomous vehicle control lane change operation may be performed, and generating the representation of the vehicle operation assistance information may omit generating a text representation, and may include generating a pictographic representation of the approved candidate vehicle control operation 24120, for the first portion 24100. In some embodiments, the pictographic representation of the candidate vehicle control operation 24120 may include a visual indication that the autonomous vehicle control lane change operation is an approved vehicle control operation and is being performed, such as by using a green color and oscillating, blinking, or flashing, the pictographic representation of the candidate vehicle control operation 24120.

In some embodiments, the second portion 24200 of the representation may be similar to the second portion 23200 as shown in FIG. 23, except as described herein. In some embodiments, the immanency of vehicle operation assistance information for autonomous vehicle control lane change may be within the minimum relevant immanence, the autonomous vehicle control lane change operation may be an approved vehicle control operation, the autonomous vehicle control lane change operation may be performed, and the second portion 24200 of the representation may include a representation of the autonomous vehicle lane change operation 24220, an indication of a result of the autonomous vehicle control lane change operation 24230, as indicated by the vehicle drawn with broken lines in FIG. 24, or a combination thereof. In some embodiments, the immanency of vehicle operation assistance information for autonomous vehicle control lane change may exceed the minimum relevant immanence, or the autonomous vehicle control lane change operation may be an unapproved vehicle control operation, and the second portion 24200 of the representation may omit the representation of the autonomous vehicle lane change operation 24220 and the indication of the result of the autonomous vehicle control lane change operation 24230.

FIG. 25 shows an example of a graphical representations of vehicle operation assistance information for an autonomous vehicle control turn operation in accordance with this disclosure. For example, the vehicle may traverse a portion of a vehicle transportation network in accordance with a defined route from an origin to a destination; the route may include a turn from a road to another road, and the vehicle operation assistance information may include an indication of the turn as a candidate vehicle control operation, as shown in FIG. 25.

In some embodiments, a representation 25000 of the vehicle operation assistance information may be generated, such as the generating shown at 21400 in FIG. 21. In some embodiments, the representation 25000 may include a first portion 25100, a second portion 25200, or both. In some embodiments, generating the representation 25000 may include generating, or identifying, one or more pictographic representations 25110-25120/25210-25230 of the vehicle operation assistance information, generating or identifying one or more verbal descriptions 25130 of the vehicle operation assistance information, or a combination thereof.

In some embodiments, a pictographic representation 25110-25120/25210-25230 of vehicle operation assistance information may be identified, or generated, based on the vehicle operation assistance information, the immanency, the urgency, whether a candidate vehicle control operation is an approved vehicle control operation, or a combination thereof.

For example, the vehicle operation assistance information may indicate a candidate vehicle control operation identified based on a defined route, such as a route from an origin to a destination being traversed by the vehicle, an immanency may be identified, an urgency may be identified, whether the candidate vehicle control operation is an approved vehicle control operation may be identified, and generating a representation 25000 of the vehicle operation assistance information may include identifying, or generating, pictographic representations 25110-25120/25210-25230, which may include one or more pictographic representations of a current vehicle operational environment 25110/25210, a pictographic representation of the candidate vehicle control operation 25120, a pictographic representation of the vehicle 25220, a pictographic representation of a route, trajectory, or expected path for the vehicle 25230, or a combination thereof.

In some embodiments, a pictographic representations of a current vehicle operational environment, such as a graphical representation of a portion of the vehicle transportation network spatially proximate to the vehicle, may be a perspective representation, as shown at 25110. In some embodiments, a pictographic representation of a current vehicle operational environment may be map view representation, as shown at 25210.

In some embodiments, a pictographic representation of a current vehicle operational environment 25210 may include a pictographic representation of a current portion of the vehicle transportation network, a pictographic representation of the vehicle 25220, and a pictographic representation of a trajectory 25230 of the vehicle, or a combination thereof.

In some embodiments, a verbal description 25130 of the vehicle operation assistance information may explain or confirm the meaning of the pictographic representation 25110-25120/25210-25230, which may include an explanation of the vehicle operation assistance information, an indication of an option to cancel a vehicle operation, a representation of the immanence, or a combination thereof. Although shown below some of the pictographic representations of the current vehicle operational environment 25110/25120, the verbal description 25130 of the vehicle operation assistance information may be presented above, to the side, or superimposed over the pictographic representations of the current vehicle operational environment 25110/25120. For example, in some embodiments, the pictographic representations of the current vehicle operational environment 25110/25120 may be presented and the verbal description 25130 of the vehicle operation assistance information may be presented superimposed over the pictographic representations of the current vehicle operational environment 25110/25120 after a short delay, such as one or two seconds.

In some embodiments, the verbal description 25130 may indicate a description of a candidate vehicle control operation, and an indication of the immanence, such as "Left turn in 25 ft" as shown. In some embodiments, the verbal description 25130 may include an indication of an option to cancel the candidate vehicle control operation, such as "Turning in 3 ft (to cancel maneuver press button)".

FIG. 26 shows an example of a graphical representations of vehicle operation assistance information for an autonomous vehicle speed control operation in accordance with this disclosure. In some embodiments, a vehicle may traverse a portion of a vehicle transportation network, the vehicle may approach a traffic control device of the vehicle transportation network, the vehicle may receive, or otherwise identify, vehicle operation assistance information indicating a recommended speed profile for controlling the vehicle to traverse the vehicle transportation network in accordance with expected permitted right-of-way signal information for the traffic control device, and the vehicle operation assistance information may include a representation of the expected permitted right-of-way signal information for the traffic control device, a representation of a current speed of the vehicle, a representation of the immanence, or a combination thereof, as shown in FIG. 26.

In some embodiments, a representation 26000 of the vehicle operation assistance information may be generated, such as the generating shown at 21400 in FIG. 21. In some embodiments, the representation 26000 may include a first portion 26100, a second portion 26200, or both. In some embodiments, generating the representation 26000 may include generating, or identifying, one or more pictographic representations 26110-26130/26210 of the vehicle operation assistance information, generating or identifying one or more verbal descriptions 26130 of the vehicle operation assistance information, or a combination thereof.

In some embodiments, a pictographic representation 26110-26130/26210 of vehicle operation assistance information may be identified, or generated, based on the vehicle operation assistance information, the immanency, the urgency, whether a candidate vehicle control operation is an approved vehicle control operation, expected permitted right-of-way signal information, or a combination thereof.

For example, the vehicle operation assistance information may indicate a recommended speed profile for controlling the vehicle to traverse the vehicle transportation network in accordance with expected permitted right-of-way signal information for a traffic control device of the vehicle transportation network, an immanency may be identified, an urgency may be identified, whether the candidate vehicle control operation is an approved vehicle control operation may be identified, and generating a representation 26000 of the vehicle operation assistance information may include identifying, or generating, pictographic representations 26110-26130/26210, which may include one or more pictographic representations of a current vehicle operational environment 26110/26210, a pictographic representation of the a current trajectory of the vehicle 26120, a pictographic representation of the expected permitted right-of-way signal information for a traffic control device 26130, or a combination thereof.

In some embodiments, a pictographic representations of a current vehicle operational environment, such as a graphical representation of a portion of the vehicle transportation network spatially proximate to the vehicle, may be a perspective representation, as shown at 26110. In some embodiments, a pictographic representation of a current vehicle operational environment may be map view representation, as shown at 26210. In some embodiments, a pictographic representation of a current vehicle operational environment may be a top-down, or bird's eye, representation, as shown at 24210.

In some embodiments, a pictographic representation of a current vehicle operational environment 26110 may include a pictographic representation of a current portion of the vehicle transportation network, a pictographic representation of a current trajectory of the vehicle 26120, and a pictographic representation of the expected permitted right-of-way signal information for a traffic control device 26130, or a combination thereof. For example, the expected permitted right-of-way signal information for a traffic control device 26130 may indicate that a traffic control light is currently display a green signal indicating a permitted right-of-way. Although not shown expressly in FIG. 26, in some embodiments, the right-of-way signal information for the traffic control device may indicate a cautionary permitted right-of-way signal, such as a yellow light, and the pictographic representation of the right-of-way signal information for the traffic control device 26130 may indicate the cautionary permitted right-of-way signal status.

Although not shown expressly in FIG. 26, in some embodiments, the vehicle may be stopped at a denied right-of-way signal, such as a red light, and the pictographic representation of the right-of-way signal information for the traffic control device 26130 may indicate the denied right-of-way status.

In some embodiments, a text representation 26140/26150 of the vehicle operation assistance information may include a representation of the immanence 26140, a representation of a current speed of the vehicle 26150, or both. For example, the representation of the immanence 26140 may indicate an expected duration for the signal, such as a period of time before a permitted right-of-way signal transitions to a denied right-of-way signal, or a period of time before a denied right-of-way signal transitions to a permitted right-of-way signal, such as "45 sec" as shown, or, in another example, "Green in 5 sec" (not shown).

In some embodiments, the immanency may be within the minimum relevant immanence, which may indicate that the vehicle has traversed the portion of the vehicle transportation network corresponding to the traffic control device under autonomous vehicle control, and a verbal description of the vehicle operation assistance information (not shown), which may indicate a vehicle operation control transfer from autonomous vehicle control to driver control, may be presented.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "exemplary", "embodiment", "implementation", "aspect", "feature", or "element" indicate serving as an example, instance, or illustration. For the avoidance of doubt, the subject matter disclosed herein is not limited by such examples. Unless expressly indicated, any example, embodiment, implementation, aspect, feature, or element is independent of each other example, embodiment, implementation, aspect, feature, or element and may be used in combination with any other example, embodiment, implementation, aspect, feature, or element. In addition, the examples, embodiments, implementations, aspects, features, and elements described herein as such are not necessarily preferred or advantageous over other examples, embodiments, implementations, aspects, features, and elements, and the examples, embodiments, implementations, aspects, features, and elements described herein do not preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding other elements.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, embodiments, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A vehicle configured to traverse a portion of a vehicle transportation network, the vehicle comprising:
    a primary graphical display portion;
    a secondary graphical display portion; and
    a processor configured to execute instructions stored on a non-transitory computer readable medium to:
        identify a vehicle operation assistance information item, the vehicle operation assistance information item indicating a location of an expected vehicle operation control transfer; and
        in response to a determination that an immanency for the vehicle operation assistance information item is within a maximum relevant immanence, present a representation of the vehicle operation assistance information item, wherein presenting the representation of the vehicle operation assistance information item includes:
            in response to a determination that an urgency for the vehicle operation assistance information item indicates a warning urgency or an advisory urgency, controlling the primary graphical display portion and the secondary graphical display portion to present a graphical representation of the vehicle operation assistance information item, such that the primary graphical display portion presents a first portion of the graphical representation and the secondary graphical display portion presents a second portion of the graphical representation.

2. The vehicle of claim 1, further comprising:
    a first graphical display unit, wherein the first graphical display unit includes the first graphical display portion; and
    a second graphical display unit, wherein the second graphical display unit includes the second graphical display portion, and wherein the second graphical display unit is physically independent of the first graphical display unit.

3. The vehicle of claim 1, wherein the primary graphical display portion is spatially located within the vehicle along a first angular offset from a center of a primary field of view of a driver of the vehicle, and wherein the secondary graphical display portion is spatially located within the vehicle along a second angular offset from the center of the primary field of view of the driver of the vehicle, wherein the second angular offset is greater than the first angular offset, such that the primary graphical display portion is visually distinct from the secondary graphical display portion.

4. The vehicle of claim 1, wherein the processor is configured to execute instructions stored on a non-transitory computer readable medium to determine the urgency based on the immanency by:
    in response to a determination that the vehicle operation assistance information item includes an urgency value, identifying the urgency value as the urgency; and
    in response to a determination that the vehicle operation assistance information item omits the urgency value:
        in response to a determination that the immanency exceeds an advisory cost, determining that the urgency is an advance urgency; and
        in response to a determination that the immanency is within the advisory cost:
            in response to a determination that the immanency exceeds a warning cost, determining that the urgency is the advisory urgency; and
            in response to a determination that the immanency is within the warning cost, determining that the urgency is the warning urgency.

5. The vehicle of claim 1, wherein the processor is configured to execute instructions stored on a non-transitory computer readable medium to:
    identify the vehicle operation assistance information item in response to at least one of:
        receiving information indicating a vehicle operation control transfer request that includes a driver initiated vehicle operation control transfer request; or
        identifying information indicating the vehicle operation control transfer request that includes a vehicle initiated vehicle operation control transfer request.

6. The vehicle of claim 5, wherein the processor is configured to execute instructions stored on a non-transitory computer readable medium to identify the information indicating the vehicle operation control transfer request that includes the vehicle initiated vehicle operation control transfer request, in response to at least one of:
    receiving, via a wireless electronic communication link, external vehicle operation assistance information, wherein the external vehicle operation assistance information includes at least one of an infrastructure message from an external infrastructure device or an inter-vehicle message from another vehicle;

identifying vehicle transportation network information representing a portion of a vehicle transportation network in response to traversing a part of the portion of the vehicle transportation network; or receiving sensor information from a sensor, wherein the vehicle includes the sensor.

7. The vehicle of claim 6, wherein the processor is configured to execute instructions stored on a non-transitory computer readable medium to determine the immanency by:

in response to a determination that the vehicle operation assistance information item includes an immanency value, identifying the immanency value as the immanency; and in response to a determination that the vehicle operation assistance information item omits the immanency value:

in response to a determination that a probability that a current expected path for the vehicle intersects with a target geospatial location in the vehicle transportation network indicated by the vehicle operation assistance information item is within a minimum relevance threshold, identifying the immanency such that the immanency exceeds the maximum relevant immanence; and in response to a determination that the probability that the current expected path for the vehicle intersects with the target geospatial location exceeds the minimum relevance threshold, identifying, as the immanency, a first temporal cost for the vehicle to traverse the vehicle transportation network from a current geospatial location of the vehicle in the vehicle transportation network to the target geospatial location.

8. The vehicle of claim 7, wherein, on a condition that identifying the vehicle operation assistance information item includes identifying vehicle transportation network information representing the portion of the vehicle transportation network, the processor is configured to execute instructions stored on a non-transitory computer readable medium to determine the target geospatial location by:

identifying a route for the vehicle to traverse the vehicle transportation network from an origin to a destination, wherein the route includes the current geospatial location of the vehicle and the target geospatial location;

identifying a portion of the route as a driver control portion; and identifying a geospatial location in the vehicle transportation network of the driver control portion that is proximate to the current geo spatial location of the vehicle along the route as the target geospatial location.

9. The vehicle of claim 5, wherein:

on a condition that the identifying the vehicle operation assistance information item includes receiving information indicating the vehicle operation control transfer request that includes the driver initiated vehicle operation control transfer request, the vehicle operation control transfer request includes:

a request to transfer vehicle operation control from the driver to an autonomous vehicle control unit of the vehicle; or a request to transfer vehicle operation control from the autonomous vehicle control unit of the vehicle to the driver; and on a condition that the identifying the vehicle operation assistance information item includes identifying information indicating the vehicle operation control transfer request that includes the vehicle initiated vehicle operation control transfer request, the vehicle operation control transfer request includes the request to transfer vehicle operation control from the autonomous vehicle control unit of the vehicle to the driver.

10. The vehicle of claim 1, wherein the processor is configured to execute instructions stored on a non-transitory computer readable medium to identify a vehicle operation control metric for the expected vehicle operation control transfer in response to identifying the vehicle operation assistance information item, wherein the vehicle operation control metric is a steering control metric, an acceleration control metric, or a situational awareness control metric.

11. The vehicle of claim 10, wherein controlling the primary graphical display portion and the secondary graphical display portion to present a graphical representation of the vehicle operation assistance information item includes:

in response to a determination that the urgency is the advisory urgency, controlling the primary graphical display portion to present the first portion of the graphical representation such that the first portion of the graphical representation includes an advisory pictographic representation of the vehicle operation control metric and a primary representation of the immanency proximate to the advisory pictographic representation of the vehicle operation control metric in the first portion of the graphical representation; and in response to a determination that the urgency is the warning urgency:

in response to a determination that the vehicle operation control transfer request includes the request to transfer vehicle operation control from the autonomous vehicle control unit of the vehicle to the driver:

in response to a determination that a driver status for the vehicle operation control metric indicates a disengaged driver status, controlling the primary graphical display portion to present the first portion of the graphical representation such that the first portion of the graphical representation includes a warning pictographic representation of the vehicle operation control metric.

12. The vehicle of claim 11, wherein the processor is configured to execute instructions stored on a non-transitory computer readable medium to:

in response to a determination that the immanency is within a minimum relevant immanence:

in response to the determination that the driver status for the vehicle operation control metric indicates the disengaged driver status:

identify a secondary autonomous vehicle control action responsive to the vehicle operation assistance information item;

control the primary graphical display portion to present the first portion of the graphical representation such that the first portion of the graphical representation includes a representation of the secondary autonomous vehicle control action; and control the vehicle in accordance with the secondary autonomous vehicle control action, and in response to a determination that the driver status for the vehicle operation control metric indicates an engaged driver status:

transfer control of the vehicle operation control; and in response to transferring control of the vehicle operation control, control the primary graphical display portion to present the first portion of the graphical representation such that the first portion of the graphical representation includes a transferred pictographic representation of the vehicle operation control metric.

13. The vehicle of claim 10, wherein controlling the primary graphical display portion and the secondary graphical display portion to present a graphical representation of the vehicle operation assistance information item includes:
   in response to a determination that the urgency is an advance urgency, controlling the secondary graphical display portion to present the graphical representation of the vehicle operation assistance information item such that the graphical representation includes a verbal representation of the expected vehicle operation control transfer;
   in response to a determination that the urgency is the advisory urgency, controlling the secondary graphical display portion to present the second portion of the graphical representation such that the second portion of the graphical representation includes a verbal representation of the vehicle operation control metric, and such that the second portion of the graphical representation includes a secondary representation of the immanency proximate to the verbal representation; and
   in response to a determination that the urgency is the warning urgency, controlling the secondary graphical display portion to present the second portion of the graphical representation such that the second portion of the graphical representation includes a verbal representation of the vehicle operation control metric.

14. The vehicle of claim 1, further comprising:
   an auditory presentation device; and
   wherein the processor is configured to execute instructions stored on a non-transitory computer readable medium to, in response to the determination that the urgency indicates the warning urgency or the advisory urgency, control the auditory presentation device to present an auditory representation of the vehicle operation assistance information item.

15. A vehicle configured to traverse a portion of a vehicle transportation network, the vehicle comprising:
   a primary graphical display portion;
   a secondary graphical display portion;
   a trajectory controller; and
   a processor configured to execute instructions stored on a non-transitory computer readable medium to:
      identify a vehicle operation assistance information item, the vehicle operation assistance information item indicating a location of an expected vehicle operation control transfer; and
      in response to a determination that an urgency for the vehicle operation assistance information item indicates a warning urgency, a determination that an immanency for the expected vehicle operation control transfer is within a minimum relevant immanence, a determination that the expected vehicle operation control transfer is a vehicle operation control transfer from autonomous vehicle control to driver control, and a determination that a driver status for the vehicle operation control metric indicates a disengaged driver status:
         identify a secondary vehicle control action corresponding to the expected vehicle operation control transfer;
         control the trajectory controller to operate the vehicle to traverse a part of the portion of the vehicle transportation network in accordance with the secondary vehicle control action;
         control the primary graphical display portion to present a representation of the vehicle operation assistance information item; and
         control the secondary graphical display portion to present the representation of the vehicle operation assistance information item.

16. The vehicle of claim 15, further comprising:
   a first graphical display unit, wherein the first graphical display unit includes the first graphical display portion; and
   a second graphical display unit, wherein the second graphical display unit includes the second graphical display portion, and wherein the second graphical display unit is physically independent of the first graphical display unit.

17. The vehicle of claim 15, wherein the primary graphical display portion is spatially located within the vehicle along a first angular offset from a center of a primary field of view of the driver of the vehicle, and wherein the secondary graphical display portion is spatially located within the vehicle along a second angular offset from the center of the primary field of view of the driver of the vehicle, wherein the second angular offset is greater than the first angular offset, such that the primary graphical display portion is visually distinct from the secondary graphical display portion.

18. The vehicle of claim 15, wherein the processor is configured to execute instructions stored on a non-transitory computer readable medium to:
   in response to controlling the trajectory controller to operate the vehicle to traverse the part of the portion of the vehicle transportation network in accordance with the secondary vehicle control action, control the primary graphical display portion to present the representation of the vehicle operation assistance information item such that the representation includes an indication of an aborted vehicle operation control transfer.

19. A vehicle configured to traverse a portion of a vehicle transportation network, the vehicle comprising:
   a primary graphical display portion;
   a secondary graphical display portion; and
   a processor configured to execute instructions stored on a non-transitory computer readable medium to:
      identify a vehicle operation assistance information item, the vehicle operation assistance information item indicating a location of an expected vehicle operation control transfer, wherein the expected vehicle operation control transfer is a vehicle operation control transfer from autonomous vehicle control to driver control; and
      in response to a determination that a driver status for the vehicle operation control metric indicates an engaged driver status:
         transfer vehicle operation control from autonomous vehicle control to driver control;
         control the primary graphical display portion to present a representation of the vehicle operation assistance information item; and
         control the secondary graphical display portion to present the representation of the vehicle operation assistance information item.

20. The vehicle of claim 19, wherein the processor is configured to execute instructions stored on a non-transitory computer readable medium to:
  in response to transferring vehicle operation control from autonomous vehicle control to driver control, control the primary graphical display portion to present the representation of the vehicle operation assistance information item such that the representation includes an indication of a completed vehicle operation control transfer.

\* \* \* \* \*